US008533212B2

(12) United States Patent  
McCall et al.

(10) Patent No.: US 8,533,212 B2  
(45) Date of Patent: Sep. 10, 2013

(54) RECIPROCAL DATA FILE PUBLISHING AND MATCHING SYSTEM

(76) Inventors: Danny A. McCall, Loudon, TN (US); Alexis S. Pecoraro, Knoxville, TN (US); Christopher S. Hurt, Knoxville, TN (US); Kimberly Sharman Evans, Knoxville, TN (US); Sean M. Kitzmiller, Alpharetta, GA (US); Martin R. Merrick, Powell, TN (US); M. Kent Ivey, Knoxville, TN (US); Karl E. Thorndike, Knoxville, TN (US); Kenneth D. Kolda, Dublin, CA (US)

( * ) Notice: Subject to any disclaimer, the term of this patent is extended or adjusted under 35 U.S.C. 154(b) by 736 days.

(21) Appl. No.: 11/682,456

(22) Filed: Mar. 6, 2007

(65) Prior Publication Data

US 2007/0150529 A1 Jun. 28, 2007

Related U.S. Application Data

(62) Division of application No. 09/918,851, filed on Jul. 31, 2001, now Pat. No. 7,191,176.

(60) Provisional application No. 60/221,731, filed on Jul. 31, 2000, provisional application No. 60/240,368, filed on Oct. 13, 2000.

(51) Int. Cl.  
*G06F 17/30* (2006.01)

(52) U.S. Cl.  
CPC .............................. *G06F 17/30017* (2013.01)  
USPC ........................................................ 707/758

(58) Field of Classification Search  
USPC ................... 707/1–10, 100–104.1, 200–206, 707/758, 763, 769, 770, 771, 796, 966, 609; 705/8, 9, 11; 434/219  
See application file for complete search history.

(56) References Cited

U.S. PATENT DOCUMENTS

| 6,385,620 | B1 * | 5/2002 | Kurzius et al. | 707/104.1 |
| 6,658,400 | B2 * | 12/2003 | Perell et al. | 1/1 |
| 6,701,313 | B1 * | 3/2004 | Smith | 1/1 |
| 7,181,417 | B1 * | 2/2007 | Langseth et al. | 705/26 |
| 7,191,176 | B2 * | 3/2007 | McCall et al. | 707/6 |

OTHER PUBLICATIONS

Dash et al., Similarity detection among data files—a machine learning approach, 1997, IEEE, 172-179.*

* cited by examiner

*Primary Examiner* — Jean B Fleurantin  
(74) *Attorney, Agent, or Firm* — Wayne Edward Ramage; Baker Donelson

(57) ABSTRACT

A method of reciprocally publishing and matching data files is disclosed. The method includes facilitating the creation of Category A and Category B data files having a respective sets of characteristics defined utilizing a common language architecture, associating enhancement objects with each data file, identifying characteristics in each data file which must be met by other data files, weighting characteristics in each data file differently from other characteristics in the same data file, enabling the selection of participation levels for each data file in marketspaces, and matching Category A data files participating in particular marketspaces to Category B data files participating in the same marketspaces using the common language architecture, the enhancement objects, the weights and the required characteristics.

7 Claims, 18 Drawing Sheets

RECIPROCAL DATA FILE PUBLISHING AND MATCHING SYSTEM

CROSS-REFERENCE TO RELATED APPLICATIONS

This application is a divisional and continuation of U.S. patent application Ser. No. 09/918,851, filed Jul. 31, 2001 now U.S. Pat. No. 7,191,176, which claims benefit of, and priority to, U.S. Provisional Patent Application No. 60/221,731, filed Jul. 31, 2000, and U.S. Provisional Patent Application No. 60/240,368, filed Oct. 13, 2000, all entitled "RECIPROCAL DATA FILE PUBLISHING AND MATCHING SYSTEM." The specifications, drawings, and complete disclosures of U.S. patent application Ser. No. 09/918,851, and U.S. Provisional Patent Application Nos. 60/221,731 and 60/240,368 are incorporated herein by specific reference.

FIELD OF THE PRESENT INVENTION

The present invention relates generally to a network-based system for matching data files and, in particular, to an Internet-based marketplace for publishing user-defined data files and intelligently matching data files of a first type to data files of a second type.

BACKGROUND OF THE PRESENT INVENTION

It is well-known that marketplace participants of many different types have had particular specialized needs which may not have readily been available through convenient channels of trade, such as stores or as described in mass-market advertising. Thus, these participants, which may be individuals, organizations or other participant types have had to resort to a variety of relatively crude methods in an attempt to meet their needs, which may include, for example, needs for particular goods, services or personnel. Similarly, marketplace participants which may be able to offer such specialized goods, services or personnel frequently have difficulty in making their offerings available to the parties most interested in them through convenient channels of trade.

One frequently-used method of allowing consumers of these goods, products or services, which may collectively be referred to as "items," to find suppliers has been through the classified advertisement sections provided in virtually all newspapers. For example, the owner of a used car may place an ad describing the characteristics of the car and naming an asking price. A house-painter may place an ad describing the services he provides. An organization may place an ad describing a particular job which it would like to fill. Unfortunately, the newspaper classifieds system suffers from a number of drawbacks. The newspaper merely provides a mechanism for publishing the advertisement and is unable to provide any assistance in guiding suppliers and consumers together other than in grouping the ads into general categories. In addition, such a system includes no reciprocity: the parties most interested in responding to these ads are unlikely to publish ads of their own describing the car, painter or job sought because of the large cost involved in proportion to the number of likely suppliers to be reached with the ad, and so the newspaper publisher would be unable to match consumers to suppliers even if the newspaper had a mechanism for doing so.

Other approaches to this problem have evolved around the unique characteristics of specific markets. For example, a wide variety of systems and techniques have been developed in an effort to bring job-seekers and job openings together. Unfortunately, the solutions which have been developed are highly fragmented and inefficient. For example, recruiters or "headhunters" actively match job-seekers to job openings, but the process is very labor-intensive and expensive. Placement agencies are somewhat more efficient for lower-skilled positions, but are considerably less effective at recruiting and placing higher-skilled workers and are still relatively expensive. Mass market advertising through print, television or radio advertisements may be effective in reaching potential employees, but suffer from many of the same drawbacks as the classified ad system. Mass marketing may also be practiced by job-seekers who blanket organizations with resumes, but because the resumes frequently fail to target particular jobs, and because the sheer number of resumes is frequently overwhelming, it is often very difficult for organizations to effectively process the resumes to match job-seekers to possible job openings.

The advent of the internet has provided a powerful new medium for bringing sellers and consumers of a wide variety of items in innovative ways. For example, eBay provides a wildly popular online auction system for sellers and consumers of items all over the world. Priceline.com enables buyers, rather than sellers, to specify the price they are willing to pay for certain items with sellers having the choice of whether to sell at the specified price, thus reversing the traditional roles of buyer and seller in a transaction. In the job marketplace, hundreds of job listing and resume clearinghouses have proliferated, giving job-seekers heretofore unavailable access to organizations and job-opening information. In each case, however, the onus typically remains on the users of each such system to search through the system to find the item sought.

A number of patented and unpatented internet systems have been introduced with a wide variety of features purporting to help automate the process of matching job-seekers to job openings. For example, e-Recruiter (from Hire.com) and MBAFreeAgents.com each attempt to standardize the language used in the job-matching process by providing job-seekers with a collection of possible standard responses in each of a number of categories, and providing employers with the same collections of choices when the employers are defining job openings. Unfortunately, the categories in which choices are offered by either system are very limited. e-Recruiter also allows employers to further customize their individual systems by defining collections of choices in additional categories. An unfortunate result, however, is that e-Recruiter is implemented separately by every individual employer, thus requiring job-seekers to learn each separate employer's "language" in order to use the system effectively. The Pentawave system, as described by U.S. Pat. No. 5,592,375, provides job-seekers with a collection of possible standard responses in each of a number of categories, and provides employers with the ability to search by the same criteria. Unfortunately, the Pentawave system allows employers only to search on the criteria, and does not allow employers to define job openings in the same way. Thus, a need exists for a job-matching or item-matching system in which the entirety of an extremely comprehensive resume may be defined by a standard language which corresponds completely to the language utilized to describe all job openings defined by employers, and which is implemented in the same way on every web site affiliated with the system, and which allows job-seekers to search for job openings that match their own criteria.

In another system which attempts to standardize the language used in the job-matching process, CareerSite allows job-seekers and employers to describe themselves and their job openings, respectively, by inputting simple words or phrases in response to each of a set of questions. A thesaurus then examines the responses and identifies possible "concepts" which the job-seeker or employer, respectively, may choose to require to be present in a job opening or candidate, respectively. The questions may be the same for both job-seekers and employers, so the search engine is able to determine "matches" by comparing the concepts extracted from the job-seeker's input to the concepts extracted from the employer's input in each category. The use of the thesaurus enables the job-seeker and the employer to respond to the same question in different ways or "languages" by translating what each says into a common set of concepts. Unfortunately, this "translation" process requires a great deal of intelligence to be built into the system in order to allow job-seekers and employers to communicate with each other using different "languages." Thus, a need exists for a job-matching or item-matching system in which job-seekers and employers alike utilize the same "language" to describe both themselves and their job openings, respectively, so that "translation" is minimized or eliminated.

Several systems provide mechanisms for adding additional descriptive elements to a data file representing items such as resumes or job-openings. For example, Headhunter.net appears to allow a job-seeker to complete a psychological profile and to attach the results to his resume for review by potential employers. CareerMosaic and CareerSite allow employers to include a link to the employer's web site, which could be utilized to provide additional details about the employer. CareerSite allows employers to post a webpage of information about themselves within the CareerSite system. e-Recruiter allows employers to include a list of interview questions for job-seekers with each job opening they post, and allows job-seekers to enter responses for each question. Unfortunately, none of these systems provide or suggest the use of additional "add-ons," and Headhunter.net does not even disclose or suggest the concept of objects. The Pentawave system described by U.S. Pat. No. 5,592,375 allows employers to pose questions to job-seekers, and captures and stores the job-seeker' audio or video responses, and, in addition, allows other types of multimedia to be input as well. Unfortunately, like the other referenced systems, the system of U.S. Pat. No. 5,592,375 itself makes only one type of "add-on" available, while other add-ons must be manually created by job-seekers in a format that prospective employers may or may not wish, or even be able, to take advantage of. Further, although, as described, several prior art systems allow a user, such as a job-seeker, to provide a add-on of various types, none of the prior art systems allow a complementary user, such as a job-offeror, to provide a reciprocal add-on which may, for example, be matched against, or compared to, the first user's add-on. Thus, a need exists for a system which provides a large library of standardized "object" types to both job-seekers and prospective employers for custom completion, and in which reciprocal objects may be completed by job-seekers and employers and then included in the matching process.

Some systems provide users with the power to exercise greater control over the results of a given database search by allowing them to specify certain terms or attributes which must be present in a given data file in order for the data file to be included in the results of the search. For example, the Pentawave system described by U.S. Pat. No. 5,592,375 allows employers to exclude a job-seeker entirely when the job-seeker lacks any of the specified attributes. Unfortunately, no corresponding complementary function is available to job-seekers for use in controlling the importance of specific attributes when searching for suitable job openings. On the other hand, CareerSite.com allows job-seekers and employers to require that certain "concepts," as determined by a thesaurus, must be present in a particular job opening or candidate, respectively, in order for a "match" to be found. Unfortunately, the thesaurus only recognizes certain concepts, and other search phrases are ignored, and the thesaurus also includes "synonyms" for the specific concepts which are entered when it searches available job openings or candidates, so the scope of what may be included in order to find a "match" is very broad. Thus, a need exists for a system in which both employers and job-seekers may reciprocally require that one or more specific attributes be present in the data files corresponding to the job-seeker and the job opening, respectively.

Similarly, some systems provide users with the power to exercise greater control over the results of a given database search by allowing them to "weight" their preferences with regard to certain terms or attributes in a given data file in order to rank the data files returned in a given search. For example, U.S. Pat. No. 5,416,694 allows job-seekers to more accurately describe desired job types by "weighting" their job type preferences. Unfortunately, "weighting" is only done in conjunction with a staff-reallocation or retraining-management system for determining what jobs might be appropriate for particular individuals, and no provision is made for weighting any other factors or attributes. The Pentawave system described by U.S. Pat. No. 5,592,375 allows employers to weight the importance to be given to each individual candidate attribute. Unfortunately, no corresponding function is available to job-seekers for use in controlling the importance of specific attributes when searching for suitable job openings. Thus, a need exists for a system in which both employers and job-seekers may reciprocally weight their preferences with regard to a wide variety of specific attributes in the data files corresponding to the job-seeker and the job opening, respectively.

Most prior art systems allow users to view any data file in the system simply by entering a search term which is found in that particular data file. At least one system limits the viewing of data files to those users who provide specific information about themselves which meets the criteria of the owners of the data files. Specifically, the MBAFreeagents system allows employers to limit the dissemination of information about particular job openings to those job-seekers who indicate that they have a particular area of expertise and a particular level of experience. Unfortunately, this feature is more targeted at meeting the employer's criteria and not the other way around, the criteria for which this feature may be applied is very limited, and an employer can still view resumes for job-seekers who select different areas of expertise and levels of experience than that specified by the employer. Thus, a need exists for a system which allows data file owners to limit access to their respective data files to those users who meet the criteria of the data file owners.

Another known system is the CareerPath.com system. CareerPath.com posts electronic job listings which correspond directly to classified advertisements printed in a wide variety of major newspapers. Unfortunately, the job openings posted at the CareerPath.com web site are merely copied and/or reformatted directly from the print advertisements without providing job-seekers with any additional functionality, nor may a job-seeker review job listings in a printed newspaper and then cross-reference a listing on CareerPath.com. Thus, a need exists for an online system which interacts with print media by enabling employers to place newspaper advertisements which may be cross-referenced by job-seekers to data files stored within the system and which utilizes the matching and standardization features available through the online system.

Several systems include a network of related web sites to enable users to more efficiently focus on specific item characteristics, such as job-openings in specific geographic areas or in specific industries. For example, Career Mosaic has industry specific databases and provides a gateway to international web sites which provide access to international databases. 1-Jobs.com has dozens of similar web sites purporting to target particular types of jobs or jobs in specific geographic locations. Unfortunately, Career Mosaic and 1-Jobs merely collect and publish job listings and resumes without purporting to provide any employment matching capabilities. 1-Jobs.com enables employment searches to be conducted in different sectors of industry or by geography through multiple web sites. Unfortunately, each web site appears to be controlled by 1-Jobs.com, and thus each such web site must compete with job searching or matching systems offered by entities such as local trade groups or local media including newspapers and radio and television stations; industry trade associations; individual employers; college placement centers; staffing companies and the like. CareerSite appears to offer a matching system for matching job-seeker profiles to job openings which is utilized by both a "universal" web site as well as by other co-branded web sites as well. Unfortunately, the CareerSite-branded web sites are not integrated with one another, forcing users to register at each web site separately and to learn each interface separately Thus, a need exists for a system in which users either offering or searching for items such as job openings may selectively control the scope of the dissemination of, or the search for, information about those job openings or other items, and can utilize a standardized interface to do so.

SUMMARY OF THE INVENTION

Briefly described, the present invention relates to a method of reciprocally publishing and matching data files, the method comprising the steps of facilitating the creation of a Category A data file having a first set of characteristics defined utilizing a common language architecture, facilitating the creation of a Category B data file having a second set of characteristics defined utilizing the common language architecture, and matching characteristics in the Category A data file to characteristics in the Category B data file using the common language architecture.

In features of the present method, the first set of characteristics includes a subset of desired Category B characteristics; the Category A data file describes a job-seeker, and the desired Category B characteristics are desired job characteristics; the Category A data file describes a job, and the desired Category B characteristics are desired characteristics of a job-seeker; the second set of characteristics includes a subset of desired Category A characteristics; the Category A data file describes a job-seeker, and the desired Category B characteristics are desired job characteristics, and the Category B data file describes a job, and the desired Category A characteristics are desired characteristics of a job-seeker; the step of facilitating the creation of a Category A data file includes the step of organizing the data in the Category A data file under a first set of primary headings, the step of facilitating the creation of a Category B data file includes the step of organizing the data in the Category B data file under a second set of primary headings, and each of at least some of the first set of primary headings corresponds to a respective member of the second set of primary headings; each of a majority of the first set of primary headings corresponds to a respective member of the second set of primary headings; the step of facilitating the creation of a Category A data file further includes the step of organizing the data in the Category A data file under a first set of secondary headings, the step of facilitating the creation of a Category B data file includes the step of organizing the data in the Category B data file under a second set of secondary headings, the first and second sets of secondary headings are organized under the first and second sets of primary headings, respectively, and each of at least some of the first set of secondary headings corresponds to a respective member of the second set of secondary headings; each of a majority of the first set of secondary headings corresponds to a respective member of the second set of secondary headings; each of substantially all of the first set of secondary headings corresponds to a respective member of the second set of secondary headings; the method further comprises the step of providing a plurality of standardization mechanisms, and the step of matching step includes automatically comparing at least 75% of the characteristics in the Category A data file to corresponding characteristics in the Category B data file using a standardization mechanism; and the standardization mechanisms include the comparison of a yes/no Category A characteristic to a yes/no Category B characteristic, the comparison of a Category A characteristic selected from a list to a Category B characteristic selected from the same list, the comparison of a plurality of Category A characteristics selected from a list to a plurality of Category B characteristics selected from a list, the comparison of a numerical Category A characteristic to a numerical Category B characteristic, and the comparison of a Category A characteristic selected from a multi-tiered library of characteristics to a Category B characteristic selected from the same multi-tiered library.

In another aspect of the present invention, a method of reciprocally publishing and matching data files includes: storing a Category A data file having a first set of characteristics; storing a Category B data file having a second set of characteristics; associating a Category A enhancement object with the Category A data file; associating a Category B enhancement object with the Category B data file; and automatically matching the Category A data file to the Category B data file at least partially on the basis of the contents of the respective Category A and Category B enhancement objects.

In features of this aspect, the Category A data file describes a job-seeker; the Category B data file describes a job; the Category A enhancement object is an assessment of the thinking styles of the job-seeker, and the Category B enhancement object is an assessment of the thinking styles required by the job; the Category A enhancement object is an assessment of the work preferences of the job-seeker, and the Category B enhancement object is an assessment of the work styles required by the job; the Category A enhancement object is an assessment of the professional skills possessed by the job-seeker, and the Category B enhancement object is an assessment of the professional skills required by the job; the step of automatically matching the data files on the basis of the respective enhancement objects includes the step of automatically matching the data files at least partially on the basis of a comparison of the Category A enhancement object to the Category B enhancement object; and the method further includes the steps of: in response to a command from a first user, facilitating the creation of the Category A enhancement object on the basis of input from the first user, and in response to a command from a second user, facilitating the creation of the Category B enhancement object, wherein the creation of the Category B enhancement object occurs independently from the input provided by the first user.

In another aspect of the present invention, a method of reciprocally publishing and matching data files includes: storing a Category A data file having a set of characteristics corresponding to a Category A item; storing a Category B data file having a set of characteristics corresponding to a Category B item; associating a plurality of Category A enhancement objects with the Category A data file, wherein each Category A enhancement object comprises a collection of supplemental data corresponding to the Category A item and arranged in object form; and matching the Category A data file to the Category B data file.

In features of this aspect, the method further includes the step of providing the Category A data file, together with the Category A enhancement objects, to a Category B user; the method further includes the step of enabling the Category B user to choose whether to access any of the Category A enhancement objects with the Category A data file; the method further includes the step of associating a plurality of Category B enhancement objects with the Category B data file; the method further includes the step of providing the Category B data file, together with the Category B enhancement objects, to a Category A user; the Category A item is a job-seeker, and the plurality of Category A enhancement objects are selected from the group consisting of a thinking styles assessment object, a work preferences assessment object, a professional skills assessment object, a mission statement and core values object, a past experiences timeline object, and a virtual interview object; and the Category A item is a job opening, and the plurality of Category A enhancement objects are selected from the group consisting of a preferred thinking styles assessment object, a preferred work preferences assessment object, a preferred professional skills assessment object, a day-in-the-life object, an organizational overview object, a group culture object, a relationship map object, and a virtual interview object.

In another aspect of the present invention, a method of reciprocally publishing and matching data files includes: storing a Category A data file having a set of characteristics corresponding to a Category A item; storing a Category B data file having a set of characteristics corresponding to a Category B item; facilitating the creation of a Category A enhancement object in a standard format, wherein the Category A enhancement object comprises a collection of supplemental data corresponding to the Category A item and arranged in object form; associating the Category A enhancement object with the Category A data file; and matching the Category A data file to the Category B data file.

In features of this aspect, the method further includes facilitating the creation of the Category A data file; the Category A item is a job-seeker, and the Category A enhancement object is a thinking styles assessment object, a work preferences assessment object, a professional skills assessment object, a mission statement and core values object, a past experiences timeline object, or a virtual interview object; the Category A item is a job opening, and wherein the Category A enhancement object is a preferred thinking styles assessment object, a preferred work preferences assessment object, a preferred professional skills assessment object, a day-in-the-life object, an organizational overview object, a group culture object, a relationship map object, or a virtual interview object.

In another aspect of the present invention, a method of reciprocally publishing and matching data files includes storing a Category A data file having a first set of characteristics; storing a Category B data file having a second set of characteristics; identifying at least one Category A data file characteristic which must be met by the Category B data file; and identifying at least one Category B data file characteristic which must be met by the Category A data file.

In features of this aspect, the method further includes the step of comparing the Category A data file to the Category B data file to determine if the identified Category A data file characteristic is met by the Category B data file; the method further includes the step of displaying the Category B data file to a Category A user only if the identified Category A data file characteristic is met by the Category B data file; the method further includes the step of displaying the Category A data file to a Category B user only if the identified Category A data file characteristic is met by the Category B data file; the method further includes the step of scoring the Category A data file against the Category B data file only if the identified Category A data file characteristic is met by the Category B data file; the method further includes the step of scoring the Category B data file against the Category A data file only if the identified Category B data file characteristic is met by the Category A data file; the method further includes the step of comparing the Category B data file to the Category A data file to determine if the identified Category B data file characteristic is met by the Category A data file; the method further includes the steps of facilitating the selection, by a Category A user, of at least one Category A data file characteristic which must be met by the Category B data file, and facilitating the selection, by a Category B user, of at least one Category B data file characteristic which must be met by the Category A data file; and the Category A data file describes a job-seeker and the Category B data file describes a job.

In another aspect of the present invention, a method of reciprocally publishing and matching data files includes storing a Category A data file having a first set of characteristics; storing a Category B data file having a second set of characteristics; weighting at least a first characteristic of the Category A data file differently from a second characteristic of the Category A data file; weighting at least a third characteristic of the Category B data file differently from a fourth characteristic of the Category B data file; and matching the Category A data file to the Category B data file at least partly on the basis of the differing weights of the first and second characteristics of the Category A data file and the third and fourth characteristics of the Category B data file.

In features of this aspect, the matching step includes examining the relationship between the first characteristic of the Category A data file and the third characteristic of the Category B data file, the weight placed on the first characteristic corresponds to the importance placed on the relationship between the first and third characteristics by a Category A user; the weight placed on the third characteristic corresponds to the importance placed on the relationship between the first and third characteristics by a Category B user; the matching step further includes examining the relationship between the second characteristic of the Category A data file and the fourth characteristic of the Category B data file; the matching step includes scoring the Category B data file against the Category A data file at least partly on the basis of the differing weights of the first and second characteristics of the Category A data file and the third and fourth characteristics of the Category B data file; the Category B data file is a first Category B data file, the method further comprising the steps of storing a second Category B data file, and ordering the Category B data files according to how well the Category B data files match the Category A data file; the Category A data file is a first Category A data file, the method further comprising the steps of storing a second Category A data file, and ordering the Category A data files according to how well the Category A data files match the first Category B data file; the method further includes the step of displaying the ordered Category A data files to a first Category B user, wherein the first Category B user corresponds to the first Category B data file; the method further includes the step of separately ordering the Category A data files according to how well the Category A data files match the second Category B data file; the method further includes the step of displaying the ordered Category A data files to a second Category B user, wherein the second Category B user corresponds to the second Category B data file; and one of the Category A data file and the Category B data file describes a job-seeker, and the other of the Category A data file and the Category B data file describes a job.

In another aspect of the present invention, a method of reciprocally publishing and matching data files includes: storing a first data file having a first set of characteristics corresponding to a job-seeker; storing a second data file having a second set of characteristics corresponding to a job; identifying a first job-seeker data file characteristic which must be met by the second data file; and applying relative weights to the importance of at least a second job-seeker data file characteristic and a third job-seeker data file characteristic, wherein the second job-seeker data file characteristic and the third job-seeker data file characteristic are weighted differently.

In features of this aspect, the method further includes the step of facilitating the selection of the first job-seeker data file characteristic from among all of the first set of characteristics; the method further includes the step of facilitating the selection of the second and third job-seeker data file characteristics, from among all of the first set of characteristics, to which the weights are to be applied; and the method further includes the step of facilitating the selection of the magnitude of the weights to be applied to the second and third job-seeker data file characteristics.

In another aspect of the present invention, a method of reciprocally publishing and matching data files includes: storing a plurality of Category A data files, each corresponding to a Category A user and each having a set of characteristics; storing a plurality of Category B data files, each corresponding to a Category B user and each having a set of characteristics; enabling a first Category A user to select a participation level for a first Category A data file with regard to the Category B users, wherein the participation levels include a first participation level, in which the Category B data files are available for display to the first Category A user and the first Category A data file is automatically available for display to the Category B users, and a second participation level, in which the Category B data files are available for display to the first Category A user but the first Category A data file is available for display to each Category B user only upon the selection of a Category B data file, corresponding to the respective Category B user, by the Category A user; and enabling a first Category B user to select a participation level for a first Category B data file with regard to the Category A users, wherein the participation levels include a first participation level, in which the Category A data files are available for display to the first Category B user and the first Category B data file is automatically available for display to the Category A users, and a second participation level, in which the Category A data files are available for display to the first Category B user but the first Category B data file is available for display to each Category A user only upon the selection of a Category A data file, corresponding to the respective Category A user, by the Category B user.

In features of this aspect, the method further includes the steps of: if the first participation level is selected for the first Category A data file, displaying the first Category A data file to all of the Category B data files, and if the second participation level is selected for the first Category A data file, displaying the first Category A data file only to those Category B users corresponding to Category B data files selected by the first Category A user; the method further includes the step of displaying the Category B data files to the first Category A user, wherein each Category B data file is displayed to the first Category A user only if the respective Category B data file is available for display to the first Category A user; the method further includes the steps of: if the first participation level is selected for the first Category B data file, displaying the first Category B data file to all of the Category A data files, and if the second participation level is selected for the first Category B data file, displaying the first Category B data file only to those Category A users corresponding to Category A data files selected by the first Category B user; the method further includes the steps of: displaying the Category B data files to the first Category A user, wherein each Category B data file is displayed to the first Category A user only if the respective Category B data file is available for display to the first Category A user, and displaying the Category A data files to the first Category B user, wherein each Category A data file is displayed to the first Category B user only if the respective Category A data file is available for display to the first Category B user; and if the second participation level is selected for the first Category A data file, and if the second participation level is selected for the first Category B data file, then the method further including the steps of preventing the first Category A data file from being viewed by the first Category B user, and preventing the first Category B data file from being viewed by the first Category B user.

In additional features of this aspect, if the second participation level is selected for the first Category A data file, each Category B data file is displayed only if its corresponding Category B user selects a participation level in which the respective Category B data file is available for display to the first Category A user; the method further includes the steps of: if the first participation level is selected for the first Category B data file, displaying the Category A data files to the first Category B user, and if the second participation level is selected for the first Category B data file, preventing the Category A data files from being displayed to the first Category B user; if the first participation level is selected for the first Category B data file, each Category A data file is displayed only if its corresponding Category A user selects a participation level in which the respective Category A data file is available for display to the first Category B user; the method further includes the step of imposing a charge on the first Category A user according to the participation level selected; the method further includes the step of imposing a charge on the first Category B user according to the participation level selected; the step of enabling the first Category A user includes enabling the first Category A user to select a participation level for the first Category A data file from among at least three participation levels, and the participation levels include the first participation level, the second participation level, and a third participation level in which the Category B data files are available for display to the first Category A user but the first Category A data file is unavailable for display to any of the Category B users; the method further includes the step of imposing a charge on the first Category A user according to the participation level selected; the step of enabling the first Category B user includes enabling the first Category B user to select a participation level for the first Category B data file from among at least three participation levels, and the participation levels include the first participation level, the second participation level, and a third participation level in which the Category A data files are available for display to the first Category B user but the first Category B data file is unavailable for display to any of the Category A users; the first participation level for the first Category B data file includes an automatic participation level in which the Category A data files are available for display to the first Category B user and the first Category B data file is automatically available for display to all of the Category A users, and a selective participation level in which the Category A data files are available for display to the first Category B user but the first Category B data file is available for display to each Category A user only upon the selection of a Category A data file corresponding to the respective Category A user by the Category B user; the method further includes the step of comparing the first Category A data file to the first Category B data file; the comparing step occurs only if the first Category A user selects a participation level in which the Category A data file is available for display to the first Category B user, and if the first Category B user selects a participation level in which the first Category B data file is available for display to the first Category A user; the method further includes the step of comparing the first Category A data file to a plurality of Category B data files; for each Category B data file, the comparing step occurs only if the first Category A user selects a participation level in which the Category A data file is available for display to the Category B user corresponding to the Category B data file, and if the Category B user corresponding to the Category B data file selects a participation level in which the Category B data file is available for display to the first Category A user; each of the Category A data files describes a job-seeker, and each of the Category B data files describes a job; and each of the Category A data files describes a job, and each of the Category B data files describes a job-seeker.

In another aspect of the present invention, a method of reciprocally publishing and matching data files includes: storing, in a computer system, a data file having a set of characteristics; assigning a unique reference identifier to the data file; providing the unique reference identifier to a user without using the computer system; and upon the entry of the reference identifier into the computer system, displaying the data file to the user.

In features of this aspect, the step of providing the unique reference identifier to a user includes distributing the identifier to the user in a printed publication; the step of distributing the identifier includes publishing the identifier in a newspaper the step of publishing the identifier in a newspaper includes the steps of publishing the identifier in a classified advertisement in the newspaper; the user is a Category A user, and the data file corresponds to a Category B user; the data file is a Category A data file and the set of characteristics is a first set, wherein the method further includes storing, in the computer system, a Category B data file having a second set of characteristics, and, upon the entry of the reference identifier, comparing the Category A data file to the Category B data file using the first and second sets of characteristics; the data file describes a job; the data file describes an individual seeking companionship; and the data file describes goods offered for sale.

In another aspect of the present invention, a method of reciprocally publishing and matching data files includes: storing a Category A data file having a first set of characteristics; publishing the Category A data file in a specific marketspace; storing a Category B data file having a second set of characteristics; publishing the Category B data file in a specific marketspace; and matching the Category A data file and the Category B data file only upon the condition that both data files are published in the same marketspace.

In features of the present invention, the step of publishing the Category A data file includes the step of assigning a marketspace identifier to the Category A data file; the step of publishing the Category A data file further includes the step of storing the marketspace identifier with the Category A data file; the method further includes the step of determining whether the marketspace identifier corresponds to the second marketspace, and the step of matching the Category A data file and the Category B data file occurs only if the marketspace identifier does correspond to the second marketspace; the marketspace identifier is a first marketspace identifier and the step of publishing the Category B data file includes the step of assigning a second marketspace identifier to the Category B data file; the step of publishing the Category B data file further includes the step of storing the second marketspace identifier with the Category B data file; the method further includes the step of determining whether the first marketspace identifier matches the second marketspace identifier, and the step of matching the Category A data file and the Category B data file occurs only if the marketspace identifiers do correspond; the method further includes the step of publishing the Category A data file in a third marketspace, wherein the third marketspace is different from the first marketspace; the step of publishing the Category A data file in the first marketspace includes the step of storing a first marketspace identifier with the Category A data file, the step of publishing the Category B data file in the second marketspace includes the step of storing a second marketspace identifier with the Category B data file, and the step of publishing the Category A data file in the third marketspace includes the step of storing a third marketspace identifier with the Category A data file; the method further includes the steps of determining whether the first marketspace identifier matches the second marketspace identifier and determining whether the third marketspace identifier matches the second marketspace identifier, and the step of matching the Category A data file and the Category B data file occurs only if the second marketspace identifier does correspond to one of the first and third marketspace identifiers; and the method further includes the step of publishing the Category B data file in a fourth marketspace, wherein the fourth marketspace is different from the second marketspace, and the step of publishing the Category B data file in the fourth marketspace includes the step of storing a fourth marketspace identifier with the Category B data file.

In additional features of this aspect, the method further includes the steps of providing a plurality of affiliated systems, each affiliated system providing access to data files, and determining a marketspace for a data file on the basis of the affiliated system through which the data file is accessed; the step of determining a marketspace for a data file includes the steps of determining a marketspace for the Category A data file on the basis of the affiliated system through which the Category A data file is accessed, and determining a marketspace for the Category B data file on the basis of the affiliated system through which the Category B data file is accessed; the step of publishing the Category A data file includes publishing the Category A data file in the determined marketspace for the Category A data file, and the step of publishing the Category B data file includes publishing the Category B data file in the determined marketspace for the Category B data file; each affiliated system provides access to Category A data files and Category B data files; the step of providing a plurality of affiliated systems includes the steps of providing a plurality of Category A affiliated systems, each affiliated system providing access only to Category A data files, and providing a plurality of Category B affiliated systems, each affiliated system providing access only to Category B data files; the method further includes the step of facilitating the selection of a participation level for the Category A data file, wherein the participation level may be selected from at least a participating level and a non-participating level, and the step of publishing the Category A data file includes the step of selecting the participating level for the Category A data file; the step of facilitating the selection of a participation level includes the steps of facilitating the selection of a participation level for the Category A data file in a first marketspace, and facilitating the selection of a participation level for the Category A data file in a second marketspace; the step of publishing the Category A data file includes the steps of presenting a plurality of marketspace choices to a Category A user, and determining the first marketspace on the basis of the Category A user's response to the presented marketspace choices; the step of publishing the Category B data file includes the steps of presenting a plurality of marketspace choices to a Category B user, and determining the second marketspace on the basis of the Category B user's response to the presented marketspace choices; the marketspace choices include a plurality of geographic areas designations; the geographic areas include areas defined generally by statistical metropolitan areas; the marketspace choices include a plurality of industry sector designations; each Category A data file describes a job; each Category A data file describes an individual seeking companionship; and each Category A data file describes goods offered for sale.

In another aspect of the present invention, a method of reciprocally publishing and matching data files includes storing a Category A data file having a set of characteristics corresponding to a Category A item; storing a Category B data file having a set of characteristics corresponding to a Category B item; and using fuzzy logic to determine the degree of fit of the Category B data file relative to the Category A data file.

In features of this aspect, the step of using fuzzy logic to determine the degree of fit includes using fuzzy logic to compare a plurality of the Category B characteristics to respective Category A characteristics; the step of using fuzzy logic to compare Category B characteristics to Category A characteristics includes using fuzzy logic to determine the degree of fit of each of the plurality of Category B characteristics to a respective Category A characteristic; the Category B data file is a first Category B data file, the method further comprising the steps of storing a second Category B data file, using fuzzy logic to determine the degree of fit of the second Category B data file relative to the Category A data file, and ordering the Category B data files according to the relative fits of the respective Category B data files; and the method further includes the step of using fuzzy logic to determine the degree of fit of the Category A data file relative to the Category B data file, wherein the degree of fit of the Category A data file relative to the Category B data file is determined separately from the degree of fit of the Category B data file relative to the Category A data file.

BRIEF DESCRIPTION OF THE DRAWINGS

Further features, embodiments, and advantages of the present invention will become apparent from the following detailed description with reference to the drawings, wherein.

DETAILED DESCRIPTION OF EXEMPLARY EMBODIMENTS

Figure 1:
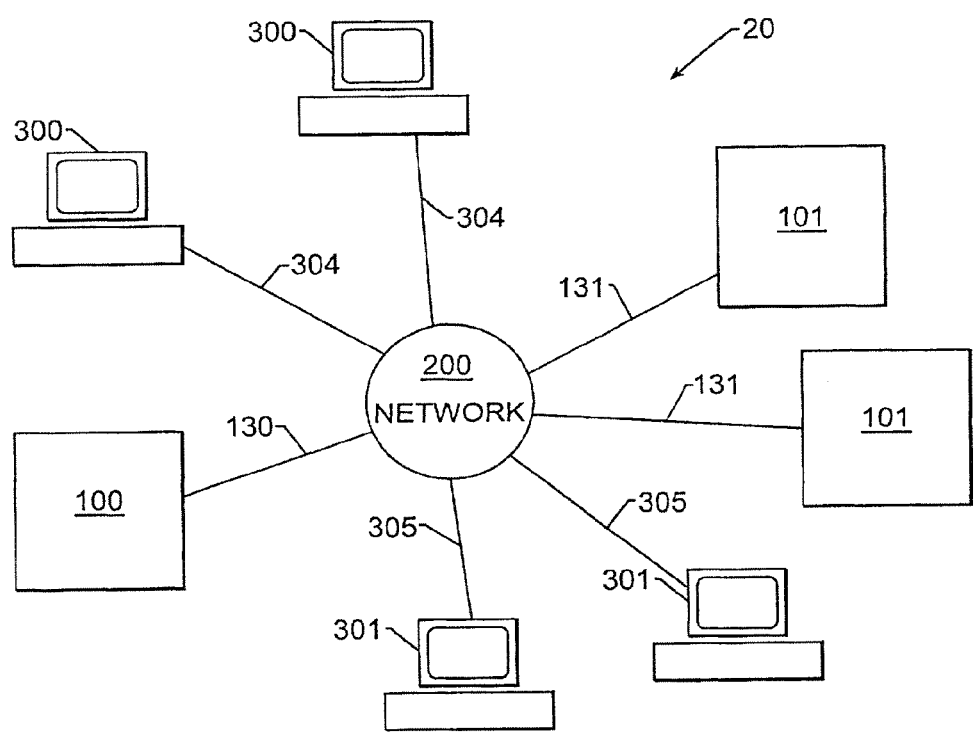
FIG. 1 is a block diagram illustrating the configuration of a computer system for facilitating the reciprocal publication and matching of data files according to the present invention.

The present invention is directed primarily to a network- or Internet-based marketplace in which organizations or individuals can reciprocally create and publish data files describing goods, services, personnel or the like for which they would like to find suitable corresponding goods, services, personnel or the like as described by corresponding data files. In a preferred embodiment, the web-based marketplace of the present invention is directed to the publishing of resume-like documents and job-description-like documents and the intelligent matching of the job-seekers publishing the former document type to job openings offered by employers publishing the latter document type. However, it should be understood that the reciprocal publishing system of the present invention may be equally applied to a wide variety of diverse marketplaces including, but not limited to, consumer and specialty goods, real estate, and the like.

Referring now to the drawings, in which like numerals represent like components throughout the several views, a reciprocal data file publishing and matching system 20, in accordance with the preferred embodiments of the present invention, is next shown and described. Since the preferred embodiment of the present invention is directed to a web-based or Internet-based marketplace, the system architecture for such a business is described first with reference to FIGS. 1 through 3.

Referring now to FIG. 1, a computer system 20 by which users may reciprocally publish and match data files according to the present invention is shown. The computer system 20 includes one or more network information server 100, 101, a plurality of Category A-user computers 300, and a plurality of Category B-user computers 301, all of which are interconnected by a communications network 200. For clarity, the computer system 20 depicted in FIG. 1 shows only three network information servers 100, 101, several Category A user computers 300 and several Category B user computers 301. In actual practice, however, a multiplicity of Category A- and B-user computers 300, 301 can be interconnected by the network 200 to the network information servers 100, 101, and, if desired, the functions of the network information servers 100, 101 described herein may be performed by several different computers/servers operated by a system administrator. Indeed, the advantages obtained by the present invention are maximized if the system is used by a large number of both Category A users and Category B users.

The Category A- and Category B-user computers 300, 301, and network information servers 100, 101 are connected to the network 200 via respective network interfaces 304, 305, 130 and 131. In a preferred embodiment, each network information server 100, 101 is a worldwide web server machine (or "server") and the network 200 is a distributed public network, such as the Internet. However, for certain aspects, and in certain embodiments, the network may be a private network, such as an Intranet. The Category A- and Category B-user computers 300, 301 and the servers 100, 101 may be connected to the network 200 using a public switched telephone network, such as those provided by local or regional telephone operating companies, or using dedicated data lines, cellular communication systems, satellite networks, cable television networks, or any other suitable connection means. User computers 300, 301 and servers 100, 101 may also be connected to the network 200 via an Internet Service Provider.

Figure 2:
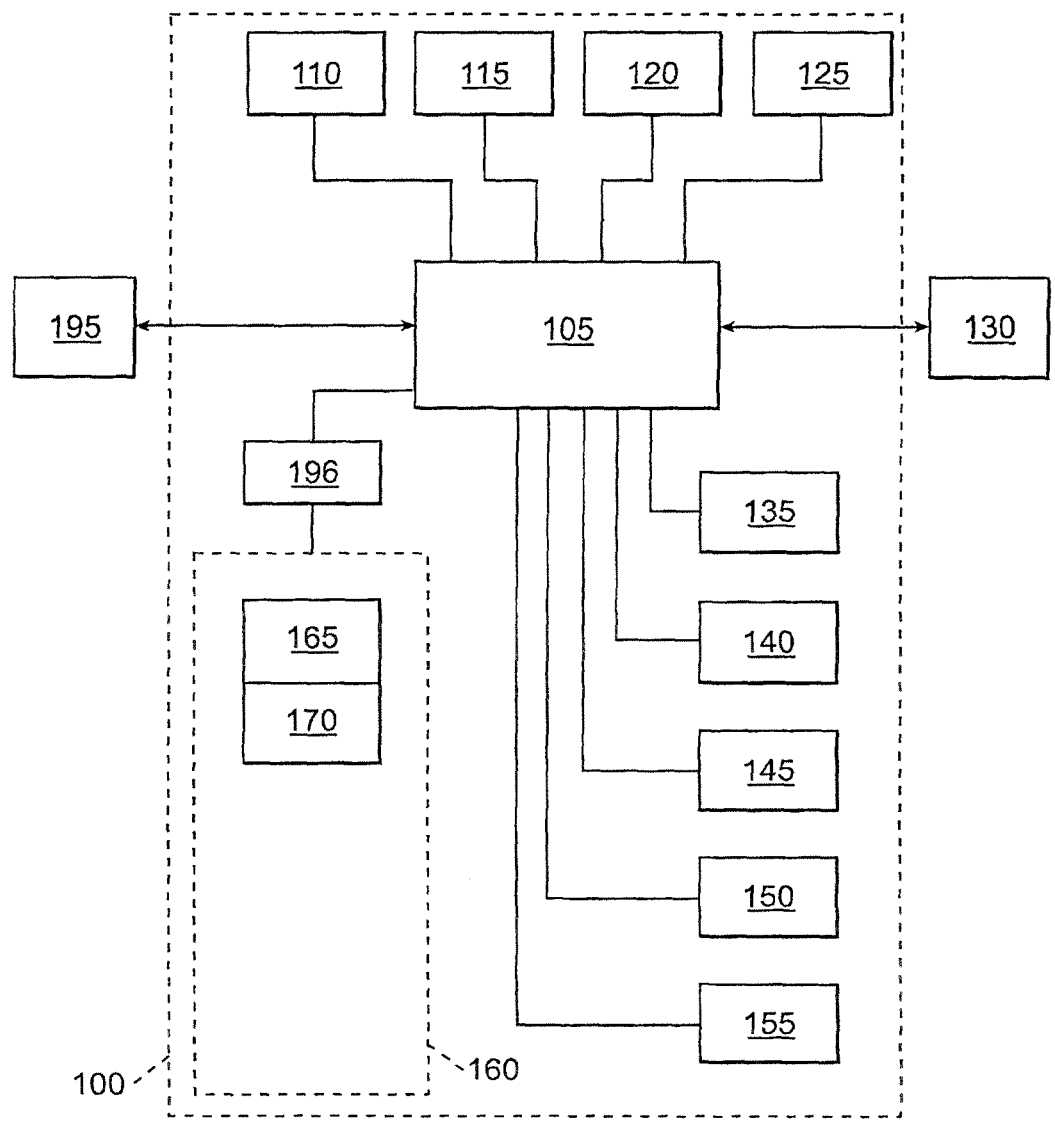
FIG. 2 is a block diagram illustrating a server of the computer system of FIG. 1.

As shown in FIG. 2, each server 100, 101 includes a central processing unit (CPU) 105, random access memory (RAM) 110, read only memory (ROM) 115, a clock 120, an operating system 125 and a data storage device 160. Each server 100, 101 may also include a searching processor 135, a calculating processor 140, a communications processor 145, a reporting processor 150, and an accounting processor 155. Each server 100, 101 may be a conventional personal computer, a server, or a computer workstation having sufficient processing ability and memory. In a preferred embodiment, each server 100, 101 acts as a worldwide web server, receiving and transmitting data to and from system users via the worldwide web or Internet. The servers 100, 101 must have the ability to accommodate high volume transaction processing as well as the ability to perform a large number of mathematical calculations and to accommodate large database searches. If the computer system 20 grows large, the server 100, 101 may include additional processors, servers, storage and databases necessary to efficiently accommodate the number of authorized users and the size of the databases used in this computer system 20. Additional servers may also be utilized to offload specific resource-intensive tasks such as background calculations, event processing, or the like from any of the web servers 100, 101 utilizing systems and methods well-known to those of ordinary skill in the art.

The CPU 105 and other processors 135, 140, 145, 150, and 155 may be conventional computer microprocessors, such as the Intel Pentium manufactured by Intel Corporation or other microprocessors manufactured by other companies. Alternatively, some or all of the functions performed by the processors 135, 140, 145, 150, and 155 may be performed by the CPU 105.

Conventional network operating systems, such as Windows NT, UNIX, or other similar operating systems, may be utilized as the operating system 125 in the servers 100, 101. Each network interface 130, 131 may include a conventional internal or external modem and may also include routers, load sharing devices, hubs, switches, firewall devices, and the like, all of which are conventional and known to those skilled in the art. In the preferred embodiment, each server 100, 101 includes software supporting the hosting of a worldwide web site. In addition, the network interface 130, 131 is connected to the Internet via an online service provider or via a dedicated data communication line provided by telephone companies such as a T1 or T3 line. The server 100 may also include conventional web server software, such as iPlanet Web Server (Fast Track Edition) manufactured by iPlanet (an alliance between Sun and Netscape) or Internet Information Server ("IIS") manufactured by Microsoft Corporation.

The data storage device 160 may include magnetic storage devices commonly referred to as "hard drives," CD-ROM storage devices, flash memory devices, optical storage devices, magnetic tape storage devices, or volatile semiconductor memory devices, or a combination of the aforesaid mentioned items. The data storage device 160 includes databases necessary for processing the various transactions and communications between professionals and clients according to the present invention and as will be discussed in greater detail hereinafter. A database management system, such as those produced by, Microsoft Corporation, Oracle Corporation, or Excelon, Inc. may be used in developing and managing the databases in the server 100.

A raid controller 196 is interposed between the database storage device 160 and the CPU 105. The raid controller 196 performs several data management functions that provide multiple redundancies within the data storage device 160 to protect data from being corrupted or lost if a portion of the data storage device 160 fails or becomes corrupted. Alternative forms of storage may also include disk subsystems. Disk subsystems suitable for use with the present invention are available from Hitachi, Ltd. and EMC Corp.

The Category A database 165 includes a master list of Category A data files 405 which have been created by Category A users. The database 165 includes the substantive content of each Category A data file 405. It will be obvious that the type of data comprising the content of the Category A data files 405 is dependent on the type of item to which the system is directed. The database 165 also includes instructions for publishing or distributing the contents of each Category A data file 405 within the system, including both information describing the marketspaces the Category A data file 405 is to be published or distributed and the type of publication or distribution to be utilized in each such marketspace. Publication, distribution and marketspaces are more fully described below. The database 165 also includes information describing those Category B data files 410 which have been matched to each Category A data file 405, as well as scoring information indicating how closely each such Category B data file 410 matches the respective Category A data files 405.

The Category B database 170 includes a master list of Category B data files 410 which have been created by Category B users. The database 170 includes the substantive content of each Category B data file 410. It will be obvious that the type of data comprising the content of the Category B data files 410 is dependent on the type of item to which the system is directed. The database 170 also includes instructions for publishing or distributing the contents of each Category B data file 410 within the system, including both information describing the marketspaces the Category B data file 410 is to be published or distributed and the type of publication or distribution to be utilized in each such marketspace. Publication, distribution and marketspaces are more fully described below. The database 170 also includes information describing those Category A data files 405 which have been matched to each Category B data file 410, as well as scoring information indicating how closely each such Category A data file 405 matches the respective Category B data files 410.

Each server 100, 101 may also include an administrator interface 195, which may include a keyboard, mouse, video monitor, scanner, voice recognition system, printer, or other system commonly used to facilitate data exchange between a computer user, such as the system administrator, and a computer, such as one of the servers 100, 101.

Figure 3:
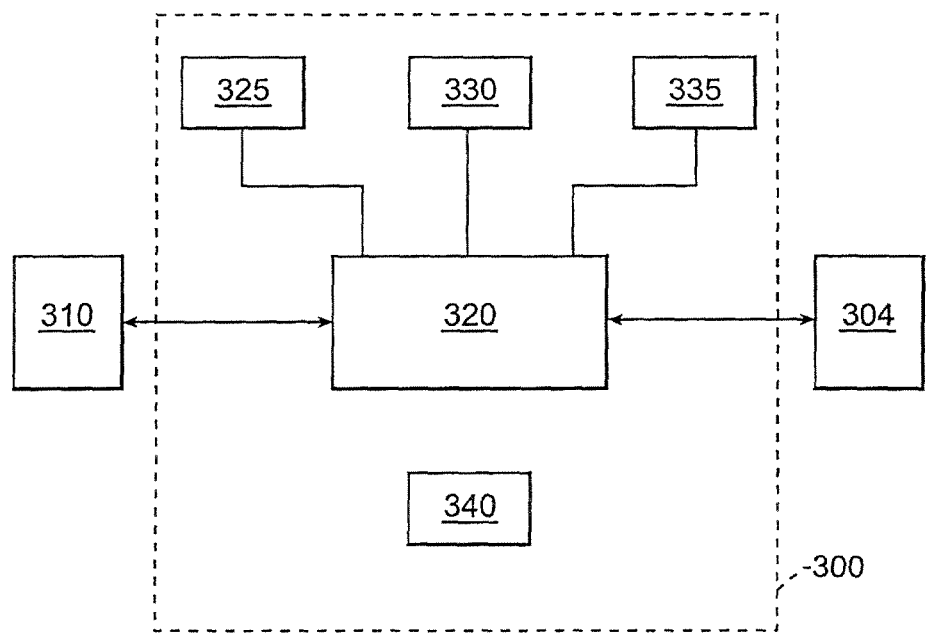
FIG. 3 is a block diagram of a typical user computer of the computer system of FIG. 1.

FIG. 3 illustrates a typical user computer 300, 301 for use with the system 20 of the present invention. The computer 300, 301 includes a, a user interface 310, a CPU 320, a RAM 325, a ROM 330, a clock 335, and a data storage device 340. A user computer 300, 301 may be a conventional personal computer or a computer workstation having sufficient memory and processing ability. The network interface 304 facilitates data transmission between the user computer 300 and the network 200. In a preferred embodiment, the network 200 is a public distributed network system such as the Internet and the user computer 300, 301 includes suitable Internet browser software, such as Netscape Navigator or Microsoft Internet Explorer, that is capable of interpreting information generated by the servers 100, 101 and displaying such information on a video monitor associated with the user computer 300. The network interface 304 may be an internal or external modem and may be connected directly to the network or Internet using a direct communication line or a high band width communication line, such as T1 or T3 line, or the network interface 304 may be connected to the Internet via an Internet Service Provider. The CPU 320 of the professional computer 300 may include a conventional microprocessor, such as an Intel Pentium processor or other similar microprocessor commonly used in personal computers or workstations. The data storage device 340 may include magnetic "hard disk" devices, CDROM devices, volatile semiconductor memory, flash memory, optical storage unit, magnetic tape storage units, or similar storage devices. Data exchange between the computer user and the professional computer 300 is facilitated by the user interface 310, which may include a keyboard, mouse, scanner, printer, voice recognition equipment, video monitor, or other similar devices commonly used to exchange data between a user and a personal computer.

Together, the user computers 300, 301, the network 200, and the servers 100, 101 are used by Category A users and Category B users to facilitate the matching of Category A data files to Category B data files using the internet marketplace, methods, and processes described hereinafter.

Having discussed the system architecture of the computer system 20, the methods and processes used by the reciprocal data file publishing and matching system will now be discussed in greater detail. When a user accesses the computer system 20 via the network 200, a server 100 generates a main display screen or web page that is viewed by the user on the user's video monitor through a network interface 304, 305. As described herein, once a user has accessed the main web page of the software system 40, users are presented with a number of options or additional screens or pages which they can access. For example, users can initiate the registration process for a Category A user or initiate the registration process for a Category B user. Although as described, either type of user may begin on the same screen or page, it will be obvious to one of ordinary skill that a different main screen or page may be utilized for each different type of user. The various methods and processes that are available to users and that are performed by the computer system 20 will now be described in greater detail with reference to FIGS. 4 through 9.

General Overview of Software System

Figure 4A:
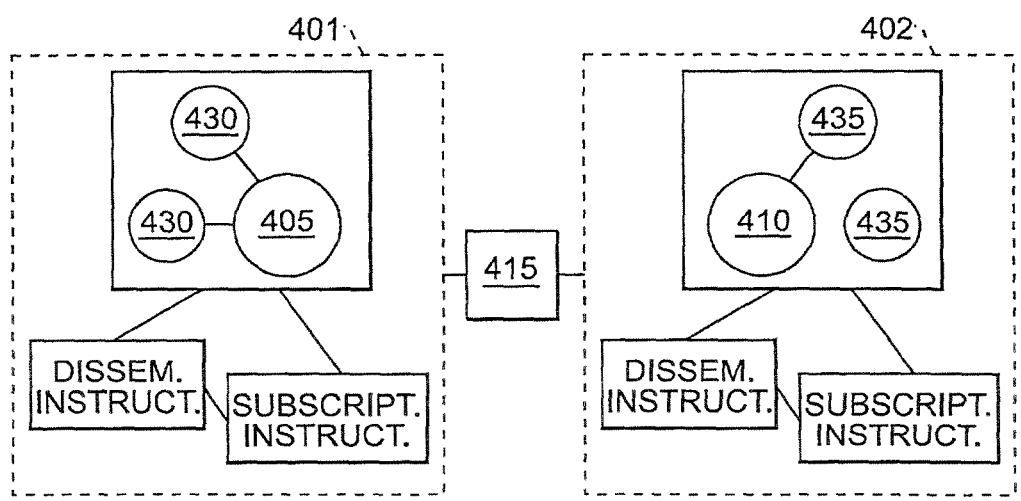
FIG. 4A is a block diagram illustrating the data exchange process carried out by the computer system of the present invention.
Figure 4B:
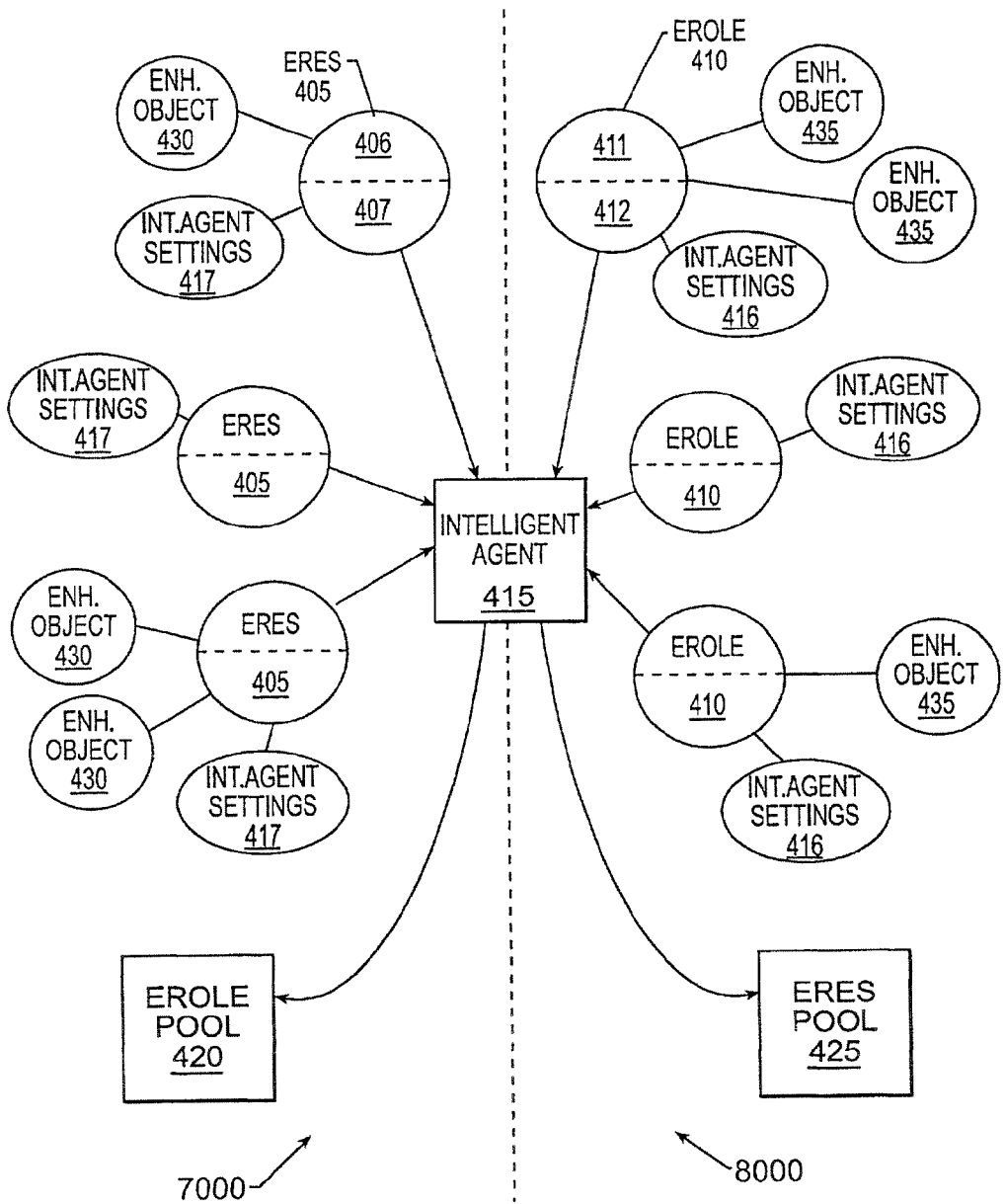
FIG. 4B is a block diagram further illustrating the data exchange process carried out by the computer system of the present invention.

FIG. 4 is a block diagram illustrating the data exchange process carried out by the system 20 of the present invention. The system 20 enables two sets of users to meet in a central marketplace for the purpose of facilitating a transaction. Each user type has a particular type of item which he is offering to another user type in the transaction. Using a Category A interface 7000, provided by the system 20, a plurality of Category A users may each develop a contextual representation 401 of a Category A item. Each Category A user may then utilize the Category A interface 7000 to establish a set of dissemination instructions, integral with the Category A contextual representation 401, which define the portions of the Category A contextual representation 401 that are to be disseminated and further to define the users to which the selected portions are to be disseminated. At approximately the same time, a plurality of Category B users may each utilize a Category B interface 8000, also provided by the system 20, to develop a contextual representation 402 of a Category B item. It will be assumed herein that the Category B user are each interested in offering a Category B item to a Category A user in exchange for a Category A item, and further that the Category B user are each interested in offering a Category B item to a Category B user in exchange for a Category A item. Each Category B user may then utilize the Category B interface 8000 to establish a set of dissemination instructions, integral with the Category B contextual representation 402, which define the portions of the Category B contextual representation 402 that are to be disseminated and further to define the users to which the selected portions are to be disseminated. It should be noted that the system 20 may enable different portions of the respective Category A and B contextual representations 401, 402 to be disseminated differently.

In addition to establishing which portions of the respective item contextual representations 401, 402 are disseminated and to whom they are disseminated, each Category A user may also utilize the Category A interface 7000 to establish a set of subscription instructions, integral with the category A contextual representation 401, which may describe the portions of the Category B contextual representations 402 which the Category A user wishes to receive, the sources of those portions, the desired characteristics of the Category B items sought, how the information received should be considered and presented, and the like. Similarly, each Category B user may also utilize the Category B interface 8000 to establish a set of subscription instructions, integral with the category B contextual representation 402, which may describe the portions of the Category A contextual representations 401 which the Category B user wishes to receive, the sources of those portions, the desired characteristics of the Category A items sought, how the information received should be considered and presented, and the like. It should be noted that the mechanisms, described herein, by which the respective users establish their dissemination and subscription instructions may be coincident, and may also be coincident with mechanisms utilized to enter content into the respective contextual representations 401, 402. It should be understood that in the following descriptions, any control exercised by a user over the dissemination of data or information associated with one or more of that user's respective contextual representations 401, 402 shall be referred to as dissemination instructions, and any control exercised by a user over any data or information received which is associated with a particular contextual representation 401, 402 of an item of a type different from that user's own shall be referred to as subscription instructions.

Each Category A contextual representation 401 includes at least a Category A data file 405 which includes at least two segments: an item preferences segment 406 and an item description segment 407. The item preferences segment 406 details the Category A user's preferences with regard to a Category B item, and the item description segment 407 describes the Category A item offered by the Category A user. Similarly, each Category B contextual representation 402 includes at least a Category B data file 410 which likewise includes at least two segments: an item preferences segment 411 and an item description segment 412. The item preferences segment 411 details the Category B user's preferences with regard to a Category A item, and the item description segment 412 describes the Category B item offered by the Category B user. Because the Category A and B users thus "own" their respective Category A and B data files 405, 410, the Category A and B users are respectively defined as Category A and B "owners."

An intelligent agent 415 continually compares the Category A data files 405 to each Category B data file 410 on the basis of the Category B item preferences in the Category A data files 405 and the Category B item description in the Category B data file 410, and compares the Category B data files 410 to each Category A data file 405 on the basis of the Category A item preferences in the Category B data files 410 and the Category A item description in the Category A data file 405. The comparison may be limited to only those portions of the respective data files 405, 410 which have been disseminated to their respective owners. The Category B data files 410 which match each Category A data file 405 are placed into a corresponding Category B data file pool 420 for review by the owner of the Category A data file 405 using the Category A user interface 7000. Concurrently, the Category A data files 405 which match each Category B data file 410 are placed into a corresponding Category A data file pool 425 for review by the owner of the Category B data file 410 using the Category B user interface 8000.

In order to facilitate the entry of data into each Category A and Category B data files 405, 410, and more significantly, the straightforward comparison of data in a particular Category A data files 405 to corresponding data in a particular Category B data file 410, a variety of mechanisms, referred to herein as the common language architecture, may be utilized by the system of the present invention to standardize the data in the respective data files 405, 410 and to standardize the format in which that data is entered, stored and displayed. The common language architecture thus allows the intelligent agent 415 to more precisely assess how closely a particular Category A data file 405 matches a particular Category B data file 410 and how closely that Category B data file 410 matches that Category A data file 405.

Also as shown in FIG. 4, each Category A or B contextual representation 401, 402 may further include one or more enhancement objects 430, 435 which may be associated with each respective Category A or B data file 405, 410. The enhancement objects 430, 435 provide additional details about the items being offered by the Category A and B owners, respectively. Thus, a Category A owner who is viewing the Category B data files 410 in his Category B data file pool 420 may generally also view those Category B enhancement objects 435, or those portions of the Category B enhancement objects 435, associated with each of the data files 410 in his pool 420. Similarly, a Category B owner who is viewing the Category A data files 405 in his Category A data file pool 425 may generally also view those Category A enhancement objects 430, or those portions of the Category A enhancement objects 430, associated with each of the data files 405 in his pool 425. Optionally, however, access to the enhancement objects 430, 435 could be limited on the basis of some criteria, including, for example, the payment of an additional fee. Also optionally, each type of Category A enhancement object 430 may correspond to a particular type of Category B enhancement object 435, which may be a reciprocal version of the Category A enhancement object 430, and the intelligent agent 415 may also consider the content of the respective Category A and B enhancement objects 430, 435 when matching Category A and B data files 405, 410. Preferably, the system 20 of the present invention provides a library of pre-defined enhancement object types from which a user may select as desired. In addition, the system 20 preferably allows users to define additional enhancement object types. A system of enhancement objects suitable for use with the present invention is the plusObjects system of enhancement objects developed by Digital Discoveries, Inc. of Knoxville, Tenn.

The system 20 may be accessed through any affiliated system 30. Affiliated systems 30 may be administered by a central administration authority using a primary server 100, or may be administered independently using one or more affiliate servers 101. If affiliate servers 101 are utilized, they should preferably be connected to the primary server 100 using a high speed data connection.

Each affiliated system 30 corresponds to a particular marketspace. From the user's perspective, marketspaces serve to more efficiently bring together Category A and B users having a common interest. From the system administrator's perspective, marketspaces are a partitioning means for subdividing the entire set of users into smaller, more manageable groups. Each marketspace represents a subset of the total market for a particular item type. Marketspaces may be created or defined to focus on particular geographic areas, particular user types, particular item types, particular transaction types, or any other type of interest that the market participants might have in common. This enables, for example, a Category B user offering an item in a particular geographic area to offer the item only to Category A users in that geographic area or who have an interest in finding an item in that geographic area. Because users are commonly only interested in items within a particular marketspace, such as items within a particular geographic area, the use of appropriate marketspaces often serves to limit the scope of a user's search for a suitable item to a much more manageable number of prospective matches than would be involved if the entire universe of items were considered. This minimizes the amount of system resources that must be consumed in comparing the data files 405, 410 which represent those items to one another. This also permits an administrator to more effectively allocate the costs of a particular set of comparisons on the basis of the scope of the items considered when doing the comparisons.

Each marketspace may be independently "owned" by an affiliate. By license or other legal relationship, the affiliate may have the right and authority to control aspects of how their respective marketspace works. For example, the marketspace may be configurable to be "open," such that anyone may participate, or "closed," such that restrictions are placed on who may participate. One type of marketspace which might be closed is a marketspace corresponding to a particular organization, in which users may only access data files 405, 410 within that marketspace.

A user who wishes to participate in a particular marketspace establishes a participation relationship between his respective data file 405, 410 and the desired marketspace by registering his data file 405, 410 with the affiliated system corresponding to that marketspace. Thus, for example, a Category A user interested in Category B items in a particular geographic area could access the system 20 through the affiliated system 30 corresponding to the desired marketspace merely by registering his data file 405, 410 with that affiliated system 30. Instructing the system 20 to consider Category B items in a particular marketspace when attempting to find a match for the user's Category A item is an example of a type of subscription instruction.

By dividing the universe into a set of overlapping marketspace networks, the system 20 allows users to control the participation of their respective data files 405, 410 on a marketspace basis. If a Category B owner wishes for Category A users in a particular marketspace to see his Category B item, he registers his Category B data file 410 in the affiliated system corresponding to the selected marketspace and instructs the system 20 to publish his data file 410 in that marketspace. Moreover, each user can control the publication of his respective data file 405, 410 in each marketspace individually. Thus, a Category A owner may choose to publish his data file 405 in a first marketspace and a second marketspace, but not to publish the data file 405 in a third marketspace. The data file 405 could then be accessed by Category B owners through the affiliated system 30 corresponding to the first marketspace or the affiliated system 30 corresponding to the second marketspace, but not through the affiliated system 30 corresponding to the third marketspace. Instructing the system 20 to publish the Category A user's data file 405 to Category B item owners in the first and second marketspaces but not in the third marketspace is an example of a type of dissemination instruction.

Preferably, the system 20 provides additional publishing options as well, including at least one mechanism for allowing a user to associate a data file 405, 410 of one type with a data file 410, 405 of the other type directly. In a first exemplary direct association mechanism, a data file may be published using a reference identifier program. For example, in such a program, a unique reference identifier, referred to herein as a "reference ID," may be assigned to a Category B data file 410 which has been published in the reference ID program. A Category A user may then view the Category B data file 410 and associate his Category A data file 405 with the Category B data file 410 directly. In a second exemplary direct association mechanism, a data file may be published using an ad hoc query program. For example, in such a program, a Category B data file 410 be made available to database queries which are formulated by a Category A user. If the Category B data file 410 satisfies a particular query by a Category A user, then the Category B data file 410 is included in a query match list. The Category A user may then view the Category B data file 410 and associate his Category A data file 405 with the Category B data file 410 directly. Publishing programs employing such direct-association mechanisms may be referred to herein as "direct-connect" programs, and their use is another example of a type of dissemination instruction.

The use of the direct-connect programs make possible a variety of commercial implementations. For example, a Category B user could publish a portion of the information from the Category B data file 410, an advertisement, or any other relevant material through any of a variety of traditional media, such as a local newspaper, magazine, radio, television station or the like. The Category B user could then publish the reference ID corresponding to the Category B data file 410 along with the other material. Category A users interested in the Category B data file 410 could then have access to all of the details of the Category B data file 410 through use of the reference ID. Such a system more effectively targets particular marketspace audiences, such as individuals in a particular geographic area, a particular interest, or the like. Further, affiliates could take advantage of the system by providing an affiliated system 30, promoting its existence, and then using it for additional advertising or promotion activities.

In a first preferred application of the data exchange process of the present invention, the Category A users are job-seekers, the Category B users are job-offerors, each Category A data file 405 (referred to herein as an "eres") describes the qualifications and preferences of an individual job-seeker, and each Category B data file 410 (referred to herein as an ("erole") describes a particular job and the preferred candidate sought to fill that job. Further, in the first preferred application, the item preferences segment 406 of the eres 405 is a job preferences segment and the item description 407 of the eres 405 is a resume segment. Also in the first preferred application, the item preferences segment 411 of the erole 410 is a candidate description segment and the item description segment 412 of the erole 410 is a job description segment. Thus, the intelligent agent 415 continually compares the eres 405 registered in a particular marketspace to each erole 410 registered in the same marketspace on the basis of the job preferences segment 406 of the eres 405 and the job description segment 412 of the erole 410, and compares the eroles 410 registered in the marketspace to each eres 405 registered in the same marketspace on the basis of the candidate description segment 411 in the eroles 410 and the resume segment 407 in the eres 405. In a preferred embodiment, marketspaces include geographic areas such as cities, career focus areas, and/or groups of users such as college students. Depending on the respective publishing instructions of the respective eres 405 and eroles 410, a copy of each of the eroles 410 matching each eres 405 may be placed into a corresponding erole pool 420 for review by the job-seeker who owns the respective eres 405, and a copy of each of the eres 405 matching each erole 410 may be placed into a corresponding eres pool 425 for review by the job-offeror who owns the respective erole 410. The job-seekers may utilize a job-seeker interface 7000 to develop and publish an eres 405 and to review a corresponding erole pool 420. The job-offerors may utilize a job-offeror interface 8000 to develop and publish one or more erole 410 and to review one or more corresponding eres pools 425.

The Eres

As stated previously, in an exemplary embodiment, the Category A data file 405 is an eres which includes a resume segment 407 and a job preference segment 406. The information in the resume segment 407 is organized into a plurality of criteria which may be include, but is not limited to, the eres owner's work experiences, the eres owner's academic experiences, special training and accreditations received by the eres owner, tools in which the eres owner has proficiency, general skills possessed by the eres owner, job related skills possessed by the eres owner, and the like. The information in the job preference segment 406 is likewise organized into a plurality of criteria, which may include, but is not limited to, the eres owner's desired career focus areas, the eres owner's expected salary range, the eres owner's desired employment type, the eres owner's desired accountabilities, the maximum amount of overnight travel tolerated by the eres owner, whether the eres owner prefers to have flextime as an option, the organization type desired by the eres owner, the type of ownership structure desired by the eres owner, the organization maturity desired by the eres owner, the work site size desired by the eres owner; the size of the organization desired by the eres owner, or the like.

The respective information in the resume segment 407 and the job preference segment 406 may preferably be graphically presented to any user in a quasi-resume format which includes at least a primary level of headings for major categories, a secondary level of headings for subcategories of the major categories, and a level of information items for information categorized in the major categories or subcategories. Also, a common language architecture is preferably utilized to standardize the information contained within the eres. In a first aspect of the common language architecture, the headings in both the primary level and the secondary level are uniform across all eres stored in the eres database 165. In a second aspect of the common language architecture, the information items are selected to correspond directly to information items utilized by eroles stored in the erole database 170. The common language architecture will be more thoroughly explained hereinafter.

Enhancement objects 430 suitable for use with the eres 405 in the first preferred application of the data exchange process of the present invention include a conventional resume object in which an eres owner's conventional resume may be attached to his eres 405, a reference list object in which a list of references may be attached to the eres 405, a past experiences and timeline object, a personal mission object, a virtual interview, a thinking styles assessment object, a work preferences assessment object, a professional skills assessment object and objects related to describing the individual more completely than is possible through a resume alone through the use of personal photographs, documents, efiles and other multimedia tools. Some eres enhancement objects 430 may be defined in such a way that they may be compared to corresponding or reciprocal erole enhancement objects 435 either directly or through the use of the intelligent agent 415.

In an example of a past experiences and timeline object, an eres owner may assess past work experiences to gain insight helpful in shaping future work direction. The experiences may be associated with a timeline which may be interactive. In an example of a personal mission object, an eres owner may develop his own mission statement, core values and core competencies. In an example of an interview object, an eres owner may select or define a series of questions that might typically be asked by an interviewer in an interview and then provide answers to those questions. The questions may be answered via an audio system, which may be made available through a telephonic interface, a video system, or in writing.

In an example of a thinking styles assessment object, an eres owner may graphically or mathematically identify their own thinking and learning styles. This information may then be compared with information about prospective jobs gathered through a reciprocal thinking styles assessment object available to job-offerors. A thinking styles assessment system suitable for use with the present invention is the Herrmann Thinking Styles assessment available from Herrmann International.

In an example of a work preferences assessment object, an eres owner may identify and measure their own personality characteristics with respect to the responsibilities and duties of various work situations. This information may then be compared with information about particular jobs gathered through a reciprocal preferred work style characteristics assessment object available to job-offerors. A work preferences assessment system suitable for use with the present invention is the Personal Discovery Dimensions® available from Resource Associates, Inc.

In an example of a professional skills assessment object, an eres owner may better articulate their professional skills by characterizing a series of transferable skills as either describing or not describing themselves. The assessment may prompt the eres owner to sort all or portions of the series of skills in order of descriptiveness of themselves, or may enable the eres owner to rate each skill individually relative to themselves. This information may then be compared with information about jobs gathered through a reciprocal professional skills assessment object available to job-offerors. A professional skills assessment system suitable for use with the present invention is the Professional Skills assessment developed by Digital Discoveries, Inc. of Knoxville, Tenn.

One eres 405 suitable for use with the present invention is the e-Res developed by Digital Discoveries, Inc. of Knoxville, Tenn.

The Erole

As stated previously, in an exemplary embodiment, the Category B data file 410 is an erole which includes a job description segment 412 and a candidate description segment 411. The information in the job description segment 412 is organized into a plurality of criteria, which may include, but is not limited to, the eres owner's desired employment type, the maximum amount of overnight travel required for the job, career focus areas entailed in the job, the accountabilities inherent in the job, the salary range offered for the job, whether the job is suitable for students and new graduates, the location of the job, the size of the work site, the erole owner's organization type, the erole owner's ownership structure, the maturity of the erole owner's organization, the size of the erole owner's organization, and the like. The information in the candidate description segment 411 is likewise organized into a plurality of criteria, which may include, but is not limited to, the desired candidate's education and training, the desired candidate's knowledge and skills, the desired candidate's past experiences including career focus areas and accountabilities, and the like.

The respective information in the job description segment 412 and the candidate description segment 411 may preferably be graphically presented to any user in a quasi-resume format which includes at least a primary level of headings for major categories, a secondary level of headings for subcategories of the major categories, and a level of information items for information categorized in the major categories or subcategories. Also, a common language architecture is preferably utilized to standardize the information contained within the erole 410. In a first aspect of the common language architecture, the headings in both the primary level and the secondary level are uniform across all eroles 410 stored in the erole database 170. In a second aspect of the common language architecture, the information items are selected to correspond directly to information items utilized by eres 405 stored in the eres database 165. The common language architecture will be more thoroughly explained hereinafter.

Enhancement objects 435 suitable for use with the erole in the first preferred application of the data exchange process of the present invention may include, but are not limited to an interview object, a "day in the life" object, a organizational overview object, a group culture object, a relationship map object, a work environment object, a thinking styles assessment object, a preferred work style characteristics assessment object, a professional skills assessment object or objects relating to the organization's products, history, facilities or the like. Some erole enhancement objects 435 may be defined in such a way that they may be compared to corresponding or reciprocal eres enhancement objects 430 either directly or through the use of the intelligent agent 415.

In an example of an interview object, an erole owner may select or define a series of questions that might typically be asked by an interviewee in an interview and then provide answers to those questions. The questions may be answered via an audio system, which may be made available through a telephonic interface, a video system, or in writing. In an example of a "day in the life" object, an erole owner may provide a plurality of interactive, multimedia or other types of enhancements to convey the work, the environment, the attitudes, the culture and the like of the organization in order to describe the daily life of the organization. In an example of an organizational overview object, an erole owner may describe the organization's structure, history, products, services and the like and present annual reports, handbooks, brochures and the like. In an example of a group culture object, an erole owner may describe the culture of the work group or department to which the erole corresponds by assessing and graphically presenting a variety of characteristics. In an example of a relationship map object, an erole owner may graphically details the nature of the relationships between the erole and other parties both within and outside the organization. The relationship map object could further include audio or written responses from the people with whom the job-seeker would be working. In an example of a work environment object, an erole owner may describe typical work space settings, dress codes and the like.

In an example of a thinking styles assessment object, an erole owner may graphically or mathematically identify thinking and learning styles associated with the responsibilities and duties of a particular job. This information may then be compared with information about job-seekers gathered through a reciprocal thinking styles assessment object available to job-seekers. A thinking styles assessment system suitable for use with the present invention is the Herrmann Thinking Styles assessment available from Herrmann International.

In an example of a preferred work style characteristics assessment object, an erole owner may identify and measure the personality characteristics associated with the responsibilities and duties of a particular job. This information may then be compared with information about job-seekers gathered through a reciprocal workplace preferences assessment object available to job-seekers. A preferred work style characteristics assessment system suitable for use with the present invention is the Workplace Discovery Dimensions available from Resource Associates, Inc.

In an example of a professional skills assessment object, an erole owner may articulate the profile of the target job-seeker by characterizing a series of transferable skills as being applicable or not applicable to the erole 410. The assessment may prompt the erole owner to sort all or portions of the series of skills in order of applicability to the erole 410, or may enable the erole owner to rate each skill relative to the erole 410 individually This information may then be compared with information about job-seekers gathered through a reciprocal professional skills assessment object available to job-seekers. A professional skills assessment system suitable for use with the present invention is the Professional Skills assessment developed by Digital Discoveries, Inc. of Knoxville, Tenn.

One erole 410 suitable for use with the present invention is the e-Role data file developed by Digital Discoveries, Inc. of Knoxville, Tenn.

Overview of the Eres Management Process

Figure 5A:
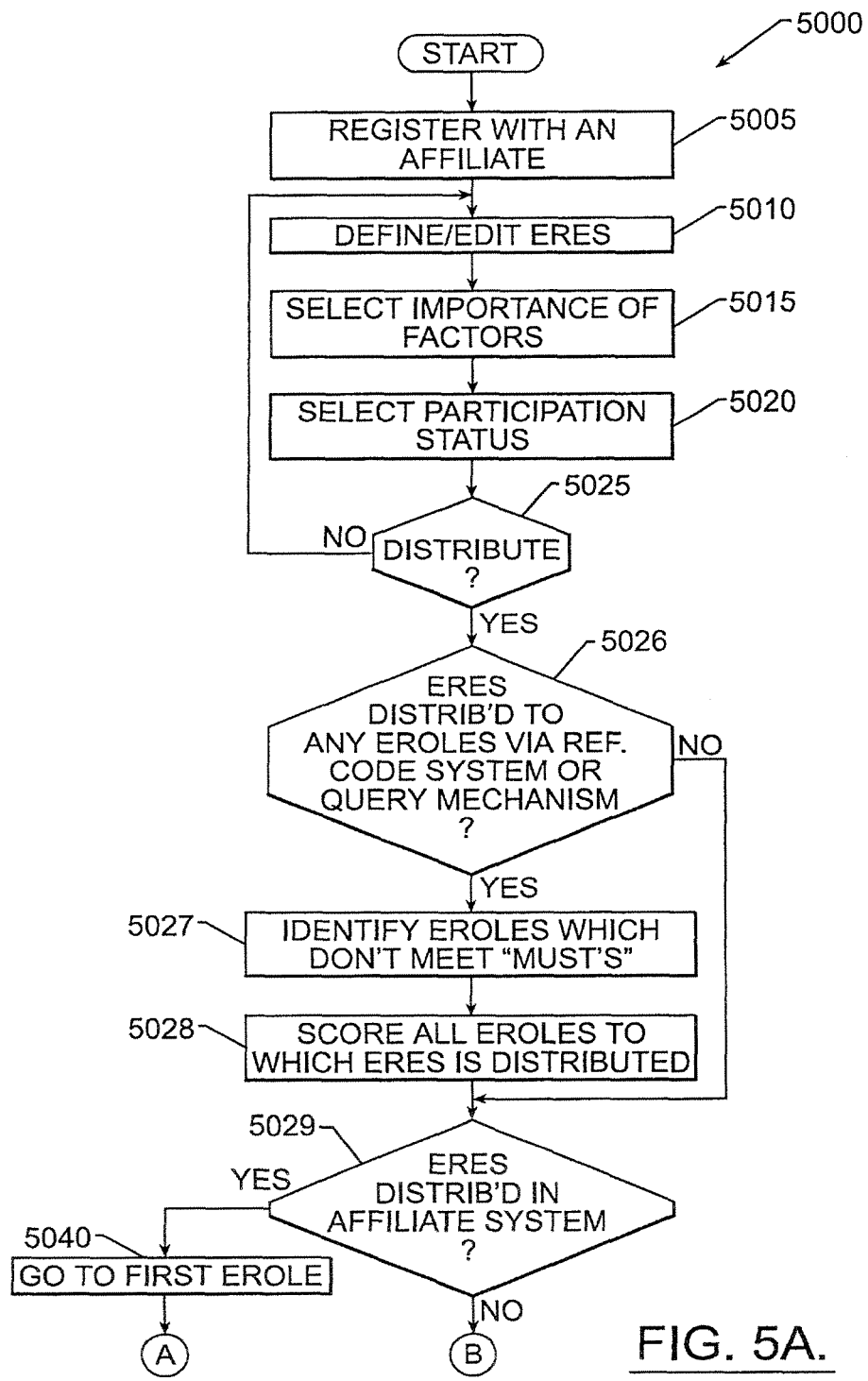
FIGS. 5A-5B are flowchart diagrams illustrating steps taken by an eres owner in conjunction with the job-seeker interface and other components of the software system of the present invention in executing the eres management process.
Figure 5B:
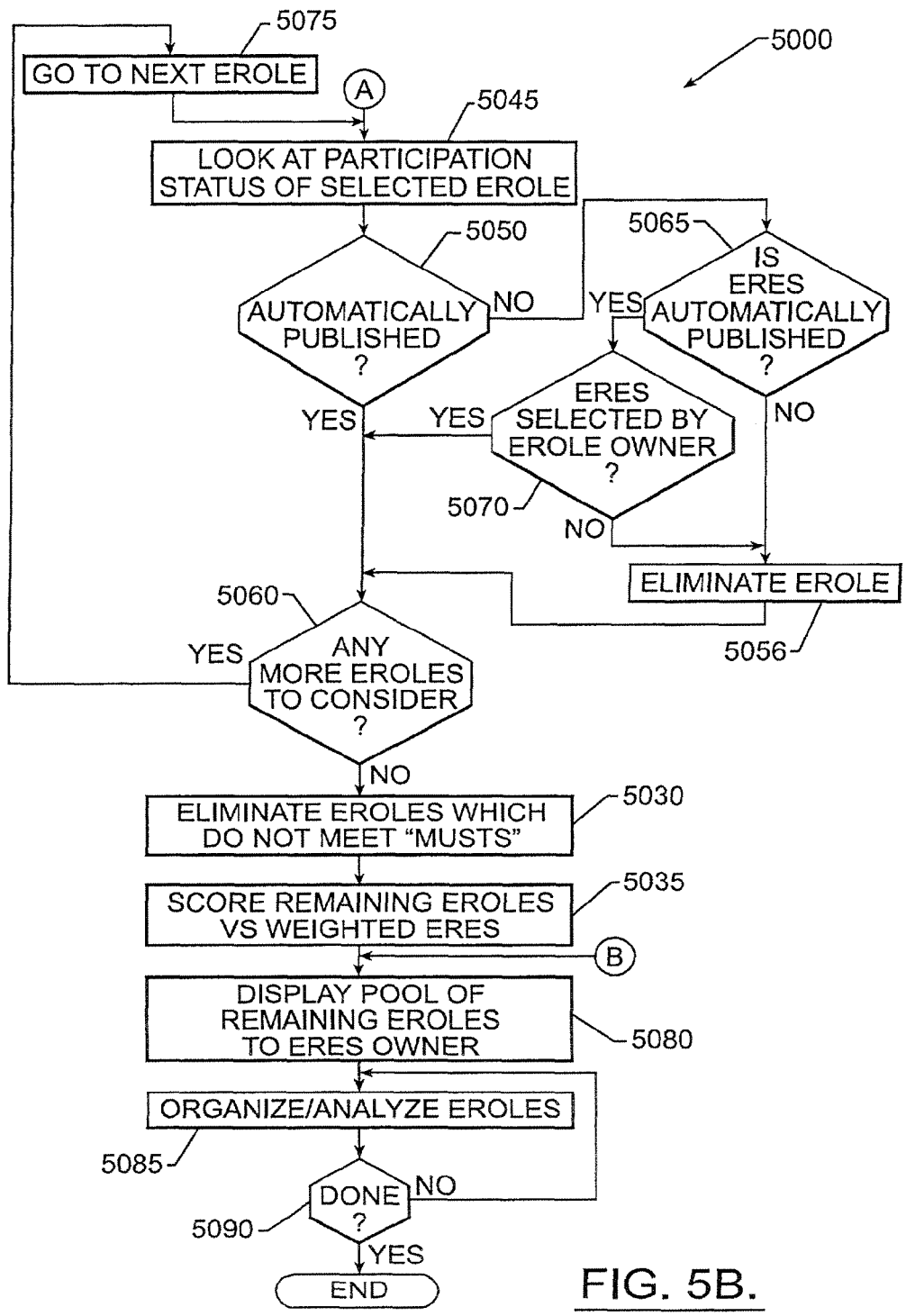

FIGS. 5A and 5B illustrate steps taken by the eres owner in conjunction with the job-seeker interface 7000 and other components of the software system 40 of the present invention in executing the eres management process 5000. The steps shown represent only the general sequence of steps to be followed by an eres owner, and it should be clear that an eres owner may choose to carry out only a subset of the steps at a given time, and that an eres owner may choose to carry out many of the steps in a different sequence from that shown and described. The purpose of introducing the eres management process 5000 at this juncture is merely to provide an overview of how a eres 405 are managed using the system of the present invention.

To utilize the software system 40, an eres owner first registers with the system 40 through an affiliated system 30 at step 5005. The eres owner may accomplish this by, for example, directing a web browser on his computer to a particular web page using a URL designated by the owner of the affiliated system 30. Eres owners who have not previously registered may be asked to provide information such as a name, an email address, or the like, and are issued an eres owner identifier. Each eres owner identifier is created to be unique across the entire system 20, so that the same eres owner identifier may be used with regard to any affiliated system 30. In addition, each eres owner is allowed to select a password for use in conjunction with the eres owner identifier in accessing the rest of the affiliate's web site. Eres owners who have previously registered may access the system 40 merely by entering the eres owner identifier and password.

Once registered, an eres owner next proceeds at step 5010 to define an eres 405. A single eres 405 is associated with each eres owner identifier, and only that identifier may be used to define or modify that eres 405. Thus, an eres owner may access and edit his eres 405 through any affiliated system 30. As described elsewhere, each eres 405 includes both a resume segment 407 and a job preference segment 406, each of which includes a plurality of information organized into criteria. The quasi-resume format may include a plurality of headings for categorizing the input information, and each information item may be quickly accessed by first accessing the appropriate heading. For ease in entry, all information contained under each heading may be fully expanded or collapsed to just a single heading.

Once the eres 405 has been defined, the eres owner next proceeds at step 5015 to define the relative importance given by the eres owner to a variety of match factors related to criteria in both segments 406, 407 of the eres 405. A match factor represents the relationship between a criteria in an eres 405 and a corresponding criteria in an erole 410. The eres owner may assess each factor related to the resume segment 407 of the eres 405 on the basis of how important it is to the eres owner that a particular job characteristic defined in the erole 410 match a corresponding experience or skill listed in the resume segment 407 of the eres 405. In addition, the eres owner may assess each factor related to the job preference segment 406 of the eres 405 on the basis of how important it is to the eres owner that the erole 410 match the preferences specified in the job preference segment 406 of the eres 405. If appropriate enhancement objects 430, 435 are utilized, the eres owner may also define the relative importance of match factors associated with characteristics of the eres enhancement objects 430 on the basis of how important it is to the eres owner that it match characteristics of a corresponding or reciprocal erole enhancement object 435 associated with the erole 410. Once established, the match factor preference settings 417, also referred to as intelligent agent settings, are utilized by the intelligent agent 415 to match the eres 405 to eroles 410 in the erole database 170.

Advantageously, the eres owner may control the importance to be given each factor in two ways. First, the eres owner may specify that only eroles 410 which satisfy particular factors be considered when matching eroles 410 to the owner's eres 405. Preferably, an owner may make such a specification for each factor individually by setting a "must" indicator for each desired factor. If the eres owner is willing to consider eroles 410 which do not meet a particular factor, then the "must" indicator may be deselected by the owner. Second, the eres owner may also set relative weights to be accorded each factor by the software system 40 when attempting to match eroles 410 stored in the system to the owner's eres 405. When used in conjunction with the "must" feature, relative weights may logically be applied only to those factors which are not required to be met by the owner. A suitable range of weights may be defined by one of ordinary skill in the art, and may include, but is not limited to, a graphical sliding scale which is manipulable by the eres owner, a range of values from which the eres owner may select a suitable entry, a series of text entries representing a plurality of choices, or the like.

Once the eres owner has defined the importance to be given to the plurality of match factors at step 5015, the eres owner next proceeds at step 5020 to control the participation status of the eres 405 defined in step 5010. By controlling the participation status, the eres owner may distribute his eres 405 to one or more owners of published eroles 410. In a preferred embodiment, a plurality of publishing programs are available to the erole owner, including at least one direct-connection program and an affiliate publishing program. The effect of distributing an eres 405 to an erole 410 published in a direct-connection program is to distribute the eres 405 directly to the owner of the erole 410 regardless of whether the content of the eres matches the content of the erole. In one direct-connection program, the eres owner identifies a particular erole 410 to which he wishes his eres 405 to be distributed by entering a unique reference ID corresponding to the selected erole 410. The use of the reference IDs and the reference ID program is more fully discussed elsewhere. In another direct-connection program, the eres owner searches for suitable eroles 410 by formulating an ad hoc query, and then selects from that list a particular erole 410 to which he wishes his eres 405 to be distributed. The use of ad hoc queries and the ad hoc query program is more fully discussed elsewhere. The effect of distributing an eres 405 to an erole 410 published in an affiliate publishing program is to permit the software system 40 to attempt to match those eroles 410 which are published with the eres owner's current affiliate to the eres 405 using the intelligent agent settings 417 established by the eres owner in step 5015. It should be noted that the publishing programs are not mutually exclusive, so at step 5020 the eres owner may distribute his eres 405 individually to any owner of an erole 410 published in the reference ID program for which the eres owner has the corresponding reference ID, and the eres owner may further distribute his eres simultaneously to all owners of matching eroles 410 published in the current marketspace through the affiliate publishing program.

With regard to the affiliate publishing program, the software system 40 may preferably include at least three participation status options. In a first option, the eres 405 is non-participating. When an eres 405 is non-participating, the eres is not distributed at all in the marketspace corresponding to the current affiliate. By remaining non-participating in all marketspaces, a user is thus able to create and store an eres 405 in the system without being considered in the matching process. In a second option, the eres 405 is selectively distributed. This enables an owner to view eroles 410 published with the eres owner's current affiliate which are matched to the owner's eres 405 by the matching process, but prohibits erole owners from viewing the owner's eres 405 unless the eres owner chooses to allow the erole owner to access his eres 405. In a third option, the eres 405 is fully distributed. This enables an owner to view all eroles 410 published with the eres owner's current affiliate which are matched to the owner's eres 405 by the matching process and enables the owner of each matching erole 410 to reciprocally view the owner's eres 405.

Also with regard to the affiliate publishing program, the software system 40 may further optionally default to a predetermined participation status on the basis of how the eres owner chose to create his eres 405, or according to some other predetermined criteria. For example, users who create an eres 405 in order to participate in a direct-connection program may default to the fully distributed participation status in the affiliate publishing program, so that not only is the eres owner's eres 405 distributed to the selected erole or eroles 410 through the direct-connection program, but the eres 405 may further be automatically distributed to all matching eroles 410 through the affiliate publishing program for one or more affiliate, while users who create an eres 405 specifically in order to take advantage of the affiliate publishing program may default to the selectively distributed participation status in that affiliate publishing program. Moreover, if an eres owner creates an eres 405 to be distributed directly to a particular selected erole 410 through a direct-connection program and the eres 405 is further set, either intentionally or by default, to be fully distributed to all matching eroles 410 in that marketspace, then optionally the system 20 may automatically grant exclusive access to that eres 405, for some predetermined period of time, to the owner of the selected erole 410 before the eres 405 is published through the affiliate publishing program. Also optionally, however, the eres owner may be given the opportunity to override that exclusive access by either distributing the eres 405 to another erole 410 through a direct-connection program or by manually adjusting the participation status in the affiliate publishing program.

Further steps carried out by the eres owner are dependent upon whether at step 5025 the eres 405 is to be distributed to the owners of any of the eroles 410 which are published within one or more publishing program, or kept non-participating. If the eres 405 is to be kept non-participating, then the eres owner may return to step 5010 to use the software system 40 to modify the eres 405, modify the importance to be given to the match factors, or modify the participation status.

On the other hand, if at step 5025 the eres 405 is to be distributed to the owners of one or more eroles 410, then further steps are next dependent on which programs are utilized to distribute the eres 405. As is more fully discussed elsewhere, if an erole 410 is published through the reference ID program, any type of user may view the erole 410 merely by entering, if known, its corresponding reference ID. Also, if an erole 410 is published through the ad hoc query program, any type of user may view the erole 410 merely by selecting the erole 410 from a query match list created as the result of an appropriately-formulated query. If and only if the user is an eres owner, however, then he may further wish to distribute his eres 405 directly to the erole 410 using the direct-connection mechanism of either the reference ID program or the ad hoc query program. If at step 5026 the eres 405 was distributed directly to any eroles 410 using the reference ID for that erole 410 or by selecting any eroles 410 from a query match list, and if, as a result, the eres owner does, in fact, distribute the eres 405 to one or more eroles 410, then at step 5027 the software system 40 is used to identify, without eliminating, all such eroles 410 which do not meet those match factors for which the eres owner has set the "must" indicator, and also to identify, without eliminating, all eroles 410 which have match factors that are not met by the eres 405 and for which the "must" indicator has been set. Further, at step 5028 each such erole 410 is placed in the eres owner's reference ID pool 420 or other direct-connection pool 420 and scored according to how closely it matches the eres 405, taking into consideration the weights given the various match factors by the eres.

Although not illustrated, it should be obvious that the software system 40 may optionally allow users to choose at step 5020 whether to allow their eres 405 to participate by being queried by erole owners. This could be implemented by adding an additional step to determine if any eroles 410 had been published or distributed to the eres 405. An erole owner could have accomplished this by formulating a query, selecting the eres from the resulting query match list and then choosing to respond directly to the eres 405. If so, then the software system 40 would likewise be used to identify, without eliminating, all such eroles 410 which do not meet those match factors for which the eres owner has set the "must" indicator, and also to identify, without eliminating, all eroles 410 which have match factors that are not met by the eres 405 and for which the "must" indicator has been set. Further, each such erole 410 would be placed in a eres owner's reference ID pool 420 or other direct-connection pool 420 and scored according to how closely it matches the eres 405, taking into consideration the weights given the various match factors by the eres 405.

Whether or not at step 5026 the eres 405 is distributed directly to any eroles 410 through the reference ID program or the ad hoc query program (or, if implemented, whether or not any eroles 410 are published or distributed directly to the eres 405 through the ad hoc query program), further steps are next dependent at step 5029 on whether the eres 405 is to be distributed to matching eroles 410 which are participating in the marketspace corresponding to the current affiliated system 30. If not, then the eres owner may proceed directly to view the eroles 410 in a direction-connection erole pool 420 at step 5080. However, if the eres 405 is to be distributed to the owners of eroles 410 published in the current affiliated system 30, then the software system 40 is used to match and score eroles at steps 5030-5075, as next described.

Beginning at step 5040, the software system 40 identifies the first matching erole 410 and then proceeds at step 5045 to examine the participation status of the identified erole 410 in the affiliated system 30. If at step 5050 it is determined that the erole owner has chosen to automatically publish the identified erole 410 to all matching eres 405, then the erole 410 is included in the current affiliate's matching erole pool 420 and at step 5060 the software system 40 proceeds to determine whether there are any more matching eroles 410 to consider. On the other hand, if at step 5050 it is determined that the erole owner has not chosen to automatically publish the identified erole 410 in the affiliated system 30, then at step 5065 the software system 40 determines whether the eres 405 has been fully distributed. If the eres 405 is not fully distributed, then the identified erole 410 is eliminated from the eres owner's current affiliate matching erole pool 420 at step 5056 and the software system 40 proceeds at step 5060 to determine whether there are any more matching eroles 410 to consider. On the other hand, if at step 5065 the eres 405 is fully distributed, then the software system 40 next proceeds at step 5070 to determine whether the owner of the identified erole 410 has chosen to publish the erole 410 to the eres 405. If so, the identified erole 410 is included in the current affiliate's matching erole pool 420 and at step 5060 the software system 40 proceeds to determine whether there are any more matching eroles 410 to consider. However, if the owner of the erole 410 has not chosen to publish the erole 410 to the eres 405, then the identified erole 410 is eliminated from the pool 420 at step 5056 and the software system 40 next proceeds at step 5060 to determine whether there are any more matching eroles 420 to consider.

If at step 5060 the software system 40 determines that there are other matching eroles 410 to consider, then at step 5075 the software system 40 identifies the next matching erole 410 and returns to step 5045 to examine the affiliate participation status of the identified erole 410. On the other hand, if at step 5060 the software system 40 determines that there are no other matching eroles 410 to consider, then at step 5030 the software system 40 examines eroles 410 in the current marketspace and eliminates from further consideration all eroles 410 which do not meet those match factors for which the eres owner has set the "must" indicator, and also eliminating all eroles having match factors which are not met by the eres 405 and for which the "must" indicator has been set. Next, at step 5035, the software system 40 scores each remaining erole 410 according to how closely it matches the eres 405, taking into consideration the weights given the various match factors by the eres owner. After scoring each remaining erole 410, the current affiliate's matching erole pool is complete and operation continues at step 5080.

At step 5080, the eres owner proceeds to view all of the eroles 410 which are in the respective erole pools 420, one pool at a time. Within each erole pool 420, the included eroles 410 may be organized into tiers. In a direct-connection erole pool 420, those eroles 410 which did not meet "must" criteria are preferably placed in a separate tier from those eroles 410 which did. Finally, at step 5085, the eres owner may utilize the system to organize and analyze the eroles 410 which are in the erole pools 420 until the eres owner chooses at step 5090 to exit the system.

Overview of the Erole Management Process

Figure 6A:
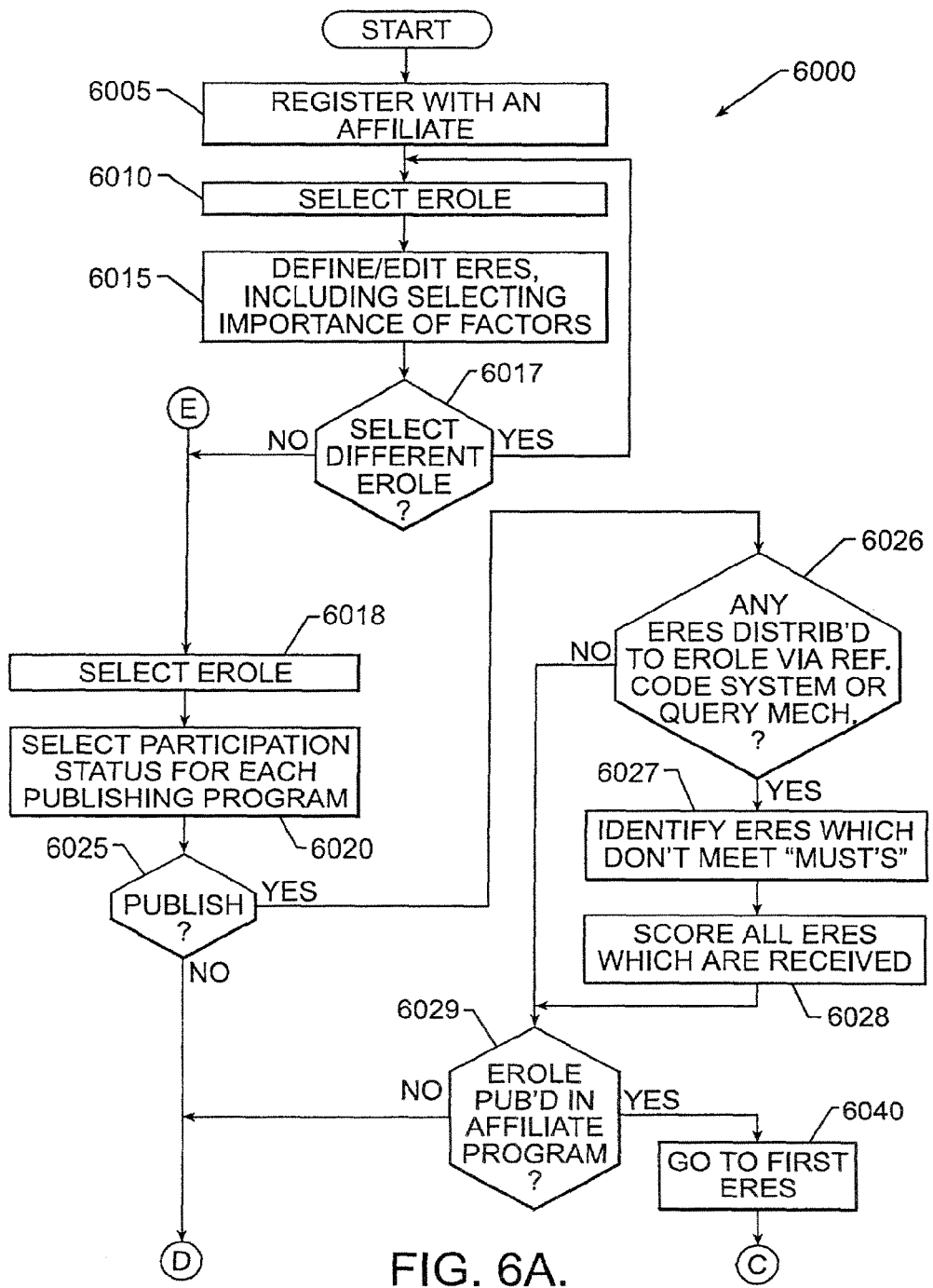
FIGS. 6A-6C are flowchart diagrams illustrating steps taken by an erole owner in conjunction with the job-offeror interface and other components of the software system of the present invention in executing the erole management process.
Figure 6B:
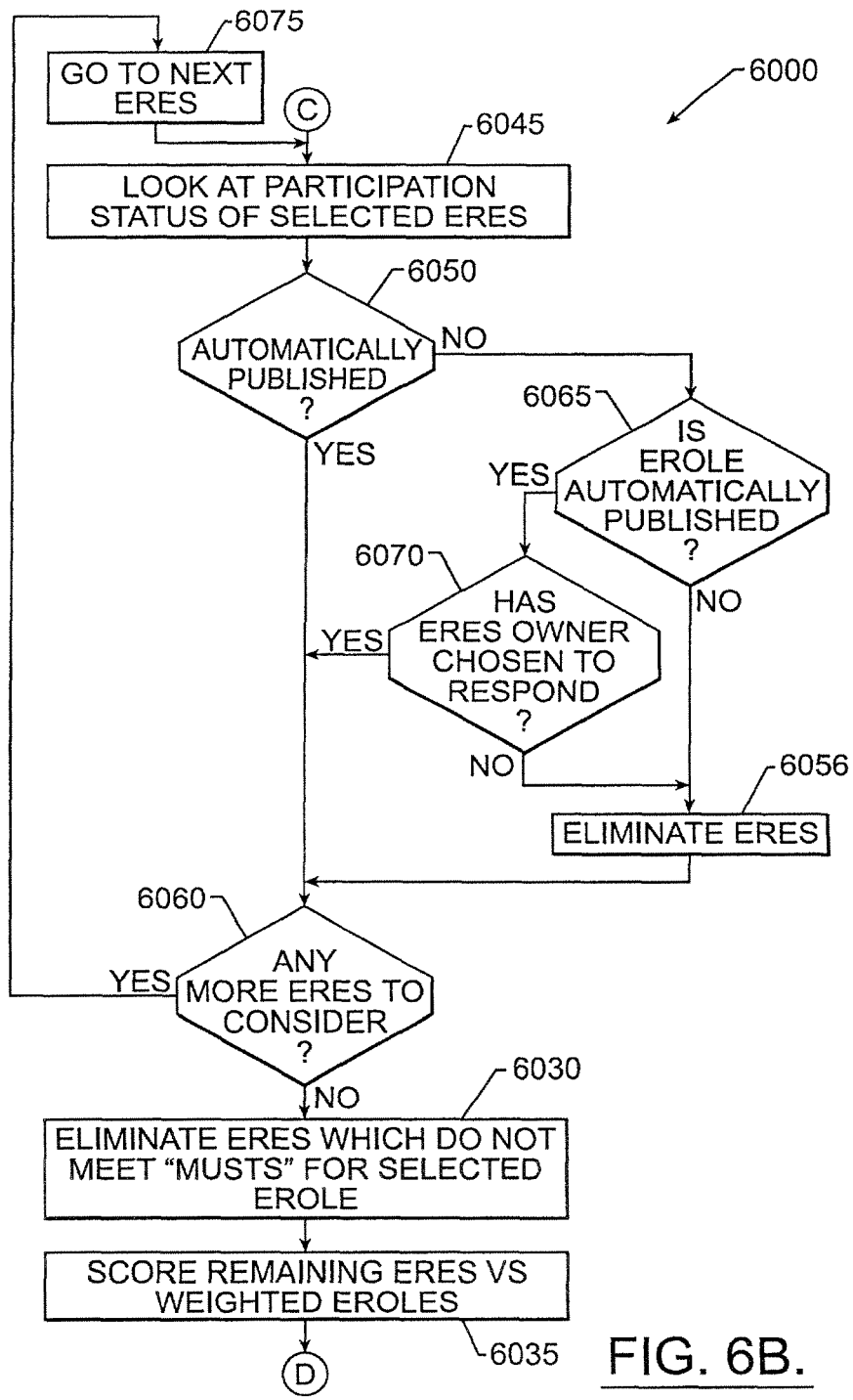
Figure 6C:
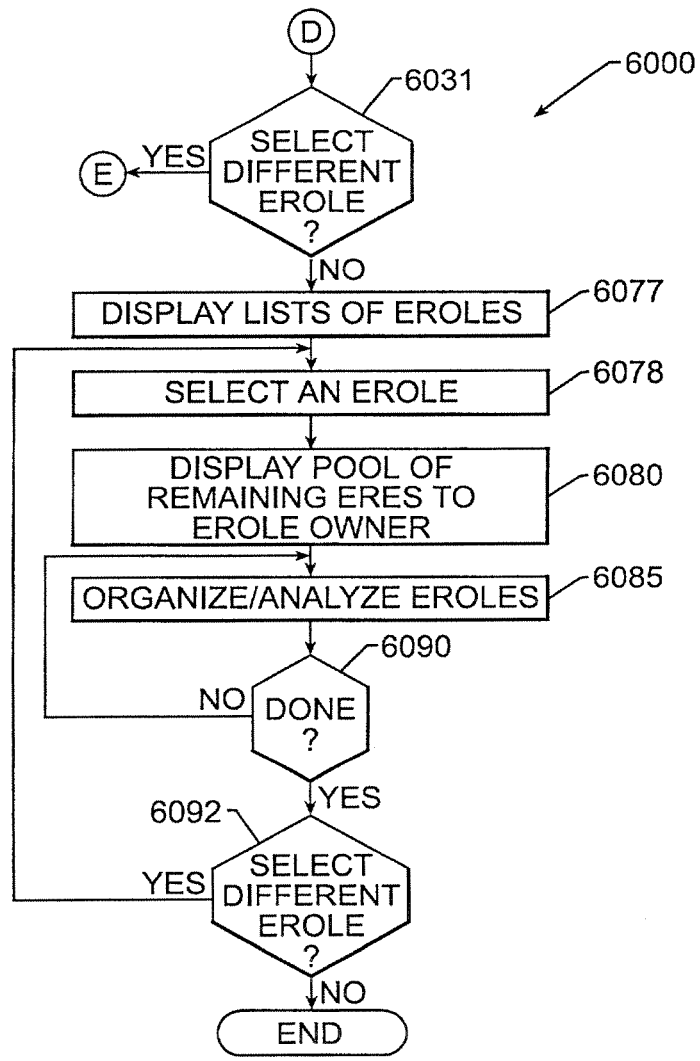
Figure 7A:
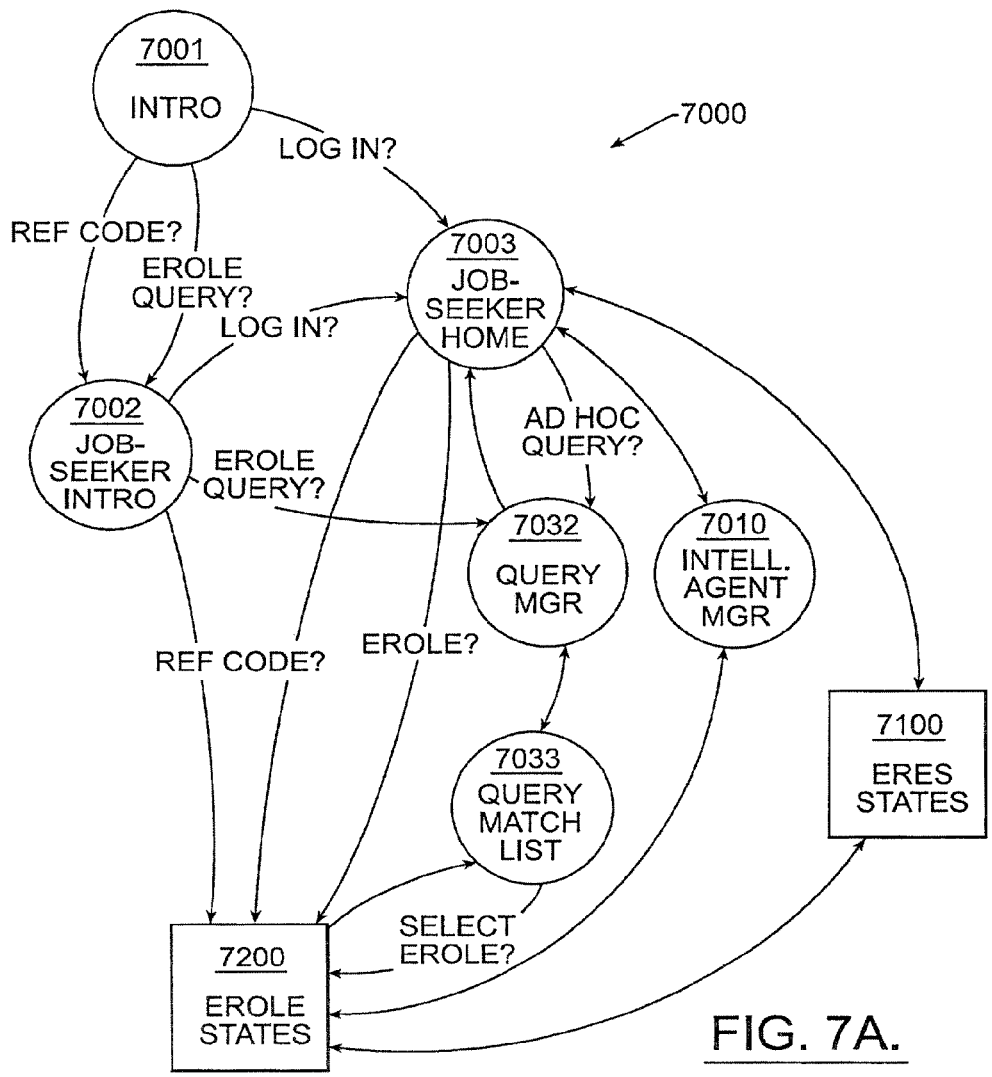
FIGS. 7A-7C are state diagrams illustrating the job-seeker interface of the system of the present invention.
Figure 7B:
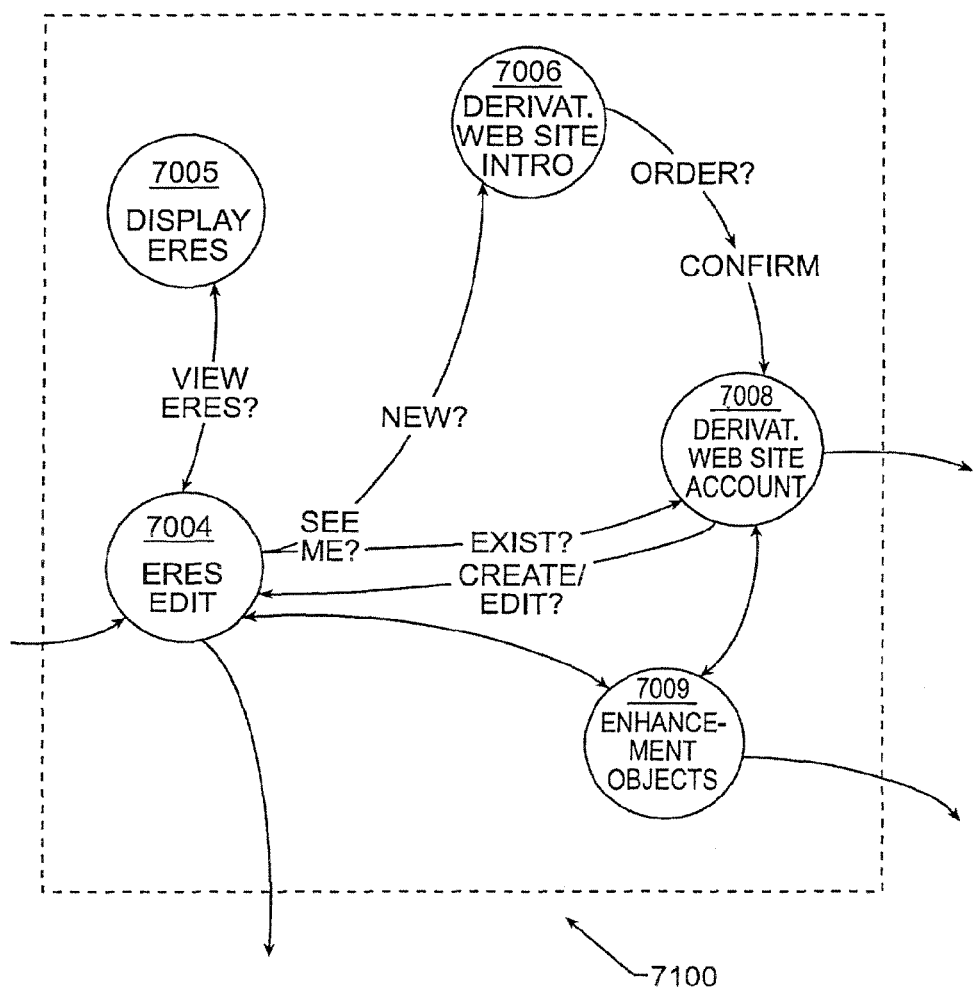
Figure 7C:
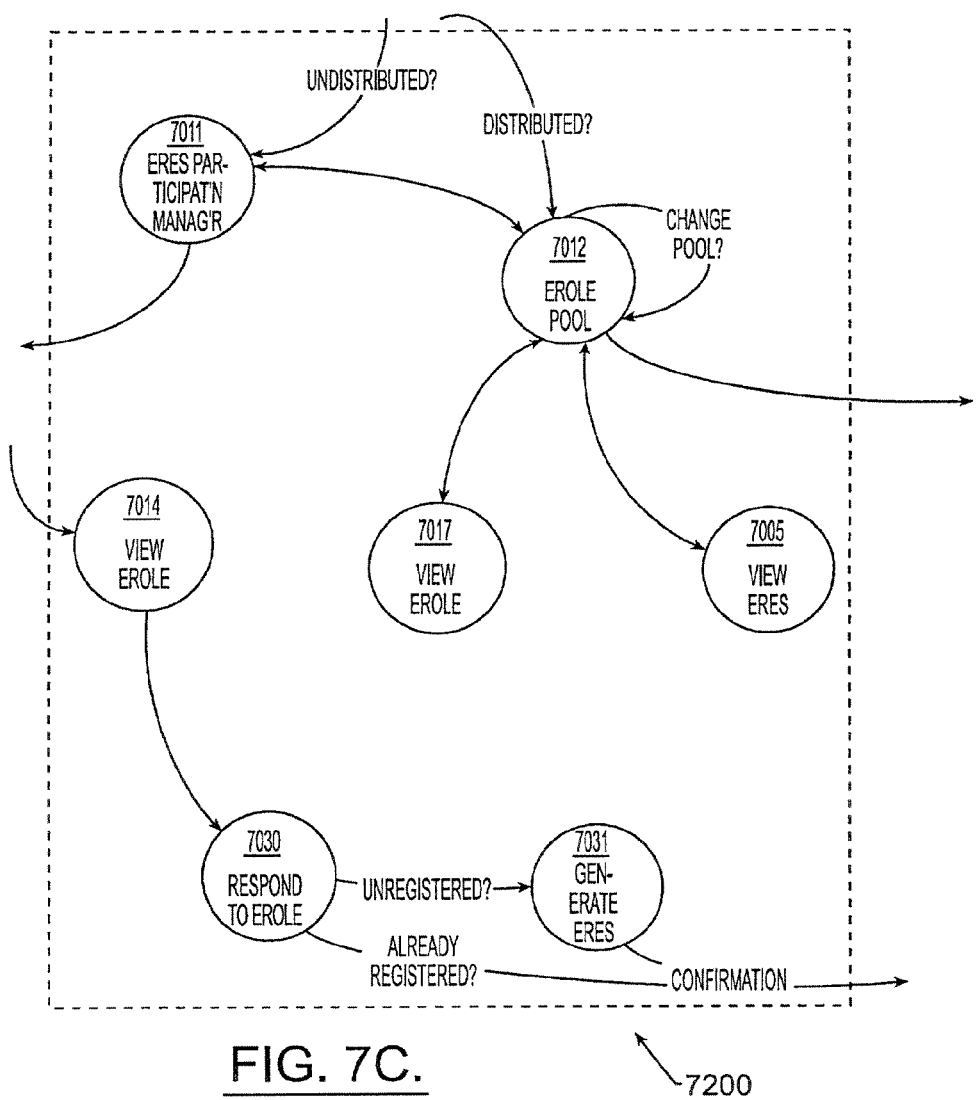
Figure 8A:
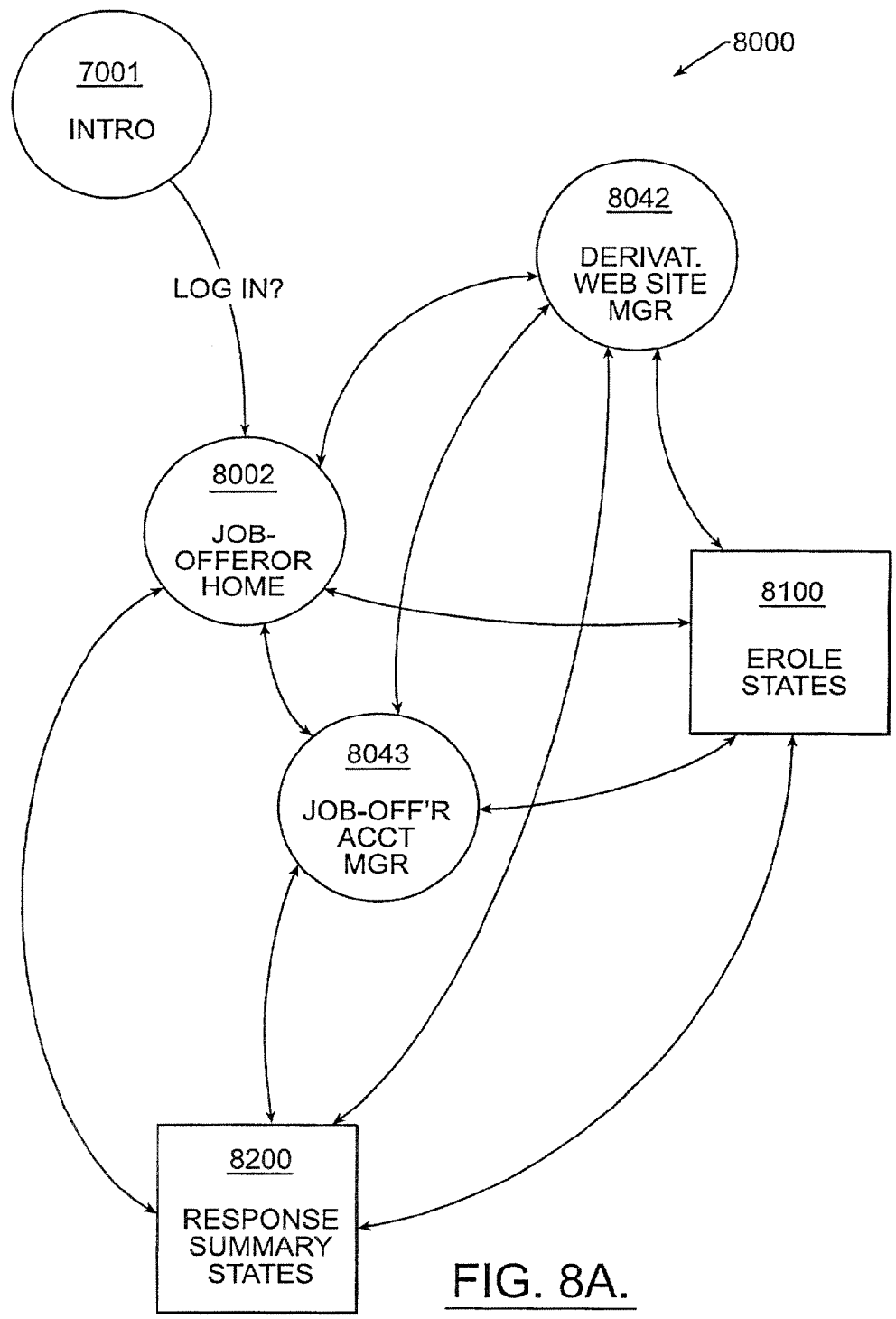
FIGS. 8A-8C are state diagrams illustrating the job-offeror interface of the system of the present invention.
Figure 8B:
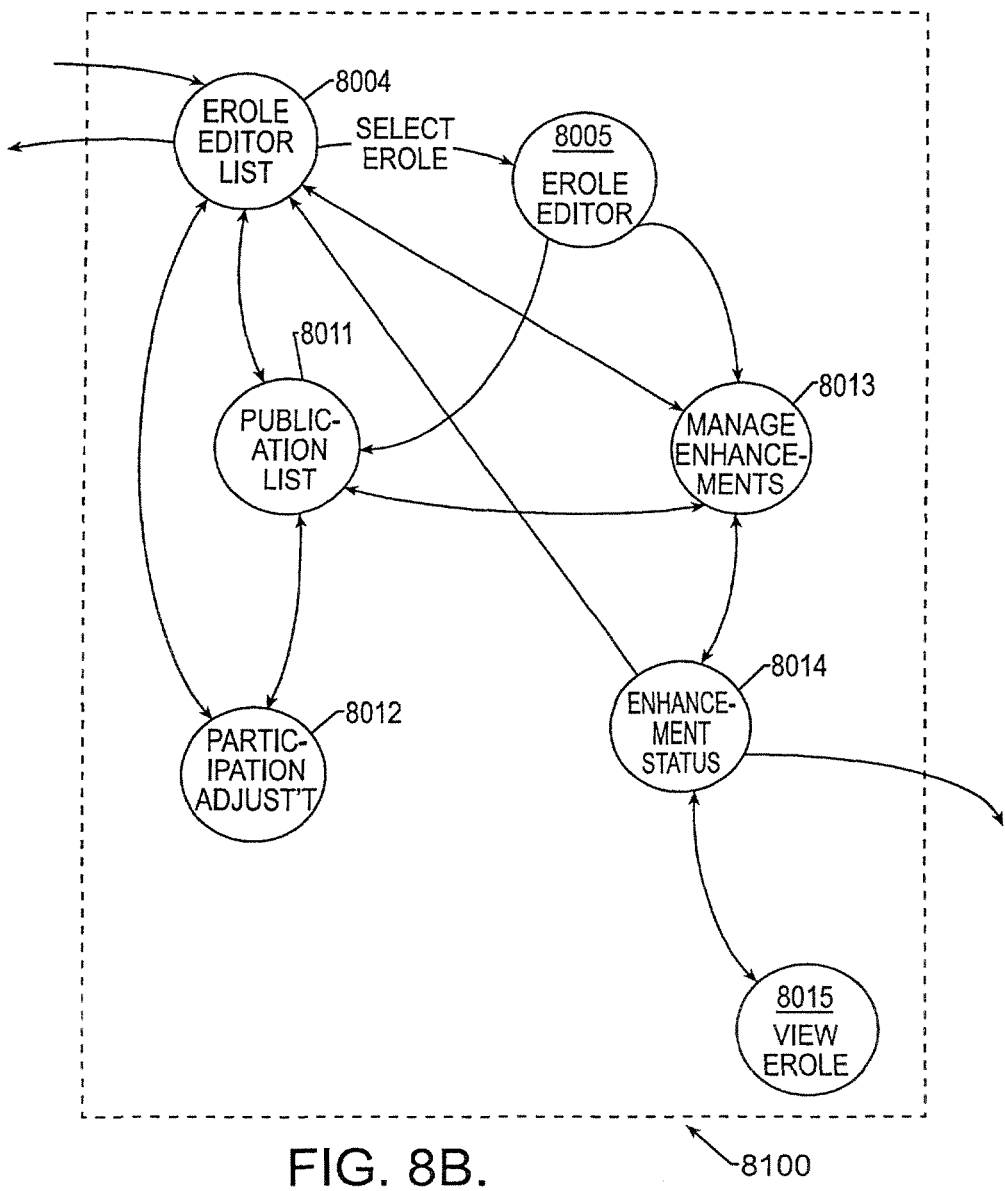
Figure 8C:
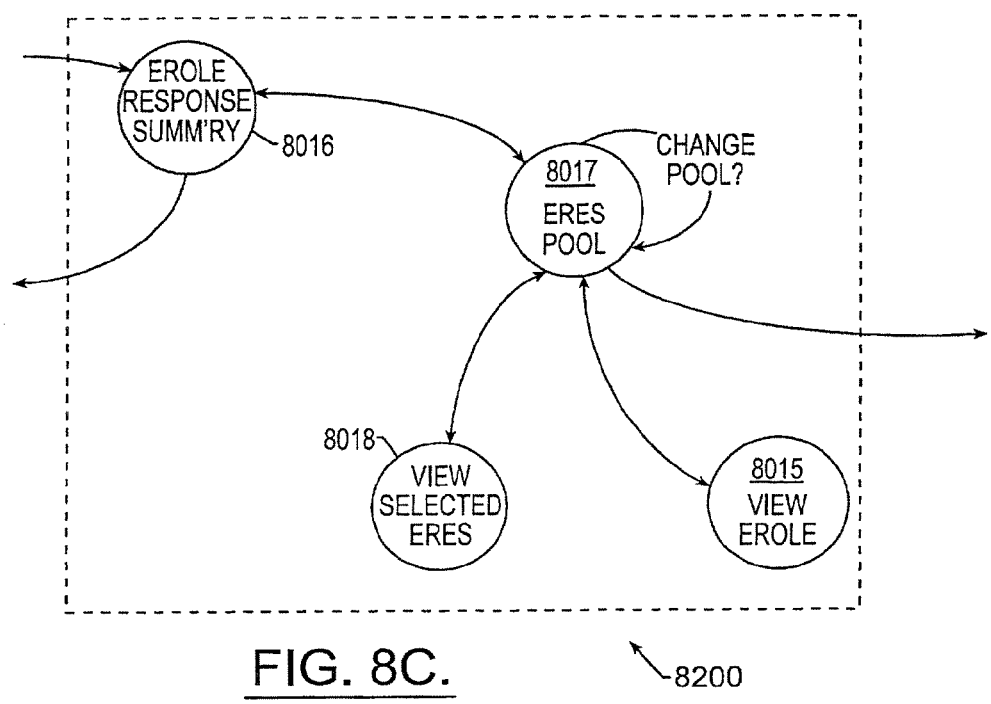

At any time before, during or after the operation of the eres management process 5000, a plurality of erole owners may also utilize the software system 40 to manage their respective eroles 410. FIGS. 6A and 6B illustrate steps taken by an erole owner in conjunction with the job-offeror interface 8000 and other components of the software system 40 of the present invention in executing the erole management process 6000. The steps shown represent only the general sequence of steps to be followed by an erole owner, and it should be clear that an erole owner may choose to carry out only a subset of the steps at a given time, and that an erole owner may choose to carry out many of the steps in a different sequence from that shown and described. The purpose of introducing the erole management process 5000 at this juncture is merely to provide an overview of how eroles 410 are managed using the system of the present invention.

To utilize the software system 40, an erole owner first registers with the system 20 through an affiliated system 30 at step 6005. The erole owner may accomplish this by, for example, directing a web browser on his computer to a particular web page designated by the owner of the affiliated system 30. Erole owners who have not previously registered may be asked to provide information such as a name, an organization name, an email address, and the like, and are issued an erole owner identifier. Each erole owner identifier is created to be unique across the entire system 20, so that the same erole owner identifier may be used with regard to any affiliated system 30. In addition, each erole owner is allowed to select a password for use in conjunction with the organization identifier in accessing the rest of the affiliate's web site. Erole owners who have previously registered may access the system 40 merely by entering the erole owner identifier and password.

Once registered, an erole owner next proceeds at step 6010 to select an erole 410 for further operations. An erole owner may define multiple eroles 410, each of which represents a particular job opening the erole owner wishes to fill. Each erole 410 is associated with only one erole owner identifier, and a user is only permitted to modify eroles 410 associated with the user's erole owner identifier. Each erole 410 may further be identified by an erole identifier, which may incorporate the erole owner identifier. Because each erole identifier is unique, an erole owner may access and edit his eroles 410 through any affiliated system 30. In selecting an erole 410 at step 6010, the erole owner may choose to define a new erole 410 or to update an existing erole 410. In either case, the erole owner next proceeds at step 6015 to edit the selected erole 410.

As described elsewhere, each erole 410 includes a job description segment 412 and a candidate description segment 411, each of which contains a plurality of information. Once at least part of the job description and candidate description segments 412, 411 of the erole 410 have been satisfactorily defined or updated, respectively, the erole owner may then define, as part of the editing process of step 6015, the relative importance given by the erole owner to a variety of match factors related to other portions of the erole 410. As stated previously, a match factor represents the relationship between a criteria in an eres 405 and a corresponding criteria in an erole 410. The erole owner may assess each factor related to the job description segment 412 of the erole 410 on the basis of how important it is to the erole owner that an eres 405 express a preference for a particular job characteristic defined in the erole 410. In addition, the erole owner may assess each factor related to the candidate description segment 411 of the erole 410 on the basis of how important it is to the erole owner that a particular candidate characteristic defined in the eres 405 match the candidate description segment 411 of the erole 410. If appropriate enhancement objects 430, 435 are utilized, the erole owner may also define the relative importance of match factors associated with characteristics of the erole enhancement objects 435 on the basis of how important it is to the erole owner that it match characteristics of a corresponding or reciprocal eres enhancement object 430 associated with the eres 405. Once established, the match factor preference settings 416, also referred to as intelligent agent settings, are utilized by the intelligent agent 415 to match the erole 410 to eres 405 in the eres database 165.

Advantageously, the erole owner may control the importance to be given each match factor in two ways. First, the erole owner may specify that only eres 405 which satisfy particular factors be considered when matching eres 405 to the owner's erole 410. Preferably, an owner may make such a specification for each factor individually by setting a "must" indicator for each desired factor. If the erole owner is willing to consider eres 405 which do not meet a particular factor, then the "must" indicator may be deselected by the owner. Second, the erole owner may also set relative weights to be accorded each factor by the software system 40 when attempting to match eres 405 stored in the system 20 to the owner's erole 410. When used in conjunction with the "must" feature, relative weights may logically be applied only to those factors which are not required to be met by the owner. A suitable range of weights may be defined by one of ordinary skill in the art, and may include, but is not limited to, a graphical sliding scale which is manipulable by the erole owner, a range of values from which the erole owner may select a suitable entry, a series of text entries representing a plurality of choices, or the like.

Once the erole owner has finished editing the job description segment 412, the candidate description segment 411, and the match factor preferences of the selected erole at step 6015, the erole owner has the option at step 6017 of returning to step 6010 to select another erole 410 to be defined or updated at step 6015. It should be noted that although the process of assessing match factors and establishing the intelligent agent settings 416 has been described as being part of the process of editing the erole 410, it should be obvious that the process of assessing the match factors and establishing the intelligent agent settings 416 could alternatively be understood as a separate step or process which is distinct from the remainder of the erole edit process.

If at step 6017 the erole owner has completed the process of defining and updating eroles 410 for his organization, the erole owner next proceeds to steps 6018-6020 to set the participation status for each of the organization's eroles 410. Beginning at step 6018, the owner may select an erole 410 for the purpose of updating the erole's participation status. Preferably, the owner may select the desired erole 410 from a list of all of the organization's eroles 410. The list may also include the current participation status of each erole 410 in one or more publishing programs. Having selected an erole 410, the erole owner next proceeds to step 6020 to control the participation status of the erole 410 selected in step 6018. In a preferred embodiment, a plurality of publishing programs are available to the erole owner, including at least one direct-connection program and an affiliate publishing program. The effect of publishing the erole 410 in a direct-connection program is to permit job-seekers to immediately view the erole 410 regardless of whether the content of the eres 405 matches the content of the erole 410. In one direct-connection program, the eres owner identifies a particular erole 410 to which he wishes his eres 405 to be distributed by entering a unique reference ID corresponding to the selected erole 410 into any affiliate's job-seeker interface 7000 as described previously. In another direct-connection program, the eres owner searches for suitable eroles 410 by formulating an ad hoc query, and then selects from that list a particular erole 410 to which he wishes his eres 405 to be distributed. The use of ad hoc queries and the ad hoc query program is more fully discussed elsewhere. The effect of publishing the erole 410 in an affiliate publishing program is to permit the software system 40 to attempt to match those eres 405 which have been distributed in the owner's current affiliate to the selected erole 410 using the intelligent agent settings 416 established by the erole owner in step 6015. It should be noted that the publishing programs are not mutually exclusive, so at step 6020 the erole owner may publish the selected erole 410 through both the reference ID program and the affiliate publishing program.

The affiliate publishing program may preferably include at least four participation status options. In a first option, the erole 410 does not participate at all. When an erole 410 is non-participating, the erole 410 is not published at all in the marketspace corresponding to the current affiliate. By remaining non-participating in all marketspaces, a user may create and store eroles 410 in the system 20 without being considered in the matching process. In a second option, the erole 410 is subscribed. This enables an owner to view eres 405 which are distributed in the erole owner's current marketspace and which are matched with the selected erole 410 by the matching process, but prohibits eres owners from viewing the designated erole 410 at all. Optionally, the erole owner may be prevented from viewing contact information contained within or associated with the eres 405 in order to prevent owners of unpublished eroles 410 from contacting eres owners. In a third option, the erole 410 is selectively published. This enables an owner to view eres 405 which are distributed with the erole owner's current marketspace and which are matched with the selected erole 410 by the matching process, but prohibits eres owners from viewing the designated erole 410 unless the erole owner chooses to allow the eres owner to access the erole 410. In a fourth option, the erole 410 is fully published. This enables an erole owner to view all matching eres 405 which are distributed with the current affiliated system 30 and which are either automatically or selectively published to him, and to automatically publish the erole 410 to the owners of all matching eres 405.

Further steps carried out by the erole owner are dependent on whether at step 6025 the erole 410 is to be published through any of the publishing programs or not. If the erole 410 is to be kept non-participating, then the erole owner has the option at step 6031 of setting the participation status of a different erole 410. If the owner wishes to set the participation status of a different erole 410, then the erole owner may return to step 6018 to select another erole 410. Otherwise, the erole owner proceeds next to steps 6077-6090 to view the eres 405 associated with each erole 410.

On the other hand, if at step 6025 the erole 410 is to be published through the reference ID program, or in the current marketspace through the affiliate publishing program, then further steps are next dependent on which particular programs are utilized to publish the erole 410. As is more fully discussed elsewhere, if an erole 410 is published through the reference ID program, any type of user may view the erole 410 merely by entering, if known, its corresponding reference ID. Alternatively, if an erole 410 is published through the ad hoc query program, any type of user may view the erole 410 merely by selecting the erole 410 from a query match list created as the result of an appropriately-formulated query. Users who are eres owners may further wish to distribute their eres 405 to the erole 410 using the direct-connection mechanism of either the reference ID program or the ad hoc query program. At step 6026, if the erole 410 is currently or ever was published through the reference ID program or the ad hoc query program, and if, as a result, any eres 405 have, in fact, been distributed to the erole 410 through either program, then at step 6027, the software system 40 may be used to examine all eres 405 which were received through either program and to identify, without eliminating, those eres 405 which have match factors for which the erole owner has set the "must" indicator, and also to identify, without eliminating, those eres 405 which have match factors that are not met by the selected erole 410. Further, at step 6028 each such eres 405 is placed in the reference ID eres pool 425 for that particular erole 410 and scored according to how closely it matches the erole 410, taking into consideration the weights given the various match factors by the erole 410.

Although not illustrated, it should be obvious that the software system 40 may optionally allow users to choose at step 6020 whether to allow their erole 410 to participate by being queried by eres owners. This could be implemented by adding an additional step to determine if any eres 405 had been distributed to the erole 410. An eres owner could have accomplished this by formulating a query, selecting the erole 410 from the resulting query match list and then choosing to respond directly to the erole 410. If so, then the software system 40 would likewise be used to identify, without eliminating, all such eres 405 which do not meet those match factors for which the erole owner has set the "must" indicator, and also to identify, without eliminating, all eres 405 which have match factors that are not met by the erole 410 and for which the "must" indicator has been set. Further, each such eres 405 would be placed in a erole owner's reference ID pool 425 or other direct-connection pool 425 and scored according to how closely it matches the erole 410, taking into consideration the weights given the various match factors by the erole 410.

Whether or not at step 6026 the erole 410 is published through either the reference ID program or the ad hoc query program, and whether or not any eres 405 are distributed to the erole 410 as a result (or, if implemented, whether or not the erole 410 is published or distributed directly to any eres 405 through the ad hoc query program), further steps are next dependent at step 6029 on whether the erole 410 is to be published to matching eres 405 distributed in the marketspace corresponding to the current affiliated system 30. If not, then the erole owner may return at step 6031 to select a different erole 410 at step 6018. However, if the erole 410 is to be published to owners of eres distributed within the current marketspace, then the software system 40 is used to match and score eres at steps 6030-6075, as next described.

Beginning at step 6040, the software system 40 identifies the first matching eres 405 and then proceeds at step 6045 to examine the affiliate publishing status of the identified eres 405. If at step 6050 it is determined that the eres owner has chosen to automatically distribute the identified eres 405 to all matching eroles 410, then the eres 405 is included in the current affiliate's matching eres pool 425 and at step 6060 the software system 40 proceeds to determine whether there are any more matching eres 405 to consider. On the other hand, if at step 6050 it is determined that the eres owner has not chosen to fully distribute the identified eres 405, then at step 6065 the software system 40 determines whether the erole 410 has been automatically published. If the erole 410 is not automatically published, then the identified eres 405 is eliminated from the current affiliate eres pool 425, and the software system 40 proceeds at step 6060 to determine whether there are any more matching eres 405 to consider. On the other hand, if at step 6065 the erole 410 is automatically published, then the software system 40 next proceeds at step 6070 to determine whether the owner of the identified eres 405 has chosen to distribute the eres 405 to the erole 410. If so, the identified eres 405 is included in the current affiliate's matching eres pool 425, and at step 6060 the software system 40 determines whether there are any more matching eres 405 to consider. However, if the owner of the eres 405 has not chosen to distribute the eres 405 to the erole 410, then the identified eres 405 is eliminated from the pool 425 at step 6056 and the software system 40 proceeds at step 6060 to determine whether there are any more matching eres 405 to consider.

If at step 6060 the software system 40 determines that there are other matching eres 405 to consider, then the software system 40 at step 6075 identifies the next matching eres 405 and returns to step 6045 to examine the affiliate publishing status of the identified eres 405. On the other hand, if at step 6060 the software system 40 determines that there are no other matching eres 405 to consider, then at step 6030 the software system 40 examines eres 405 in the current marketspace and eliminates from further consideration all eres 405 which do not meet those match factors for which the erole owner has set the "must" indicator, and also eliminating all eres 405 having match factors which are not met by the erole 410 and for which the "must" indicator has been set. Next, at step 6035, the software system 40 scores each remaining eres 405 according to how closely it matches the erole 410, taking into consideration the weights given the various match factors by the erole owner. After each remaining eres 405 is scored, then the owner once again has the option at step 6031 of returning to step 6018 to set the publication status of a different erole 410.

If the owner chooses not to select another erole 410, then the erole owner proceeds next to view, organize and analyze the eres 405 associated with each erole 410 to steps 6077-6090. Beginning at step 6077, the owner may review, for each publishing program, a list of all of the eroles 410 which have been published with the respective publishing program. Because each erole 410 may preferably be published with more than one publishing program, an erole 410 may appear on more than one of the lists. At step 6078, the owner selects one of the eroles 410 on one of the lists for the purpose of viewing the eres 405 associated with that erole 410 through its respective publishing program. At step 6080, the erole owner proceeds to view all of the eres 405 which have are included in the respective eres pools 425, one pool at a time. Within each eres pool 425, the included eres 405 may be organized into tiers In a direct-connection eres pool 425, those eres 405 which did not meet "must" criteria are preferably placed in a separate tier from those eres 405 which did. Next, at step 6085, the erole owner may utilize the software system 40 to organize and analyze the eres 405 which are in the respective eres pools 425 until the erole owner chooses at step 6090 to either select a different erole 410 or exit the software system 40. At step 6090, if the erole owner chooses to select a different erole 410, then the owner may return to step 6078 to select a different erole 410. On the other hand, if at step 6092 the owner chooses not to select an erole 410, then the owner may exit the software system 40.

The Job-Seeker Interface

FIGS. 7A-7C and 8A-8C are state diagrams of the job-seeker interface 7000 and job-offeror interface 8000, respectively, of the system of the present invention. The job-seeker interface 7000 and job-offeror interface 8000 are those parts of the system which allow users to create and store eres 405 and eroles 410, respectively; to interact with the intelligent agent 415; and to view and analyze erole pools 420 and eres pools 425, respectively as described with respect to the eres management process 5000 illustrated in FIGS. 5A-5B and the erole management process 6000 illustrated in FIGS. 6A-6C, respectively. In the diagrams, each circle represents a state in which a user has one or more options for either performing an action within the current state or for proceeding to another state. If the user chooses to perform an action within his current state, the action is performed and the user remains in the current state. If the user chooses to proceed to another state, as represented by an arrow leading from the current state to the new state, the user is transferred from his current state to the chosen state, and a new set of options becomes available to the user. A description of the states of a preferred embodiment of the job-seeker interface 7000 and their inter-relationship is described next. In the preferred embodiment, each state could represent one or more web page, one or more screen in a graphical user interface (GUI), or the like.

As shown, a user of either the job-seeker interface 7000 or the job-offeror interface 8000 first enters an affiliate introduction state 7001. The affiliate introduction state 7001 may serve as an introduction to the system of the present invention to both job-seeker users and job-offeror users and functions as a common entry point for either user type. However, the meaningful options which are available to the user at affiliate introduction state 7001 may depend on the type of user. As described previously, in a preferred embodiment, eroles 410 representing job openings may be made available to job-seekers in at least two ways. First, job-seekers and other users may view a particular erole 410 directly merely by specifying a unique reference ID which corresponds to the desired job opening or by selecting the erole 410 from a list generated by querying the database 170. Second, any job-seeker wishing to develop his own eres 405 in order to utilize the matching capabilities of the software system 40 or to respond to an erole 410 must identify himself to the software system 40 by entering a corresponding identifier into the software system 40.

Generally, any user may access a particular erole 410 directly if they know the reference ID for that erole 410. In a preferred embodiment, however, reference IDs are more likely to be utilized by job-seeker users to access a particular erole 410 advertised elsewhere than by a job-offeror user. Alternatively, any user may query the erole database 170 to identify eroles 410 having particular criteria, and may then access particular eroles 410 directly by selecting them from the query match list. In addition, job-seeker users and job-offeror users may both log into their respective system interfaces 7000, 8000 through the affiliate introduction state 7001. Thus, in the affiliate introduction state 7001, the interfaces preferably provide users with both an efficient method of logging into the system and methods for accessing an erole 410 using a reference ID or via an appropriate query.

If the user wishes to access an erole 410 using a reference ID, then the job-seeker interface 7000 proceeds to an individual introduction state 7002. In the individual introduction state 7002, the user has the options of viewing graphically displayed information about the system 20, logging into the job-seeker interface 7000 of the system, entering a reference ID or formulating a query. If the user chooses to formulate a query, then the job-seeker interface 7000 proceeds to a query manager state 7032, whereupon the user may formulate the query itself The query comprises a series of criteria selected by the user from the common language architecture. The contents of the query may then be matched directly against all the eroles 410 stored in the erole database 170 by comparing each selected criteria to the corresponding criteria in the respective eroles 410. Those eroles 410 which include all of the selected criteria are then presented to the user in a query match list in a query match list state 7033. If the user selects one of the eroles 410 from the query match list, then the job-seeker interface 7000 proceeds to a view/respond erole state 7014 to graphically display the corresponding erole 410.

Similarly, if the user enters a reference ID, then the job-seeker interface 7000 likewise proceeds to the view/respond erole state 7014 to graphically display the corresponding erole 410. The reference ID itself may be a random, alphanumerical code, or it may incorporate all or part of the erole identifier or the erole owner identifier which corresponds to each respective erole 410. Alternatively, the reference ID may itself be URL which may be entered either directly into a user's web browser or may be entered into an interface.

Once an erole 410 is displayed in the view/respond erole state 7014, the user may choose to respond to the erole 410. If the user chooses to respond to the erole 410, then the job-seeker interface 7000 proceeds to a generate response/register state 7030. In the generate response/register state 7030, if the user is already registered and has already generated an eres 405, then the user may send the previously-stored eres 405 to the erole's reference ID pool 425 or other direct-connection pool 425 merely by providing the job-seeker interface 7000 with the user's identifier and password. Upon successful completion of this operation, the software system 40 may generate a confirmation message, and the job-seeker interface 7000 proceeds to a job-seeker home state 7003. However, if in the generate response/register state 7030 the user has not yet registered with the software system 40, the user has the option of registering with the software system 40 through the current affiliated system 30 in order to generate an abbreviated eres 405 which may then be sent to the erole's reference ID pool 425 or other direct-connection pool 425. The job-seeker interface 7000 may prompt the user to enter sufficient information about the user to generate a rudimentary eres 405. When the necessary information has been entered, the software system 40 proceeds to generate an eres 405 and forward the newly-completed eres 405 to the erole's reference ID pool 425 or other direct-connection pool 425. Upon successful completion of this operation, the software system 40 may generate a confirmation message, and the job-seeker interface 7000 proceeds to a job-seeker home state 7003.

On the other hand, if at the affiliate introduction state 7001 the user chooses to log in to the job-seeker interface 7000, then the job-seeker interface 7000 proceeds directly to the job-seeker home state 7003. In a preferred embodiment, the system interface which is provided to the user is determined on the basis of the owner identifier which is entered, but it should be clear that alternatively a user could manually select the desired interface from the affiliate introduction state 7001, or different affiliate introduction states 7001 could be provided for job-seeker and job-offeror users, respectively. In the job-seeker home state 7003, the user has the options of managing his eres 405, managing the intelligent agent 415 for his eres 405, managing his erole pools 420, entering a reference ID or generating an ad hoc query. If the user chooses to manage his eres 405, then the user proceeds to the eres editor state 7004. As described previously, each job-seeker owner is preferably allowed to maintain a single eres 405 in the eres database 165. In the eres editor state 7004 the owner is able to choose to initiate a number of actions related to his eres 405, including creating, editing and viewing his eres 405; creating and editing enhancement objects 430 and adding them to the eres 405; creating a unique web site derived from the job-seeker contextual representation 401, and the like.

If the user wishes to create or edit his eres 405, the user may utilize an editor interface which may be provided directly within the eres editor state 7004. The editor interface facilitates the entry of data into the eres 405 by prompting the user to enter appropriate information and data directly into the system 20 in an entry format corresponding to the quasi-resume format described previously. The data entry process also makes use of the common language architecture. The common language architecture utilizes a variety of mechanisms to standardize the data in the respective data files 405, 410 and to standardize the format in which that data is entered, stored and displayed. This standardization enables data files 405, 410 to be more systematically reviewed, and further allows the intelligent agent 415 to more precisely compare Category A data files 405 to Category B data files 410 by reciprocally comparing specific data entries in each Category A data file 405 to corresponding data entries in each Category B data file 410 and by comparing specific data entries in each Category B data file 410 to corresponding data entries in each Category A data file 405.

The job-seeker interface 7000 includes many types of standardization mechanisms which prompt users to enter data into their respective eres 405 in an optimal format for comparison to eroles 410 by the intelligent agent 415. By utilizing a plurality of these standardization mechanisms, the quantity of "freeform" data which is entered by users is minimized, and the job preference and resume characteristics described by the data may be more easily compared to the job and preferred candidate characteristics described by the data in eroles 410.

In a first type of a standardization mechanism, an eres owner may assign a "yes" or "no" value to a particular characteristic which either describes himself or the job he seeks. This may be implemented by graphically presenting a characteristic to the user and allowing the user to indicate that the characteristic does apply by checking a box or that it does not apply by leaving the box unmarked. In an example of this first type of standardization mechanism, users may be prompted to indicate whether or not they are interested in a job for which "flextime" is permitted by marking or leaving unmarked a box corresponding to a question directed thereto.

In a second type of a standardization mechanism, an eres owner may select the characteristic which best describes either himself or the job he seeks from a list of possible characteristics. This may be implemented by graphically presenting a plurality of characteristics to the user and allowing the user to indicate which characteristic best applies by checking the box corresponding to that characteristic, or by selecting that characteristic from a selectable list. In an example of this second type of standardization mechanism, users may be prompted to indicate the highest level of academic achievement reached by selecting from a list of "high school," "some college," "associate's degree," "bachelor's degree," "master's degree" and "doctorate degree."

In a third type of a standardization mechanism, an eres owner may select one or more characteristic which either describes himself or the job he seeks from a set of possible characteristics. This may be implemented by graphically presenting a plurality of characteristics to the user and allowing the user to indicate which, if any, of the characteristics apply by checking boxes corresponding to the respective characteristics. In an example of this third type of standardization mechanism, users may be prompted to indicate whether they are interested in working full time, part time, under contract or as a consultant, as a co-operative student or as an intern, and the users may check as many boxes as they wish.

In a fourth type of a standardization mechanism, an eres owner may select a numerical range of values within which a particular characteristic, describing either himself or the job he seeks, lies. This may be implemented by prompting the user to enter one or two numerical values corresponding to one or both of a minimum and maximum. If only one value is entered, the range may be determined implicitly as either all values greater than the entered value or all values between zero and the entered value. In one example of this fourth type of standardization mechanism, users may be prompted to enter their desired salary range, or at least a minimum salary expected. In another example of this third type of standardization mechanism, users may be prompted to enter the maximum amount of overnight travel tolerated.

In a fifth type of standardization mechanism, an eres owner may select a characteristic which either describes himself or the job he seeks from a library of characteristics. This may be implemented by providing a multi-tiered collection of choices from which the user may first choose a category and then choose from the sub-categories associated with that category and so on until the user is presented with a set of choices. In some cases, the user may repeat this selection process in order to select multiple characteristics. In an example of this fifth type of standardization mechanism, a user may select a "career focus area" which describes the type of work sought by first selecting a industry type from a collection of categories such as "Agriculture & Forestry" and "Legal Services," and if "Legal Services" is chosen, choosing from a collection of choices such as "Clerical," "Judicial," "Legal Practice," "Legal Services," "Paralegal" and "Legal-Other." It should be obvious that additional tiers of sub-categories could be included in between the industry type level and the characteristic level.

For those types of data for which standardized answers are not feasible or desirable, further standardization may also be provided by providing a uniform system of headers under which such "freeform" data may be entered. This may be implemented by prompting the user to enter information in response to specific categories of data. For example, the user may be prompted to provide a job title for each job in which the user was previously employed, or to enter a summary of tasks performed there. Thus, although the data itself is "freeform," each eres in the eres database 165 may be organized into a standard format to make manual review easier.

From the eres editor state 7004, the owner may also choose to view his current eres 405, to create or edit a unique job-seeker derivative web site, to manage eres enhancement objects 430, to return to the job-seeker home state 7003, to manage the intelligent agent 415 for his eres 405, or to manage his erole pools 420. If the owner chooses to view his current eres 405, then the interface 7000 graphically presents the current eres 405 to the owner at a view eres state 7005. If the owner chooses to create or edit a personal job-seeker derivative web site, then the job-seeker interface 7000 proceeds to determine whether the owner has already enabled such a web site. If so, then the interface 7000 proceeds directly to a derivative web site account state 7008, from which the owner may manage his personal derivative web site account. On the other hand, if no such web site has yet been enabled, then the interface proceeds to a personal derivative web site introduction state 7006. In the personal derivative web site introduction state 7006, the interface 7000 may introduce the owner to the concept and purpose of the personal job-seeker derivative web site and may illustrate the concept with a graphical or multimedia example. The job-seeker derivative web site is a set of data extracted from the eres 405, any enhancement objects 430 associated with the eres 405 and any other portions of the job-seeker contextual representation 401, including any graphical or multimedia components of the contextual representation 401. Although described herein as a web site, it should be noted that any type of data package may instead be utilized, including, for example, a set of files which may be downloaded onto a disk and sent directly to a job-offeror. The data included in the derivative web site may be all or only a portion of the data contained in the contextual representation 401, and the format of the data may take on any suitable form, including the format utilized by the software system 40 to display the eres 405 and any associated enhancement objects 430 The software system 40 provides the eres owner with a unique URL which may be utilized by any internet user to view the derivative web site. Only the owner of the eres 405 may manage the eres' corresponding web site. A system of personal derivative web sites suitable for use with the present invention is the SeeMe system of derivative web sites developed by Digital Discoveries, Inc. of Knoxville, Tenn.

From the personal derivative web site introduction state 7006, the owner may choose to request such a web site or to leave the personal derivative web site introduction state 7006 without so requesting. If the owner chooses to request a personal web site, the interface 7000 may present an order confirmation to the owner before proceeding to a derivative web site account state 7008. From the derivative web site account state 7008, the owner may access his personal derivative web site directly; extend the period of time for which the web site is active; enable or disable password protection for the web site; add, edit or remove a personal greeting for the web site, or the like. The owner may also choose to edit his current eres 405 in the eres editor state 7004, to manage eres enhancements, to return to the job-seeker home state 7003, to manage the intelligent agent 415 for his eres 405, or to manage his erole pools 420.

Returning to the eres editor state 7004, if the owner chooses to manage eres enhancement objects, the job-seeker interface 7000 proceeds to an enhancement management state 7009. The enhancement management state 7009 may introduce enhancement objects 430 which are part of the then-existing enhancement object library, provide pricing information, and provide access to other portions of the job-seeker interface 7000 or to additional interfaces in order to create or update the respective enhancement objects 430. Enhancement objects 430 and their relationship with the eres 405, the erole 410 and corresponding erole enhancement objects 435 are described elsewhere. From the enhancement management state 7009, the owner may also choose to edit his current eres 405 in the eres editor state 7004, to create or edit a unique job-seeker derivative web site in the derivative web site account state 7008, to return to the job-seeker home state 7003, to manage the intelligent agent 415 for his eres 405, or to manage his erole pools 420.

If from another state, such as the job-seeker home state 7003 or the eres editor state 7003, the owner chooses to manage the intelligent agent 415 for his eres 405, the job-seeker interface 7000 proceeds to an intelligent agent manager state 7010. As described previously, the software system 40 of the present invention compares the owner's eres 405 to every erole 410 stored in the erole database 170. As part of that comparison, the intelligent agent 415 compares the job preferences stated in the eres 405 to the job characteristics stated in each erole 410, and compares the preferred candidate characteristics in each erole 410 to the resume characteristics in the eres 405. Each characteristic or preference comparison may be analyzed by the intelligent agent 415 as a unique match factor. Each erole 410 may then be assessed by the intelligent agent 415 as a function of one or more of the match factors. Also as described previously, the job-seeker interface 7000 allows the user to affect the importance of a plurality of the match factors in at least two ways. First, a user may specify that a match factor must be satisfied by a particular erole 410 in order for that erole 410 to be associated with the eres 405 by setting the "must" indicator for that match factor. Second, the owner may specify the relative importance of satisfying the match factors which remain by setting a "weight" for each one. Table 1 is a table illustrating an exemplary set of eres criteria, the corresponding weighted match factors analyzed by the intelligent agent 415 (and an explanation of the effect of adjusting those weights) and the corresponding erole criteria which are examined by the intelligent agent 415 and compared to the respective eres criteria using those weights.

In the intelligent agent manager state 7010, those match factors which may be controlled as described above are graphically displayed to the user by the job-seeker interface 7000. Although as shown and described, the intelligent agent settings 417 for the eres may be set and controlled independently of the rest of the contents of the eres 405 in the separate intelligent manager state 7010, it should be obvious to one of ordinary skill that the intelligent agent settings 417 for the eres 405 may logically be included as an additional segment of the eres 405 and controlled in the eres editor state 7004. In either case, the intelligent agent settings 417 for the eres 405 may be stored in association with the eres 405 in the eres database 165.

A match factor will only be active if the eres owner has entered information in his eres 405 which corresponds to the respective match factor. Each match factor preferably has an associated "must" indicator input facility and a "weight" input facility. In a preferred default arrangement, none of the "must" indicators are initially set for the active match factors, and all of the weights for the active match factors are initially set to be equal. In the intelligent agent manager state 7010, the user has the option of setting the "must" indicator, or adjusting the weight, for any of the active match factors. Preferably, the owner may also directly access the portion of his eres 405 corresponding to any of the match factors by selecting the desired match factor. If the owner selects one of the match factors, the job-seeker interface 7000 proceeds directly to open the selected portion of the eres 405 in the eres editor state 7004. From the intelligent agent manager state 7010, the owner may also choose to edit his current eres 405 in the eres editor state 7004, to return to the job-seeker home state 7003, or to manage his erole pools 430.

As described elsewhere, a pool of eroles 420 is comprised of those eroles 410 which have been published through a particular publishing program and which have become associated with the owner's erole 410. Preferably, an erole 410 may be published to eres owners through a plurality of programs, so the erole 410 may be included in more than one pool 420. Also preferably, the programs include at least an affiliate publishing program and a reference ID program, and the rules for associating an erole 410 with an eres 405 depend on the program. In an affiliate publishing program of the present invention, an erole 410 cannot become associated with the owner's eres 405 unless the owner distributes his eres 405 to the erole 410 and the erole 410 and the eres 405 match each other. In a reference ID program, an erole 410 cannot become associated with the owner's eres 405 unless an eres owner first responds to the erole 410 with his eres 405.

If the user chooses to manage his erole pools 420, then the next state entered by the job-seeker interface 7000 may depend on whether or not any eroles 410 are currently associated with the user's eres 405 through the publishing program corresponding to the selected erole pool 420. If there are currently one or more eroles 410 associated with the eres 405 in the chosen pool 420, then the job-seeker interface 7000 proceeds directly to the pool manager state 7012. On the other hand, if there are not any eroles 410 associated with the user's eres 405 in the chosen pool 420, then the next state entered by the job-seeker interface 7000 may depend on the publishing program corresponding to the selected erole pool 420. In a preferred embodiment, if the selected erole pool 420 is the pool corresponding to the reference ID program, then the job-seeker interface 7000 may proceed directly to the pool manager state 7012 but with a message to the user indicating that the user has not responded to any eroles 410. However, if the selected erole pool 420 is the pool corresponding to the affiliate publishing program, then the job-seeker interface 7000 may proceed first to an eres distribution manager state 7011. In the eres distribution manager state 7011, the user can control the participation status of his eres 405 with regard to eroles 410 published within the marketspace corresponding to the user's current affiliated system 30. The user can choose whether to view all matching eroles 410 published in the current marketspace and to automatically distribute his eres 405 to their owners, to view all matching eroles 410 published within the current marketspace but to selectively distribute his eres 405 only to the owners of those eroles 410 he selects, or to neither view any eroles 410 published within the current marketspace nor distribute his eres 405 to any job-offerors through the current affiliated system 30 at all. Once the user has set his participation status for the marketspace corresponding to the current affiliated system 30, the user may choose to manage his eres 405, to return to the job-seeker home state 7003, or to proceed to the pool manager state 7012.

It should be noted that an eres owner may wish to set the participation status for his eres 405 differently in different marketspaces. For example, if separate marketspaces were defined for two neighboring geographic areas, the eres owner might choose to have his eres 405 participate in both marketspaces and only those two marketspaces. Because the participation status of the eres 405 for each marketspace may be set independently, the eres owner needs only to utilize the eres distribution manager state 7011 to publish the eres 405 in the two neighboring marketspaces, and to remain unpublished in all other marketspaces. This may be accomplished by registering first in one marketspace and setting the participation status for the eres 405 with regard to that marketspace in the eres distribution manager state 7011 of the software system 40 for that marketspace, and then by registering in each additional marketspace and setting the participation status for the eres 405 with regard to each as desired.

As described previously, when comparing eroles 410 to a particular eres 405, the intelligent agent 415 analyzes a series of match factors representing comparisons of specific characteristics and preferences in the respective eres 405 and eroles 410. In effect, when performing this comparison, the intelligent agent 415 also considers as an additional match factor the respective marketspaces of each erole 410 in relation to the marketspace of the eres owner's current affiliated system 30. The marketspace of each affiliated system 30 has a unique identifier. If the eres owner has chosen to distribute his eres 405 through the current affiliated system 30, then the marketspace identifier corresponding to the current affiliated system 30 is set for the owner's eres 405. Similarly, each erole 410 stored in the erole database 170 may have one or more marketspace identifiers corresponding to the respective marketspaces in which that erole 410 is published. Thus, as the intelligent agent 415 considers each erole 410 in turn as a possible match for the owner's eres 405, the intelligent agent 415 examines the marketspace identifiers set for each erole 410 to determine whether that erole 410 was published in the marketspace corresponding to the eres owner's current affiliated system 30. In effect, the marketspace identifiers are treated as "must" conditions which must be met in order for a match to be found between the owner's eres 405 and a particular erole 410.

In the pool manager state 7012, the job-seeker interface 7000 displays a list of all of the eroles 410 which currently make up a particular pool 420. In one embodiment, when the user first enters the pool manager state 7012, the job-seeker interface 7000 defaults to display the contents of the affiliate publishing pool 420 of the user's current affiliate. Thus, the contents of the current affiliate's publishing pool 420 are initially presented to the user. However, it should be clear that the pool 420 of another publishing program may be used as the default pool instead. In addition, the user preferably has the option of managing a different erole pool 420 in the pool manager state 7012 at any time, wherein the different erole pool 420 corresponds to a different publishing program.

In addition to switching to a different erole pool 420, the owner also has the options of viewing his eres 405, viewing the contents of a particular erole 410, controlling the way the eroles 410 are displayed, and the like. If the owner chooses to view his eres 405, then the job-seeker interface 7000 graphically presents the current eres 405 to the user in the view eres state 7005. If the user selects a particular erole 410 for viewing, the erole 410 is graphically displayed to the user by the job-seeker interface 7000 in a view/rate erole state 7017.

Preferably, when viewing an erole 410 in the view/rate erole state 7017, the user has the option of rating the erole 410 on a scale. In one embodiment, the scale is a numerical scale, and the user may attribute whatever meaning he chooses to the numbers on the scale. Also preferably, when viewing an erole 410 in the view/rate erole state 7017, the user may advance forward or backward to the next or previous erole 410 in the pool 420. When finished, the user may return to the current pool 420 in the pool manager state 7012.

Preferably, the user may control a plurality of aspects of how the eroles 410 in the current pool 420 are displayed. In a first aspect, the user may choose the number of eroles 410 which are displayed at one time. In a second aspect, the user may choose the ordering methodology used to present the matching eroles 410 to the user. Advantageously, in a first ordering methodology, the matching eroles 410 may be arranged into tiers based on how closely they match the eres 405. In a preferred embodiment, there are five tiers, but it should be clear that other numbers of tiers may be used. The tiers are listed in order from the tier containing the eroles 410 which most closely match the eres 405 to the tier containing the eroles 410 which most minimally match the eres 405, and within each tier the eroles 410 are similarly listed on the basis of how closely they match the eres 405. If the pool 420 includes eroles 410 to which the user has chosen to distribute his eres 405 through the reference ID program, those eroles 410 which did not meet "must" criteria are preferably placed in a separate tier from those eroles 410 which did. In another ordering methodology, the user may rate the eroles 410 on a scale, and the eroles 410 may be arranged according to the ratings given. Preferably, a standard scale may be provided, and the user may assign whatever meaning he chooses to the units on the scale. In a third ordering methodology, the eroles 410 may be ordered on the basis of whether they have or have not been viewed by the user yet. In a fourth ordering methodology, the eroles 410 may be ordered on the basis of when they arrived in the job-seeker's erole pool 420. In a fifth ordering methodology, the eroles 410 may be ordered on the basis of the amount of time which has elapsed since the erole owner last utilized the system 20. The fourth and fifth methodologies may also be enhanced through the use of graphical indicators of the age of each erole 410 or the elapsed time since each erole owner last utilized the system 20. In one example of a graphical indicator, one or more shades of the color yellow could be applied to each erole 410 displayed in the pool 420 to indicate eroles 410 that are older or younger than others by mimicking the effects of light on a piece of paper over time; i.e., an erole 410 colored with a darker shade of yellow would be understood to be older than an erole 410 colored a lighter shade of yellow or colored white. In another example of a graphical indicator, the edges of each erole 410 displayed might be blurred or distorted differently to indicate eroles 410 that are older or younger than others by mimicking the effects of physically handling a piece of paper over time; i.e., an erole 410 that is displayed with severely distorted edges would be understood to have been viewed more frequently by a user, or is older, than an erole 410 which has precisely defined edges as viewed in the job-seeker interface 7000. Either of these techniques, or others not described herein, may also be applied when viewing individual eroles in the view/rate erole state 7017. Finally, in addition to choosing the ordering methodology employed, the user is also preferably able to control how many eroles 410 are viewed at a time. Additional aspects may also be provided.

The Job-Offeror Interface

If at the affiliate introduction state 7001 the user chooses to log in to the job-offeror interface 8000, then the user proceeds to the job-offeror home state 8002. As described previously, in a preferred embodiment, the system interface which is provided to the user is determined on the basis of the owner identifier which is entered, but it should be clear that alternatively a user could manually select the desired interface from the affiliate introduction state 7001, or different affiliate introduction states 7001 could be provided for job-seeker and job-offeror users, respectively. In the job-offeror home state 8002, the user has the options of managing his organization's eroles 410 including the eroles' respective intelligent agent settings 416, managing responses to his organization's respective eroles 410, creating a unique organizational job opening derivative web site, managing the job-offeror account or switching to a different affiliate. If the user chooses to manage his organization's eroles 410, then the job-offeror interface 8000 proceeds to the erole editor list state 8004. As described previously, an organization is preferably allowed to maintain as many eroles 410 as desired in the erole database 170. In the erole editor list state 8004 the user is able to view the status of all of the organization's currently-defined eroles 410, to create a new erole 410 or to edit an existing erole 410. If the user chooses to create or edit an erole 410, the job-offeror interface 8000 proceeds directly to the erole editor state 8005. The job-offeror interface 8000 prompts the user to enter appropriate information and data directly into the system 20 through the interface 8000 in a format which corresponds directly to the format utilized by the system 20 for eres 405.

In an exemplary embodiment, the erole may be divided into a plurality of sections, and a separate graphical display is provided to the user for each section. Also preferably, a user may access any of the sections directly and independently in order to input, edit or view the information items associated therewith. Sections may include, but are not limited to, the following: the organization, the work involved, past experience desired of applicants, education and training desired of applicants, and knowledge and skills desired of applicants.

The entry of data into each erole 410 is facilitated by the use of the common language architecture. As described previously, the common language architecture utilizes a variety of mechanisms to standardize the data in the respective data files 405, 410 and to standardize the format in which that data is entered, stored and displayed. This standardization enables data files 405, 410 to be more systematically reviewed, and further allows the intelligent agent 415 to more precisely compare Category A data files 405 to Category B data files 410 by reciprocally comparing specific data entries in each Category A data file 405 to corresponding data entries in each Category B data file 410 and by comparing specific data entries in each Category B data file 410 to corresponding data entries in each Category A data file 405.

The job-offeror interface 8000 includes many types of standardization mechanisms which prompt users to enter data into their respective eroles 410 in an optimal format for comparison to eres 405 by the intelligent agent 415. By utilizing a plurality of these standardization mechanisms, the quantity of "freeform" data which is entered by users is minimized, and the job and preferred candidate characteristics described by the data may be more easily compared to the job preference and resume characteristics described by the data in the eres 405.

The types of standardization mechanisms are similar to those described previously with respect to the job-seeker interface 7000. In a first type of a standardization mechanism, an erole owner may assign a "yes" or "no" value to a particular characteristic which either describes the job being offered or the candidate being sought. In a second type of a standardization mechanism, an erole owner may select the characteristic which best describes either the job being offered or the candidate being sought from a list of possible characteristics. In a third type of a standardization mechanism, an erole owner may select one or more characteristic which either describes the job being offered or the candidate being sought from a set of possible characteristics. In a fourth type of a standardization mechanism, an erole owner may select a numerical range of values within which a particular characteristic, describing either the job being offered or the candidate being sought, lies. In a fifth type of standardization mechanism, an erole owner may select a characteristic which either describes the job being offered or the candidate being sought from a library of characteristics. Reference should be made to the description of the job-seeker interface section for further description of the various mechanisms.

Further, for those types of data for which standardized answers are not feasible or desirable, further standardization may also be provided by providing a uniform system of headers under which such "freeform" data may be entered. This may be implemented by prompting the user to enter information in response to specific categories of data. For example, the user may be prompted to provide a title for the job referenced by the erole 410, or to enter comments regarding a particular entry in the erole 410. Thus, although the data itself is "freeform," each erole in the erole database 170 may be organized into a standard format to make manual review easier.

As described previously, the software system 40 of the present invention compares each of the user's eroles 410 to every eres 405 stored in the eres database 165. As part of that comparison, the intelligent agent 415 compares the preferred candidate characteristics stated in the erole 410 to the resume characteristics stated in each eres 405, and compares the job preferences in each eres 405 to the job characteristic stated in each erole 410. Each characteristic or preference comparison may be analyzed by the intelligent agent 415 as a unique match factor. Each eres 405 may then be assessed by the intelligent agent 415 as a function of one or more of the match factors. Also as described previously, the job-offeror interface 8000 allows the user to affect the importance of a plurality of the match factors in at least two ways. First, a user may specify that a match factor must be satisfied by a particular eres 405 in order for that eres 405 to be associated with the erole 410 by setting the "must" indicator for that match factor. Second, the user may specify the relative importance of satisfying the match factors which remain by setting a "weight" for each one. Table 2 is a table illustrating an exemplary set of erole criteria, the corresponding weighted match factors analyzed by the intelligent agent 415 (and an explanation of the effect of adjusting those weights) and the corresponding eres criteria which are examined by the intelligent agent and compared to the respective erole criteria using those weights.

Those match factors which may be controlled as described above may be graphically displayed to the user in a facility of the job-offeror interface 8000. Although as shown, the intelligent agent settings 416 for the erole 410 may be logically be included as an additional segment of the erole 410 and controlled in the erole editor state 8005, it should be obvious to one of ordinary skill that the intelligent agent settings 416 could alternatively be set and controlled independently of the rest of the contents of the erole 410 in a separate intelligent agent manager state. In either case, the intelligent agent settings 416 for the erole 410 may be stored in association with the erole 410 in the erole database 170.

A match factor will only be active if the erole owner has entered information in the erole 410 which corresponds to the respective match factor. Each match factor preferably has an associated "must" indicator input facility and a "weight" input facility. In a preferred default arrangement, none of the "must" indicators are initially set for the active match factors, and all of the weights for the active match factors are initially set to be equal. In the intelligent agent control facility, the user has the option of setting the "must" indicator, or adjusting the weight, for any of the active match factors. Preferably, the user may also directly access the portion of his erole 410 corresponding to any of the match factors by selecting the desired match factor. If the user selects one of the match factors, the job-offeror interface 8000 proceeds directly to open the selected portion of the erole 410 in the erole editor state 8005.

From the erole editor list state 8004 or the erole editor state 8005, the user may also choose to manage erole enhancement objects 435, to manage the publication of the organization's eroles 410, to change the publication status of one of the eroles 410, to return to the home state 8002, or to manage the eres responses to the organization's eroles 410. If the user chooses to manage erole enhancements, the job-offeror interface 8000 proceeds to the enhancement management state 8013. In the enhancement management state 8013, the job-offeror interface 8000 may introduce enhancement objects 435 which are available for attachment to eroles 410 through the job-offeror interface 8000, provide pricing information for the enhancements, and the like. Enhancement objects 435 and their relationship with the erole 410, the eres 405 and corresponding eres enhancement objects 430 are described elsewhere. From the enhancement management state 8013, the user may choose to view or update a list of the currently attached enhancement objects 435 for all his organization's eroles 410, to return to the home state 8002, to manage the content of the organization's eroles 410, to manage the publication of the organization's eroles 410, or to manage responses to the organization's eroles 410.

If the user chooses to view or update a list of the currently attached enhancement objects 435 for all his organization's eroles 410, the job-offeror interface 8000 proceeds to the enhancement status list state 8014. In the enhancement status list state 8014, the job-offeror interface 8000 may present a list of all the organization's current eroles 410 to the user along with the enhancement objects 435 which are currently attached to each. The user may choose to create an additional enhancement object 435, to edit current enhancement objects 435, or to view the respective eroles 410. If the user chooses to create or edit an enhancement object 435 for one of the eroles 410 in the list, the job-offeror interface 8000 may provide access to other portions of the job-offeror interface 8000 or to additional interfaces in order to create or update the respective enhancement object 435. If the user chooses to view a particular erole 410, then the job-offeror interface 8000 graphically presents the selected erole 410 to the user in the view erole state 8015. In addition, from the enhancement status list state 8014, the user may choose to return to the home state 8002, to manage the content of the organization's eroles 410, to manage the publication of the organization's eroles 410, or to manage responses to the organization's eroles 410.

If the user chooses to manage the participation status of the organization's eroles 410, the job-offeror interface 8000 proceeds to the publication list state 8011. In the publication list state 8011 the user is able to view the participation status of all of the organization's currently-defined eroles 410 and to select a particular erole 410 for participation status adjustment. Alternatively, the user may select an erole 410 for participation status adjustment directly from the erole editor list state 8004. In either case, the job-offeror interface 8000 proceeds to the publication adjustment state 8012.

In the participation adjustment state 8012, the user can choose to publish the erole 410 using the reference ID program, to change the affiliate publication status with regard to eres 405 distributed within the marketspace corresponding to the owner's current affiliated system 30, or to extend the current affiliate publication status with regard to the same eres 405. With regard to the affiliate publication status, an erole owner may preferably choose between viewing all eres 405 which match the selected erole 410 and automatically publishing the erole 410 to all matching eres 405 automatically, viewing all eres 405 which match the selected erole 410 and selectively publishing the erole 410 only to those matching eres 405 which are chosen by the erole owner, subscribing to all matching eres 405 without publishing the erole 410 to any eres 405, or remaining non-participating. If the user chooses to publish or subscribe the selected erole 410, then the interface may present an order confirmation to the user before returning to either the erole editor list state 8004 or the publication list state 8011.

In effect, the intelligent agent 415 also considers as an additional match factor the respective marketspaces of each eres 405 in relation to the marketspace of the erole owner's current affiliated system 30. The marketspace of the erole owner's current affiliated system 30 has a unique identifier. If the erole owner has chosen to publish or subscribe the erole 410 through the current affiliated system 30, then the marketspace identifier corresponding to the current affiliated system 30 is set for the owner's erole 410. Similarly, each eres 405 stored in the eres database 165 may have one or more marketspace identifiers corresponding to the respective marketspaces in which that eres 405 is distributed. Thus, as the intelligent agent 415 considers each eres 405 in turn as a possible match for the owner's erole 410, the intelligent agent 415 examines the marketspace identifiers set for each eres 405 to determine whether that eres 405 was distributed in the marketspace corresponding to the erole owner's current affiliated system 30. In effect, the marketspace identifiers are treated as "must" conditions which must be met in order for a match to be found between the owner's erole 410 and a particular eres 405.

Returning to the job-offeror home state 8002, if the owner chooses to create or edit a custom organizational job opening derivative web site, then the job-offeror interface 8000 proceeds directly to a organizational web site manager state 8042 which may introduce the owner to the concept and purpose of the organizational job opening derivative web site, which may illustrate the concept with a graphical or multimedia example of such a site by which the erole owner would be able to manage his web site account, and which may allow the owner to request such a web site. The organizational job opening derivative web site includes one or more job opening derivative web site and an job opening summary web page. Each job opening derivative web site is a set of data extracted from a particular erole 410, its associated enhancement objects 435 and any other portions of the job opening contextual representation 402, including any graphical or multimedia components of the contextual representation 402. Although described herein as a web site, it should be noted that any type of data package may instead be utilized, including, for example, a set of files which may be downloaded onto a disk and sent directly to a job-seeker. The data included in the web site may be all or only a portion of the data contained in the contextual representation 402, and the format of the data may take on any suitable form, including the format utilized by the software system 40 to display the erole 410 and any associated enhancement objects 435. The job opening summary web page may be a summary or list of all the eroles 410 owned by the erole owner, and provides links to each of the individual job opening derivative web sites. Thus, if the erole owner is an organization, the job opening summary web page may display all the eroles 410 representing job openings currently available within that organization. The software system 40 provides the erole owner with a unique URL which may be utilized by any internet user to view the job opening summary web page, and from the job opening summary web page, the individual job opening derivative web sites associated with therewith. Only the owner of the respective erole 410 may manage that erole's corresponding web site and the job opening summary web page. A system of job opening derivative web sites suitable for use with the present invention is the SeeUs® system of job opening derivative web sites developed by Digital Discoveries, Inc.® of Knoxville, Tenn. Once the erole owner requests that such an job opening derivative web site be established, the erole owner may, from the organizational job opening web site manager state 8042, be allowed to access the job opening derivative web site directly; extend the period of time for which the web site is active; enable or disable password protection for the web site; add, edit or remove a customized greeting for the web site; or the like. The owner may also choose to manage his organization's eroles 410 including the eroles' respective intelligent agent settings 416, to manage responses to his organization's respective eroles 410, to manage his job-offeror account or to switch to a different affiliate.

Returning to the job-offeror home state 8002, if the owner chooses to manage his job-offeror account, then the job-offeror interface 8000 proceeds to a job-offeror account manager state 8043. In the job-offeror account manager state 8043, the user may be able to define or provide account information, billing information, or the like. In addition, a user may choose to identify, to the software system 40, additional individuals or groups of individuals who should be granted access as users to the system 20. A separate identifier and password may be established for each unique user established. Once established, each user may have access to one or more portions of the system 20, with the amount and type of access permitted being controlled by one or more master users. A plurality of levels of access may be permitted. For example, some users may only be able to view content such as an organization's eroles 410 or a set of eres 405, while other users may further be able to define and edit eroles 410 for an organization, and still others may further be able to control the participation status of the various eroles 410. A master user may also be allowed to establish the particular portions of a job-seeker contextual representation 401 which may be viewed by other users. This may, for example, be defined on an enhancement object-by enhancement object 430 basis, such that one user may not be able to view or access any enhancement objects 430, another user may be able to view or access only a virtual interview enhancement object 430 and a thinking styles assessment enhancement object 430, while still another user may be able to view or access all available enhancement objects 430 associated with the respective eres 405 in an eres pool 425. Finally, from the job-offeror account manager state 8043, a user may also choose to manage his organization's eroles 410 including the eroles' respective intelligent agent settings 416, to manage responses to his organization's respective eroles 410, to create or edit a custom organizational job opening derivative web site, or to switch to a different affiliate.

In a first alternative embodiment of the job-offeror interface, if the user chooses, from the job-offeror home state 8002, to manage responses to the organization's eroles 410, the job-offeror interface 8000 proceeds to the erole response summary state 8016. In the erole response summary state 8016, the job-offeror interface 8000 may present lists of all eroles published in each of a plurality of publishing programs, the number of eres 405 in the system 20 which are currently associated with each erole 410 in each list, the expiration date of the publication of each erole 410 in each program, and the like. In a preferred embodiment, the available programs include at least the reference ID program and the current affiliate's publishing program. Each erole 410 may preferably be published utilizing any of the publishing programs, and therefore each erole 410 may be included in more than one list. In an affiliate publishing program, the eres 405 which are associated with a particular erole 410 include all potentially matching eres 405 which have been permitted by their owners to be distributed to the erole's owner. In a reference ID program, the eres which are associated with a particular erole are those eres 405 whose owners have responded directly to the erole 410.

In the erole response summary state 8016, the user may choose to view the pool of responsive eres 425 associated with an erole 410 in any of the programs by selecting an erole 410 from one of the lists. If the user selects an erole 410 from one of the publishing program lists, then the job-offeror interface 8000 proceeds to the pool manager state 8017 wherein a list of all of the responsive eres 405 in a pool 425 corresponding to a particular publishing program are displayed. Thus, if the user selects an erole 410 from the current affiliate's publishing program list, then the job-offeror interface 8000 proceeds to display the contents of the affiliate pool 425 of the user's current affiliate in the pool manager state 8017. Alternatively, if the user selects an erole 410 from the reference ID program list, then the job-offeror interface 8000 proceeds to display the contents of the reference ID pool 425 in the pool manager state 8017. In addition, from the erole response summary state 8016, the user may choose to return to the home state 8002 or to manage the organization's eroles 410.

In a second alternative embodiment of the job-offeror interface 8000, all eres 405 which are associated with a particular erole 410, regardless of the publishing program through which the eres 405 were associated with the erole 410, are displayed together in a single pool 425. In this embodiment, the job-offeror interface 8000 allows a user to manage responses to the organization's eroles 410 by proceeding directly from the job-offeror interface 8000 to the pool manager state 8017 to display a single eres pool 425 containing all of the eres 405 which have been associated with a selected erole.

As previously stated, in the pool manager state 8017, the job-offeror interface 8000 displays a list of all of the eres which currently make up a particular pool. Preferably, the user has the option of managing a different eres pool 425 in the pool manager state 8017 at any time. In the first alternative embodiment described above, the different eres pool 425 may correspond to the same erole 410 published in a different publishing program, a different erole 410 published in the same publishing program, or both. In the second alternative embodiment described above, the different eres pool 425 may correspond to the eres 405 associated with a different erole 410 through any publishing program. Further, with regard to the affiliate publishing program, the different eres pool 425 may correspond to the same erole 410 published within a marketspace other than the one corresponding to the current affiliate. A selectable list of available marketspaces, or of marketspaces in which the selected erole 410 is published, may be provided to the user in the pool manager state 8017 for the purpose of enabling the user to move from one marketspace to another.

In addition to switching to a different eres pool 425, the user also has the options, in the pool manager state 8017, of viewing the selected erole 410, viewing the contents of a particular eres 405, controlling the way the eres 405 are displayed, and the like. If the user chooses to view the selected erole 410, then the job-offeror interface 8000 graphically presents the selected erole 410 to the user at view erole state 8015. If the user selects a particular eres 405 for viewing, the eres 405 is graphically displayed to the user by the job-offeror interface 8000 in a view/rate eres state 8018. Preferably, when viewing an eres 405 in the view/rate eres state 8018, the user has the option of rating the eres 405 on a scale. In one embodiment, the scale is a numerical scale, and the user may attribute whatever meaning he chooses to the numbers on the scale. Also preferably, when viewing an eres 405 in the view/rate eres state 8018, the user may advance forward or backward to the next or previous eres 405 in the pool 425. When finished, the user may return to the current pool 425 in the pool manager state 8017.

Preferably, the user may control a plurality of aspects of how the eres 405 in the current pool 425 are displayed. In a first aspect, the user may choose the number of eres 405 which are displayed at one time. In a second aspect, the user may choose the ordering methodology used to present the matching eres 405 to the user. Advantageously, in a first ordering methodology, the matching eres 405 may be arranged into tiers based on how closely they match the erole 410. In a preferred embodiment, there are five tiers, but it should be clear that other numbers of tiers may be used. The tiers are listed in order from the tier containing the eres 405 which most closely match the erole 410 to the tier containing the eres 405 which most minimally match the erole 410, and within each tier the eres 405 are similarly listed on the basis of how closely they match the erole 410. If the pool 425 includes eres 405 which have been distributed to a the selected erole 410 through the reference ID program, those eres 405 which did not meet "must" criteria are preferably placed in a separate tier from those eres 405 which did. In another ordering methodology, the user may rate the eres 405 on a scale, and the eres 405 may be arranged according to the ratings given. Preferably, a standard scale may be provided, and the user may assign whatever meaning he chooses to the units on the scale. In a third ordering methodology, the eres 405 may be ordered on the basis of whether they have or have not been viewed by the user yet. In a fourth ordering methodology, the eres 405 may be ordered on the basis of when they arrived in the job-offeror's eres pool 425. In a fifth ordering methodology, the eres 405 may be ordered on the basis of the amount of time which has elapsed since the eres owner last utilized the system 20. The fourth and fifth methodologies may also be enhanced through the use of graphical indicators of the age of each eres 405 or the elapsed time since each eres owner last utilized the system 20. In one example of a graphical indicator, one or more shades of the color yellow could be applied to each eres 405 displayed in the pool 425 to indicate eres 405 that are older or younger than others by mimicking the effects of light on a piece of paper over time; i.e., an eres 405 colored with a darker shade of yellow would be understood to be older than an eres 405 colored a lighter shade of yellow or colored white. In another example of a graphical indicator, the edges of each eres 405 displayed might be blurred or distorted differently to indicate eres 405 that are older or younger than others by mimicking the effects of physically handling a piece of paper over time; i.e., an eres 405 that is displayed with severely distorted edges would be understood to have been viewed more frequently by a user, or is older, than an eres which has precisely defined edges as viewed in the job-offeror interface 8000. Either of these techniques, or others not described herein, may also be applied when viewing individual eroles in the view/rate eres state 8018. Finally, in addition to choosing the ordering methodology employed, the user is also preferably able to control how many eres 405 are viewed at a time. Additional aspects may also be provided.

Returning once again to the job-offeror home state 8002, the user may choose to switch to a different marketspace by entering the affiliate introduction state 7001 of the affiliated system 30 corresponding to the chosen marketspace. In the exemplary embodiment described hereinabove, a list of available marketspaces may be immediately accessible from the affiliate introduction state, and if the user selects one of the available marketspaces, the software system 40 immediately provides access to the job-offeror interface 8000 for the corresponding affiliated system 30. For example, if the system 20 is a web-based system, a page associated with the affiliate introductory state 7001 for the current marketspace may include a list of URL's corresponding to the introductory pages of the affiliated systems 40 for respective available marketspaces. Information describing the marketspace may also be provided to the user on the same or a related page, including such details as the scope of the marketspace, the number of current eres 405 or eroles 410, sponsors of the affiliated system 30 for that marketspace, and the like.

Although not illustrated, it should be obvious that an ad hoc query mechanism similar to the one provided by the job-seeker interface 7000 may also be provided by the job-offeror interface 8000. Using such a mechanism, a user would be able to access individual eres 405 by formulating a query and then selecting a particular eres 405 from a resulting query match list. Such an option may, for example, be available from the job-offeror home state 8002. If the user wished to formulate a query, then the job-seeker interface 8000 would proceed to a query manager state, whereupon the user could formulate the query itself. The query would comprise a series of criteria selected by the user from the common language architecture. The contents of the query would then be matched directly against all the eres 405 stored in the eres database 165 by comparing each selected criteria to the corresponding criteria in the respective eres 405. Those eres 405 which include all of the selected criteria could then be presented to the user in a query match list in a query match list state. If the user selected one of the eres 405 from the query match list, then the job-offeror interface 8000 would proceed to a view/respond eres state to graphically display the corresponding eres 405. The user would then be able to respond to the eres 405 by generating an erole 410 and publishing or distributing it to the eres 405.

The Intelligent Agent

Figure 9A:
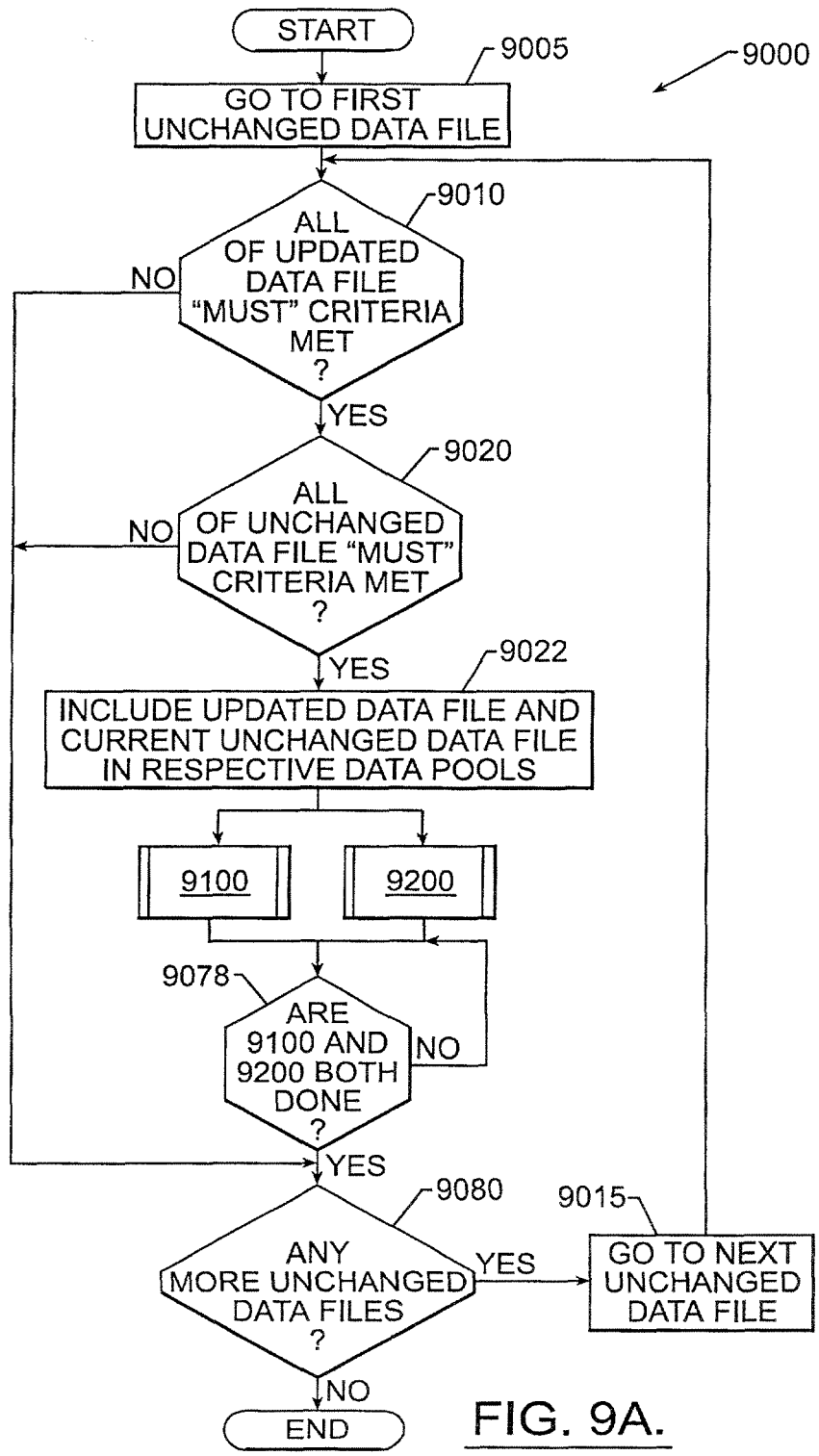
FIGS. 9A-9C are flowchart diagrams illustrating steps taken by the intelligent agent in conjunction with the software system of the present invention in executing the intelligent agent matching process.
Figure 9B:
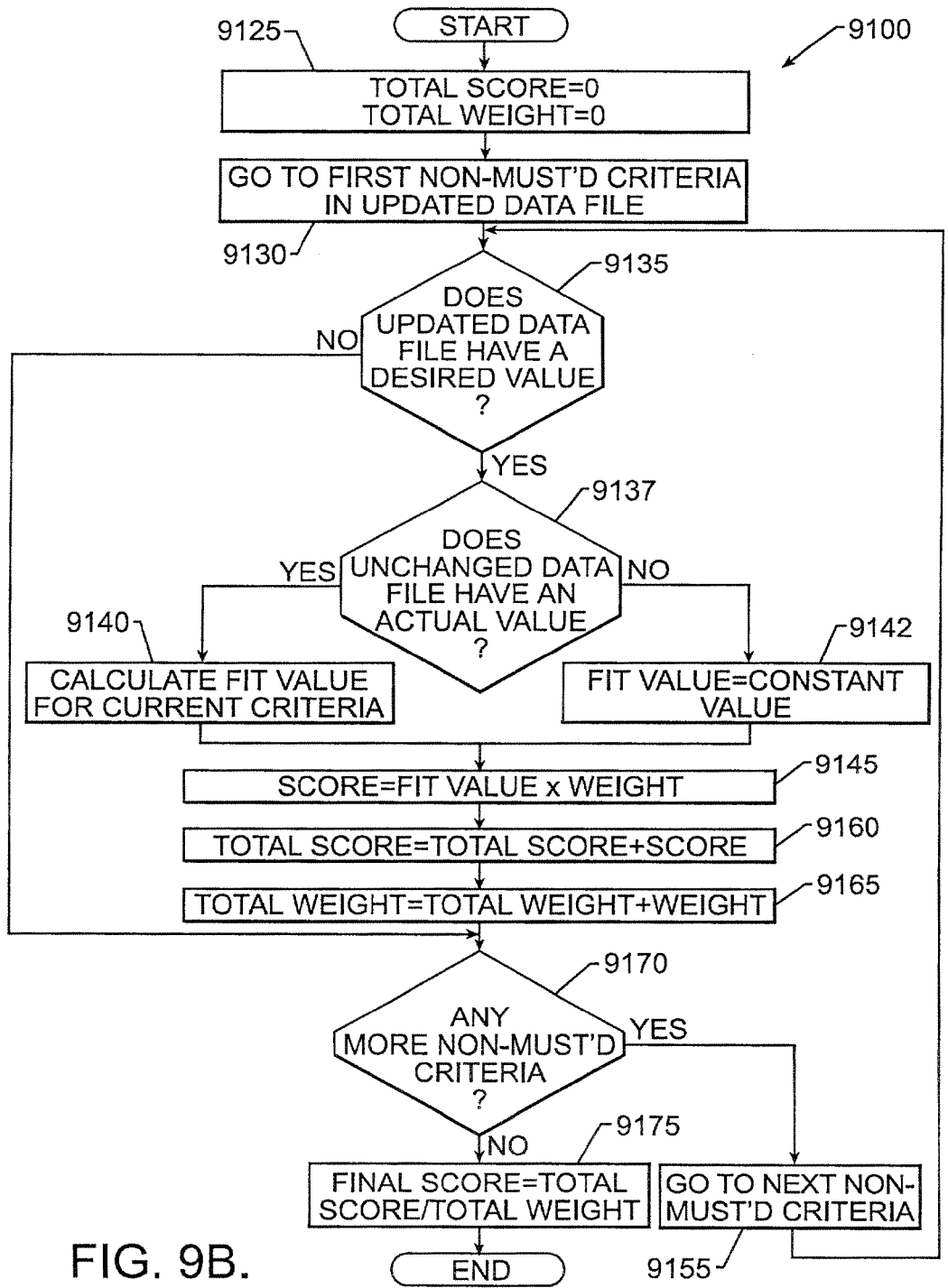
Figure 9C:
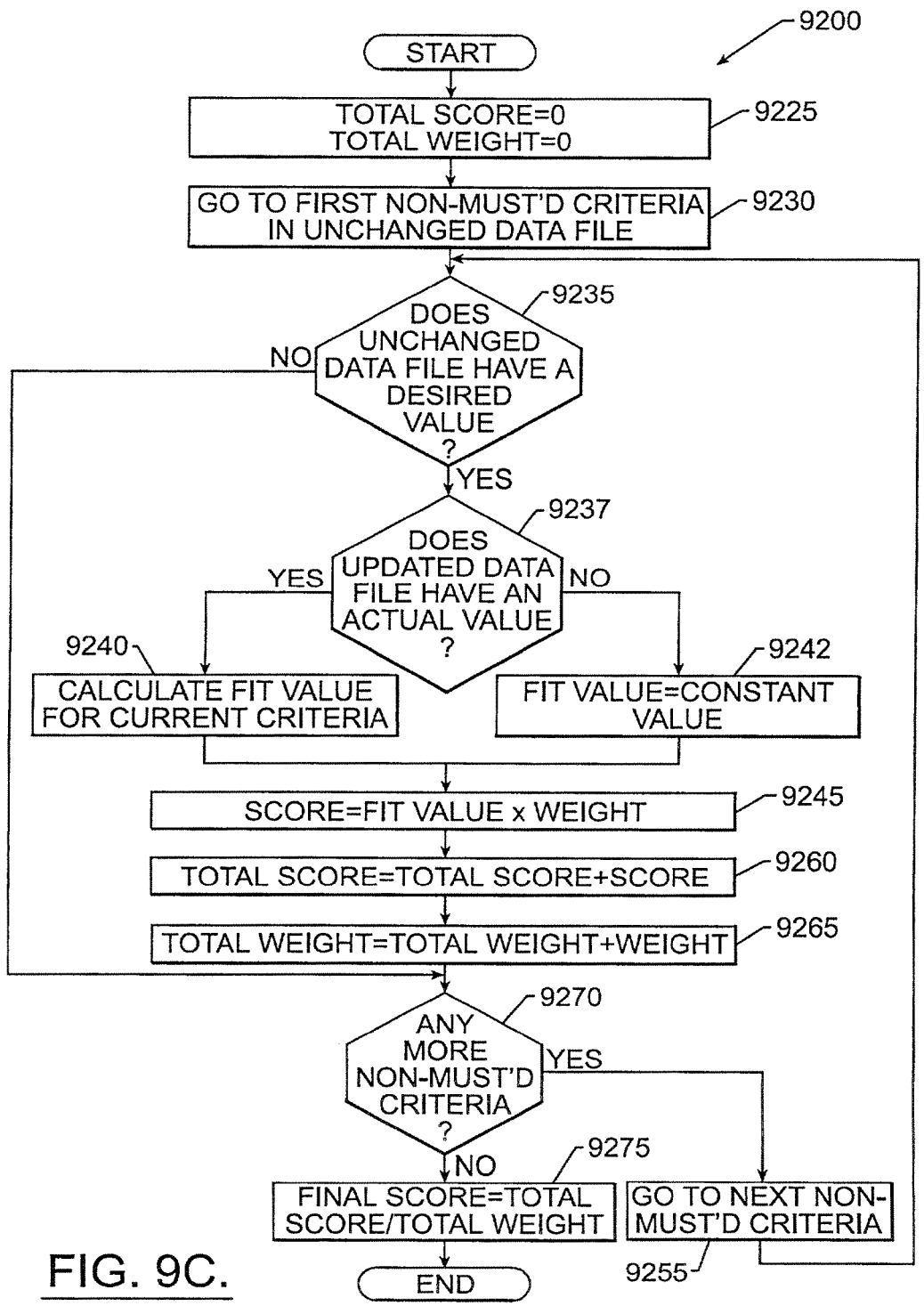

FIGS. 9A-9C illustrate steps taken by the intelligent agent 415 in conjunction with the software system 40 of the present invention in executing the intelligent agent matching process 9000. The intelligent agent 415 operates concurrently with the job-seeker and job-offeror interfaces 7000, 8000 described previously to carry out the operations of the eres and erole management processes 5000, 6000 which were also described previously. The intelligent agent 415 operates automatically in the background to compare all eres 405 registered in each marketspace to all eroles 410 registered in the same marketspace. Operation of the intelligent agent 415 is triggered whenever the participation status of a data file 405, 410 is edited or adjusted. The newly edited or adjusted data file, which is either a Category A or a Category B data file and is defined as the updated data file 440, is then compared to all of the data files, defined as unchanged data files 445, of the other category. Thus, when the content or participation status of an eres 405 is changed, the eres 405 is compared anew to all eroles 410 in the erole database 170 which participate in any marketspace in which the eres participates. Similarly, when the content or participation status of an erole 410 is changed, the erole 410 is compared anew to all eres 405 in the eres database 165 which participate in any marketspace in which the erole 410 participates.

Each comparison between a Category A data file 405 and a Category B data file 410 is carried out utilizing the common language architecture described previously. Comparisons between data files are executed by comparing individual criteria in one data file 405, 410 to corresponding criteria in the comparison data file 410, 405. Table 1 illustrates an exemplary set of eres criteria and their corresponding erole criteria. Table 2 illustrates an exemplary set of erole criteria and their corresponding eres criteria. It should be noted that the criteria compared when matching eroles 410 to an eres 405, as shown in Table 1, are not necessarily the same as the criteria compared when matching eres 405 to an erole 410, as shown in Table 2. Because the entered data corresponding to each criteria is governed by the standardized mechanisms of the common language architecture, each criteria in the first data file 405, 410 may be successfully compared to its corresponding criteria in the comparison data file 410, 405.

Further, although not shown in Tables 1 and 2, it has been noted elsewhere herein that a comparison between a Category A data file 405 and a Category B data file 410 may also include the comparison between of the eres and erole enhancement objects 430, 435 associated with the respective data files 405, 410. Because of the corresponding or reciprocal nature of the enhancement objects 430, 435, the content of each such enhancement object 430, 435 may be compared to the content in the corresponding or reciprocal enhancement object 435, 430. For example, the thinking styles assessment object for the eres owner may be compared to the reciprocal thinking styles assessment object for the erole owner; the work preferences assessment object for the eres owner may be compared to the reciprocal preferred work style characteristics object for the erole owner; and the professional skills assessment object for the eres owner may be compared to the reciprocal professional skills assessment object for the erole owner.

It should also be noted that when an updated data file 440 is compared to the corresponding unchanged data files 445, a bidirectional comparison must be carried out. First, the content of each unchanged data file 445 is examined by the intelligent agent 415 to determine how closely the unchanged data file 445 matches the updated data file 440. As described below, each unchanged data file 445 may be scored against the updated data file 440 on the basis of how closely it matches the updated data file 440. Second, and less intuitively, the content of the updated data file 440 is examined by the intelligent agent 415 to determine how closely the updated file matches 440 each unchanged data file 445. Also as described below, each updated data file 440 may be scored against each unchanged data file 445 on the basis of how closely it matches the unchanged data file 445. Significantly, because each data file 405, 410 may contain an item preferences segment 406, 411, because the Category A owner may set the weights of the match factors differently from the Category B owner, and/or for other reasons, the score a particular unchanged data file 445 achieves against the updated data file 440 may be, and usually is, different from the score the updated data file 440 achieves against the same unchanged data file 445. An exemplary set of match factors for eres 405 which may be weighted or "must'd" and the criteria to which they correspond is illustrated in Table 1. An exemplary set of match factors for eroles 410 which may be weighted or "must'd" and the criteria to which they correspond is illustrated in Table 2. Included in each table is an explanation of the effect of adjusting those respective weights or setting their respective "must" indicators.

Operation of the intelligent agent matching process 9000 begins at step 9005 with the selection of an initial unchanged data file 445 which is to be compared to the updated data file 440. In comparing any unchanged data 445 file to the updated data file 440, the intelligent agent 415 first determines at step 9010 whether the unchanged data file 445 meets all of the updated data file's 440 "must" criteria, and at step 9020 determines whether the updated data file 440 meets all of the "must" criteria of the unchanged data file 445. If any of the "must" criteria of either the updated data file 440 or the unchanged data file 445 are not met, then at step 9080 the intelligent agent determines whether there are any more unchanged data files 445 to consider, and if so, advances to the next one. As described previously, "must" criteria include all "must" indicators set by the respective data file owner, as well as whether the data files 440, 445 participate in the same marketspace, as indicated by marketspace identifiers. The intelligent agent 415 may determine marketspace participation by either examining the data files 405, 410 directly, or by consulting a reverse sort dictionary which contains a list of those data files 405, 410 which are currently participating in the current marketspace. If a reverse sort dictionary is utilized, the dictionary is updated each time the participation status of any data file 405, 410 changes.

If a particular unchanged data file 445 and the updated data file 440 meet each other's "must" requirements, then at step 9022 the unchanged data file 445 is included in the appropriate pool 420, 425 of the updated data file 440, and the updated data file 440 is included in the appropriate pool 420, 425 of the unchanged data file 445. The inclusion of data files 405, 410 in pools 425, 420 is discussed elsewhere. Next, two sub-processes 9100, 9200 are executed. In a first sub-process 9100, each unchanged data file 445 may be scored against the updated data file 440 on the basis of how closely it matches the updated data file 440. In a second sub-process 9200, the content of the updated data file 440 is examined by the intelligent agent 415 to determine how closely the updated data file 440 matches each unchanged data file 445. As shown, the two sub-processes 9100, 9200 are executed generally simultaneously, but it should be obvious to one of ordinary skill that the two subprocesses 9100, 9200 may instead be executed sequentially, with either the first sub-process 9100 being executed before the second sub-process 9200, or the second sub-process 9200 being executed before the first sub-process 9100. The steps of each intelligent agent matching sub-process 9100, 9200, which are very similar, are next described.

FIG. 9B is a flowchart illustrating the steps of the first intelligent agent matching sub-process 9100. The first intelligent agent matching sub-process 9100 begins at step 9125 by resetting a total match factor score variable and a total weight variable, each of which correspond to the particular unchanged data file 445 At step 9130, the intelligent agent 415 begins examining the individual non-must'd match factors in the updated data file 440. For each such match factor, the owner of the updated data file 440 may have specified a criteria value. At step 9135 the intelligent agent 415 determines if such a criteria value, which the intelligent agent 415 treats as a desired value, has been specified. If not, then the intelligent agent 415 ignores that match factor and, if at step 9170 there are additional non-must'd match factors to consider, the intelligent agent 415 continues on at step 9155 to the next one. On the other hand, if at step 9135 the intelligent agent 415 determines that a desired criteria value has been specified, then a score is calculated for the unchanged data file 445 as described below.

In scoring the unchanged data file 445, the intelligent agent 415 first determines at step 9137 whether an actual value has been specified in the unchanged data file 445 for the match factor under consideration. If so, then at step 9140 the intelligent agent 415 compares the desired criteria value specified by the owner of the updated data file 440 to the actual value of the corresponding criteria in the unchanged data file 445 and derives a fit value based on how similar the actual value is to the desired value. The fit value, which is preferably a real number from 0 to 1, may be derived in a number of ways, some of which are described below. On the other hand, if, at step 9137, no actual value has been specified for the match factor in the unchanged data file 445, then the fit value is instead set to a constant value at step 9142. The constant value may be chosen to most accurately reflect the statistical effect of the absence of data for a particular match factor. In an exemplary embodiment, the constant value is set to 0.18, but different values may be chosen for different situations.

Regardless of how the fit value is set, at step 9145 the intelligent agent 415 next multiplies the fit value for the current match factor by the weight given that match factor by the owner to calculate a match factor score. Preferably, the weight is a real value from 0 to 100. Also preferably, if the owner has specified a criteria but fails to define a specific weight for the match factor corresponding to that criteria, the weight of that match factor defaults to a predetermined value, such as 50. Match factors for which no desired value has been provided by the owner carry a weight of zero. Next, at step 9160, the match factor score is added to the total match factor score for the current unchanged data file 445 relative to the updated data file 440, and at step 9165 the weight of the match factor is added to the total weight. Finally, the intelligent agent 415 determines at step 9170 whether there any more non-must'd match factors to consider and at step 9155 continues on to the next one.

Once the last match factor has been examined, the intelligent agent 415 calculates a final score at step 9175 by dividing the total match factor score accumulated for the unchanged data file 445 by the total weight accumulated for the same data file 445. This final score is then stored with the updated data file 440 in the appropriate database 165, 170 along with final scores for all of the other unchanged data files 445 whose "must" criteria are met by the updated data file 440 and which meet the updated data file's 440 "must" criteria as determined in steps 9010 and 9020. Finally, the first intelligent agent matching sub-process 9100 ends and the intelligent agent 415 returns to step 9078 to await the completion of the second sub-process 9200, the operation of which is next described.

It should be noted that data storage requirements may optionally be reduced by storing the calculated scores only when they exceed a threshold value which may be predefined by the administrator of the system. Thus, data files 440, 445 which meet each other's must criteria are always included in the appropriate pools 420, 425 as described with regard to step 9022, but an unchanged data file's 445 score with respect to the updated data file 440 will not be stored if it does not meet the threshold value, and likewise the updated data file's 440 score with respect to an unchanged data file 445 will not be stored if it does not meet the threshold value. It should also be noted that if this option is implemented, then a corresponding adjustment may be necessary if an ordering methodology involving the scores of the data files 405, 410 is employed to display the data files 405, 410 in a pool 420, 425. For example, if a tiering system is used, those data files 405, 410 in the pool 420, 425 for which a score is not available may automatically be placed in the last tier.

FIG. 9C is a flowchart illustrating the steps of the second intelligent agent matching sub-process 9200, which operates at substantially the same time as the first intelligent agent matching sub-process 9100. In the second intelligent agent matching sub-process, a total match factor score variable and a total weight variable, each corresponding to the updated data file 440 relative to the particular unchanged data file 445 against which it is being scored, are set to zero at step 9225. At step 9230, the intelligent agent 415 begins examining the individual non-must'd match factors in the unchanged data file 445. For each such match factor, the owner of the unchanged data file 445 may have specified a criteria value. At step 9235 the intelligent agent 415 determines if such a criteria value, which the intelligent agent 415 treats as a desired value, has been specified. If not, then the intelligent agent 415 ignores the match factor and, if at step 9270 there are additional non-must'd match factors to consider, the intelligent agent 415 continues on at step 9255 to the one On the other hand, if at step 9235 the intelligent agent 415 determines that a desired criteria value has been specified, then a score is calculated for the updated data file 440, relative to the current unchanged data file 445, as described below.

In scoring the updated data file 440, the intelligent agent 415 first determines at step 9237 whether an actual value has been specified in the updated data file 440 for the match factor under consideration. If so, then at step 9240 the intelligent agent 415 compares the desired criteria value specified by the owner of the unchanged data file 445 to the actual value of the corresponding criteria in the updated data file 440 and derives a fit value based on how similar the actual value is to the desired value. The fit value, which is preferably a real number from 0 to 1, may be derived in a number of ways, some of which are described below. On the other hand, if, at step 9237, no actual value has been specified for the match factor in the updated data file 440, then the fit value is instead set to a constant value at step 9242. The constant value may be chosen to most accurately reflect the statistical effect of the absence of data for a particular match factor. In an exemplary embodiment, the constant value is set to 0.18, but different values may be chosen for different situations.

Regardless of how the fit value is set, at step 9245 the intelligent agent 415 next multiplies the fit value for the current match factor by the weight given that match factor by the owner to calculate a match factor score. Preferably, the weight is a real value from 0 to 100. Also preferably, if the owner has specified a criteria but fails to define a specific weight for the match factor corresponding to that criteria, the weight of that match factor defaults to a predetermined value, such as 50. Match factors for which no desired value has been provided by the owner carry a weight of zero. Next, at step 9260, the match factor score is added to the total match factor score for the updated data file 440 relative to the current unchanged data file 445, and at step 9265 the weight of the match factor is added to the total weight. Finally, the intelligent agent 415 determines at step 9270 whether there any more non-must'd match factors to consider and at step 9255 continues on to the next one.

Once the last match factor has been examined, the intelligent agent 415 calculates a final score at step 9275 by dividing the total match factor score accumulated for the updated data file 440 by the total weight accumulated for the same data file 440. This final score is then stored with the unchanged data file 445 in the appropriate database 165, 170 along with the previously-stored final scores for other unchanged data files 445. Finally, the second intelligent agent matching sub-process 9200 ends and the intelligent agent 415 returns to step 9078 to await the completion of the operation of the first sub-process 9100, as previously described.

Once both the first and second sub-processes 9100, 9200 have completed their respective operations, the intelligent agent 415 determines at step 9080 whether there are any more unchanged data files 445 to be scored against the updated data file 440 and against which the updated data file 440 is to be scored, and at step 9015 proceeds to the next one. Steps 9010-9080 and sub-processes 9100 and 9200 may then be repeated until there are no more unchanged data files 445 to be compared to the updated data file 440.

As stated previously, a fit value may be derived in a number of ways, some of which are described below. In a first example of the derivation of a fit value, a bitmask may be used to assign a fit value of 1 if the actual value is precisely the same as the desired value, and to further assign a fit value of 0 if the actual value differs at all from the desired value. Alternatively, a bitmask may be used to assign a fit value of 1 if any entries in a target list are included among a the entries in an actual list, and to further assign a fit value of 0 if none of the entries in the target list are among the entries included in the actual list.

In a second example of the derivation of a fit value, a list-to-list evaluation may be used to compare a list of desired values to a list of actual values. A fit value may be calculated based on how many entries on the list of desired values are on the list of actual values. In a variation of a list-to-list evaluation, an entry on the target list could be a category of sub-entries, where the category is defined as a parent entry and the sub-entries in that category are defined as children of that parent. Partial or full credit could then be given for any entry found on the actual list which is a child of a parent on the target list. Similarly, an entry on the actual list could be a parent of multiple children, and partial or full credit could be given when an entry on the target list is a child of any parent which is found on the actual list.

In a third example of the derivation of a fit value, a fuzzy logic algorithm may be used to assign fit values on the basis of a plurality of rules. Table 3 shows an exemplary set of rules developed for assigning a fit value using such an algorithm. In Rule 1, a fit value of 1 is assigned when the difference between the desired value and the actual value is zero (i.e., when the desired value and the actual value are equal), without regard to the size of the desired value. In Rule 2, a "high" fit value is assigned when the size of the desired value is large and the result of the desired value subtracted from the actual value is positive and has a very small magnitude. Additional Rules 3-13 assign alternative fit values on the basis of the size of the desired value and/or the sign and magnitude of the result of the desired value subtracted from the actual value. The various rules are then combined together utilizing established fuzzy-logic techniques to formulate a unified fuzzy-logic algorithm for modeling the fit value which is desired for any combination of inputs, and the final fuzzy-logic algorithm is then integrated into the intelligent agent 415. A suitable fuzzy-logic modeling system is the fuzzyTECH system from Inform Software, Inc. of Chicago, Ill.

In a fourth example of the derivation of a fit value, a table of cells may be created, wherein each cell contains a fit value chosen to reflect the relationship between a particular desired value and a particular actual value. The fit values contained in the cells may reflect, for example, the amount of overlap between a desired range of values and an actual range of values. If more than one cell is selected (such as when more than one actual value or more than one desired value, or both, is provided), then an algorithm may be defined to select the final fit value on the basis of the plurality of fit values contained in the respective cells. It should be obvious that the algorithm may select the highest fit value, an average fit value, a more complex formula, or the like.

In a fifth example of the derivation of a fit value, a traditional "least squares" fit may be used to calculate a fit value for a match factor consisting of a series of numerical values representing a plurality of item characteristics. In a traditional least squares fit, each value in the series of actual numerical values is subtracted from a corresponding value in a series of desired numerical values, and the respective remainders are each squared and summed together. A fit value is then assigned on the basis of the magnitude of the total of the squares, with a fit value of 1 being assigned when the magnitude of the total of the squares is zero. It should also be clear to one of ordinary skill that other formulas may be used instead of merely summing the squares of the differences, and that a wide variety of formulas may be used to translate the result of the formula into a suitable fit value. Finally, it should also be clear that any of these techniques are equally applicable to the derivation of fit values for either an unchanged data file 445 being scored against the updated data file 440, or for the updated data file 440 being scored against an unchanged data file 445.

Commercial Applications

It will be obvious that the above-described embodiments of the present invention have a wide variety of commercial applications. Aspects of some of these applications are described below.

The personal job-seeker derivative web sites may be used by their owners to quickly and efficiently provide information extracted from their respective contextual representations 401 to a particular job-offeror. The URL may be distributed in any manner the user chooses. For example, the URL may be placed on a user's resume, emails, job boards, business cards and the like. The structure of the web sites enables users to utilize the depth and breadth of the content contained in their contextual representations 401 to describe themselves more fully to prospective hiring managers. Similarly, the custom job opening derivative web sites and job opening summary web pages may be used by their owners to quickly and efficiently provide information extracted from their respective contextual representations 402 to potential job-seekers. The URL may likewise be distributed in any manner the owner of the job-opening chooses. For example, the URL may be placed on an organization's own corporate site, in newspaper ads and on job boards. The structure of the web sites enables users to utilize the depth and breadth of the content contained in their organizational contextual representations 402 to describe themselves and their job openings more fully to prospective job-seekers. In addition, password protection may be utilized in conjunction with either type of web site to more effectively limit access to personal or sensitive information displayed in or through the web sites.

The present invention provides a tremendous amount of flexibility with regard to the development of income from users of such a system as is herein described. First, the users are categorized into at least two types. Thus, any transactional fees imposed by an administrator of a system of the present invention may be implemented or adjusted on the basis of the user type. For example, in the job market, the system may be made available to job-seekers for free, while large fees may be charged to job-offerors for the services provided by the system. In addition, multiple users sharing ownership of a set of eroles may be categorized into different types of users, and fees may be established on the basis of both how many users are permitted and on what capabilities each user is permitted.

Further, as was described previously, the market for a particular type of item is preferably subdivided into marketspaces of a variety of types. For example, in the job market, separate marketspaces might be defined for geographic areas such as cities, career focus areas, and groups of users such as college students, with one or more individual marketspaces being defined for each city, career focus area, and user group. Because the system is designed to operate on a marketspace by marketspace basis, an administrator may control each marketspace independently of the others. As a result, any transactional costs placed on the various activities carried out by the users may be implemented and adjusted on a marketspace by marketspace basis. Thus, for example, a large fee might be imposed in a marketspace corresponding to Pittsburgh, Pa., while a much smaller fee might be imposed in a marketspace corresponding to Holland, Mich.

The marketspace concept also enables separate business relationships to be established with different types of entities, and for the purveyor of a system of the present invention to cooperate with other entrants in a particular market rather than competing with them. For example, in the job market, a partnership may be established between the system owner and a local newspaper in a particular geographic area, such that a reference ID corresponding to a particular erole 410 is published along with a standard advertisement for the job opening corresponding to that erole 410 in the local newspaper, so that job-seekers may peruse the local classified ads to discover jobs, and then utilize the system 20 to respond to the job opening by distributing an eres 405 to the erole 410. Also for example, a company might utilize an affiliated system 30, partitioned from any other systems 20, to organize internal job openings in order to permit employees to transfer to a more suitable job within the company or to more effectively reallocate employee resources within the company.

Another type of flexibility is provided by the data file distribution/publication feature. For example, in the job-offeror interface described previously, if the owner of an erole 410 wishes for the erole 410 to participate in the system (or in a particular marketspace, if marketspaces are implemented), then the owner may have the options of automatically publishing, selectively publishing or subscribing the erole 410. Thus, an administrator might choose to impose a large fee on the erole owner if the erole 410 is automatically published, a smaller fee if the erole 410 is selectively published, and no fee whatsoever if the erole 410 is merely subscribed. In this example, the "subscribed" option might be provided to users as a way to introduce the user to the system and to entice the user to utilize the services with which a fee is associated. In addition, the various distribution or publication levels may further be controlled with respect to the amount of time the respective items are published, distributed or the like. Thus, the erole owner might be allowed to subscribe an erole 410 for free for 30 days, after which time a fee might be imposed for a further subscription period, or the owner might be required to either selectively or automatically publish if he wishes the erole 410 to participate further.

Additional flexibility is provided by the modular aspects of the contextual representations 401, 402 and their constituent parts. Each enhancement object may be separately provided and controlled and may therefore be priced differently, including being offered for free or for free for a limited time. Further, because the job-seeker and job opening derivative web sites are derived or extracted from the contextual representations 401, 402, they may similarly be priced separately or even priced according to how much of the respective contextual representations 401, 402 are included.

Finally, the system 20 provides a seamless, integrated, automated method for advertising or otherwise publishing information about one or more particular item using a wide variety of advertising and publishing channels, both newly developed and preexisting, turning all responses received as a result of those advertising and publishing efforts into a series of uniform contextual representations 401, 402 of items offered in exchange for the advertiser item, and systematically analyzing those contextual representations 401, 402 to identify and organize them on the basis of a corresponding contextual representation 402, 401 of the advertiser's item. In particular, a job-offeror, for example, may advertise a job-opening using any conceivable means, and all job-seekers responding to that advertising are driven through the system to generate a contextual representation 401 of themselves, which may then be matched by the software system 40 against a contextual representation 402 of the job opening defined by the job-offeror, assessed automatically and presented to the individual or organization offering the job in a uniformly and orderly fashion.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A computer-implemented method of reciprocally and automatically matching data files, the method comprising the steps of:
    storing, in a first database on a data storage device connected to a computer server in a computer system, a first data file having a first set of characteristics corresponding to a first user;
    assigning a unique reference identifier to the first data file;
    enabling the first user to select a participation level for the first data file;
    providing the unique reference identifier to a second user without using the computer system;
    storing, in a second database on a data storage device connected to the computer server, a second data file having a second set of characteristics corresponding to the second user;
    enabling the second user to select a participation level for the second data file;
    automatically comparing the first data file to the second data file using the first and second sets of characteristics upon entry of the reference identifier by the second user into the computer system; and
    displaying the first data file to the second user only if the second user selects a participation level in which the first data file is available for display.

2. The method of claim 1, wherein the step of providing the unique reference identifier to a user comprises distributing the identifier to the user in a printed publication.

3. The method of claim 2, wherein the step of distributing the identifier comprises publishing the identifier in a newspaper.

4. The method of claim 3, wherein the step of publishing the identifier in a newspaper comprises the steps of publishing the identifier in a classified advertisement in the newspaper.

5. The method of claim 1, wherein the first data file describes a job.

6. The method of claim 1, wherein the first data file describes an individual seeking companionship.

7. The method of claim 1, wherein the first data file describes goods offered for sale.

* * * * *